US011690157B2

United States Patent
Baker et al.

(10) Patent No.: US 11,690,157 B2
(45) Date of Patent: Jun. 27, 2023

(54) COMMISSIONING AND CONTROLLING LOAD CONTROL DEVICES

(71) Applicant: Lutron Technology Company LLC, Coopersburg, PA (US)

(72) Inventors: Rhodes B. Baker, Bethlehem, PA (US); Kyle Thomas Barco, Bethlehem, PA (US); Bryan Robert Barnes, Lansdale, PA (US); John H. Bull, Slatington, PA (US); Richard S. Camden, Coopersburg, PA (US); Jordan H. Crafts, Bethlehem, PA (US); David J. Dolan, Coopersburg, PA (US); Jason Groller, Allentown, PA (US); Sanjeev Kumar, Harleysville, PA (US); Jonathan T. Lenz, Emmaus, PA (US); Miguel Aguado Pelaez, London (GB); Daniel L. Twaddell, Allentown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 117 days.

(21) Appl. No.: 17/406,813

(22) Filed: Aug. 19, 2021

(65) Prior Publication Data
US 2021/0400793 A1    Dec. 23, 2021

Related U.S. Application Data

(60) Division of application No. 16/154,206, filed on Oct. 8, 2018, now Pat. No. 11,153,956, which is a (Continued)

(51) Int. Cl.
*H05B 47/195* (2020.01)
*H04W 76/14* (2018.01)
(Continued)

(52) U.S. Cl.
CPC ...... *H05B 47/195* (2020.01); *H02J 13/00019* (2020.01); *H04B 10/116* (2013.01);
(Continued)

(58) Field of Classification Search
CPC ....... G05B 19/0423; G05B 2219/25257; H02J 13/00019; H02J 13/0003; H02J 13/0006;
(Continued)

(56) References Cited

U.S. PATENT DOCUMENTS

| 5,905,442 A | 5/1999 | Mosebrook et al. |
| 5,982,103 A | 11/1999 | Mosebrook et al. |

(Continued)

FOREIGN PATENT DOCUMENTS

| CN | 102293058 A | 12/2011 |
| CN | 103874290 A | 6/2014 |

(Continued)

OTHER PUBLICATIONS

Machine English Translation of Nagata—WO 2014/057615 A1, provided by Clarivate, pp. 1-10 (Year: 2023).*

*Primary Examiner* — Thomas R Cairns
(74) *Attorney, Agent, or Firm* — Michael Czarnecki; Glen Farbanish; Philip Smith

(57) ABSTRACT

A load control system may include control devices capable of being associated with each other at one or more locations for performing load control. Control devices may include control-source devices and/or control-target devices. A location beacon may be discovered and a unique identifier in the location beacon may be associated with a unique identifier of one or more control devices. Upon subsequent discovery of the location beacon, the associated load control devices may be controlled. The beacons may be communicated via radio frequency signals, visible light communication, and/or audio signals. The visible light communication may be used (Continued)

to communicate other types of information to devices in the load control system. The visible light communication may be used to identify link addresses for communicating with load control devices, load control instructions, load control configuration instructions, network communication information, and/or the like. The information in the beacons may be used to commission and/or control the load control system.

48 Claims, 19 Drawing Sheets

Related U.S. Application Data continuation of application No. 15/230,226, filed on Aug. 5, 2016, now Pat. No. 10,098,074.

(60) Provisional application No. 62/201,537, filed on Aug. 5, 2015.

(51) Int. Cl.

| | |
|---|---|
| *H04W 76/11* | (2018.01) |
| *H04W 4/80* | (2018.01) |
| *H04W 4/029* | (2018.01) |
| *H04B 10/116* | (2013.01) |
| *H04W 4/02* | (2018.01) |
| *H04W 52/02* | (2009.01) |
| *H02J 13/00* | (2006.01) |
| *H05B 47/19* | (2020.01) |
| *H04W 4/06* | (2009.01) |
| *H04W 16/28* | (2009.01) |
| *H04W 52/34* | (2009.01) |
| *H04W 4/33* | (2018.01) |
| *H04B 17/318* | (2015.01) |

(52) U.S. Cl.
CPC ........... *H04W 4/023* (2013.01); *H04W 4/029* (2018.02); *H04W 4/06* (2013.01); *H04W 4/33* (2018.02); *H04W 4/80* (2018.02); *H04W 16/28* (2013.01); *H04W 52/0245* (2013.01); *H04W 52/343* (2013.01); *H04W 76/11* (2018.02); *H04W 76/14* (2018.02); *H05B 47/19* (2020.01); *H04B 17/318* (2015.01)

(58) Field of Classification Search
CPC ............... H02J 13/0017; H02J 13/0086; H02J 13/0093; H02J 13/0096; H04B 10/116; H04B 17/318; H04W 4/023; H04W 4/029; H04W 4/06; H04W 4/33; H04W 4/80; H04W 16/28; H04W 52/0245; H04W 52/343; H04W 76/11; H04W 76/14; H05B 47/19; H05B 47/195
See application file for complete search history.

(56) References Cited

U.S. PATENT DOCUMENTS

| | | | |
|---|---|---|---|
| 6,167,464 | A | 12/2000 | Kretschmann |
| 6,803,728 | B2 | 10/2004 | Balasubramaniam et al. |
| 6,927,547 | B2 | 8/2005 | Waiko, Jr. et al. |
| 7,126,291 | B2 | 10/2006 | Kruse et al. |
| 7,755,505 | B2 | 7/2010 | Johnson et al. |
| 7,764,162 | B2 | 7/2010 | Cash |
| 7,853,250 | B2 | 12/2010 | Harvey et al. |
| 7,880,639 | B2 | 2/2011 | Courtney |
| 7,925,384 | B2 | 4/2011 | Huizenga |
| 8,009,042 | B2 | 8/2011 | Steiner et al. |
| RE42,927 | E | 11/2011 | Want et al. |
| 8,119,010 | B2 | 2/2012 | Keller et al. |
| 8,179,787 | B2 | 5/2012 | Knapp |
| 8,199,010 | B2 | 6/2012 | Sloan et al. |
| 8,228,184 | B2 | 7/2012 | Blakeley et al. |
| 8,417,388 | B2 | 4/2013 | Altonen et al. |
| 8,456,092 | B2 | 6/2013 | Knapp |
| 8,457,793 | B2 | 6/2013 | Golding et al. |
| 8,471,496 | B2 | 6/2013 | Knapp |
| 8,504,174 | B2 | 8/2013 | Rahme et al. |
| 8,504,180 | B2 | 8/2013 | Imes et al. |
| 8,521,035 | B2 | 8/2013 | Knapp et al. |
| 8,570,221 | B2 | 10/2013 | Bao et al. |
| 8,577,392 | B1 | 11/2013 | Pai et al. |
| 8,588,806 | B2 | 11/2013 | Howard et al. |
| 8,598,978 | B2 | 12/2013 | Knode |
| 8,600,564 | B2 | 12/2013 | Imes et al. |
| 8,610,377 | B2 | 12/2013 | Chemel et al. |
| 8,659,230 | B2 | 2/2014 | Nanahara et al. |
| 8,674,913 | B2 | 3/2014 | Knapp |
| 8,719,384 | B2 | 5/2014 | Lambert et al. |
| 8,749,172 | B2 | 6/2014 | Knapp |
| 8,760,262 | B2 | 6/2014 | Veskovic |
| 8,773,336 | B2 | 7/2014 | Knapp |
| 8,779,905 | B2 | 7/2014 | Courtney et al. |
| 8,823,268 | B2 | 9/2014 | Saveri, III et al. |
| 8,855,794 | B2 | 10/2014 | Imes et al. |
| 8,886,047 | B2 | 11/2014 | Knapp |
| 8,909,380 | B2 | 12/2014 | Golding et al. |
| 8,912,905 | B2 | 12/2014 | Wong et al. |
| 8,994,295 | B2 | 3/2015 | Mohan et al. |
| 9,035,769 | B2 | 5/2015 | Steiner et al. |
| 9,071,453 | B2 | 6/2015 | Shoemaker et al. |
| 9,107,152 | B1 | 8/2015 | Wurster |
| 9,113,528 | B2 | 8/2015 | Bora et al. |
| 9,148,937 | B2 | 9/2015 | Steiner et al. |
| 9,164,524 | B2 | 10/2015 | Imes et al. |
| 9,204,291 | B2 | 12/2015 | Jackson et al. |
| 9,232,610 | B2 | 1/2016 | Gritti |
| 9,237,620 | B1 | 1/2016 | Knapp et al. |
| 9,276,766 | B2 | 3/2016 | Knapp |
| 9,295,112 | B2 | 3/2016 | Knapp |
| 9,345,115 | B2 | 5/2016 | Mohan |
| 9,386,668 | B2 | 7/2016 | Knapp et al. |
| 9,408,282 | B1 | 8/2016 | Springer |
| 9,509,525 | B2 | 11/2016 | Knapp |
| 9,578,724 | B1 | 2/2017 | Knapp et al. |
| 9,602,172 | B2 | 3/2017 | Jackson et al. |
| 9,651,632 | B1 | 5/2017 | Knapp et al. |
| 9,681,368 | B2 | 6/2017 | Howard |
| 9,715,807 | B2 | 7/2017 | Howard |
| 9,800,429 | B2 | 10/2017 | Crayford et al. |
| 9,848,482 | B2 | 12/2017 | Knapp |
| 10,210,750 | B2 | 2/2019 | Knapp |
| 2006/0250980 | A1 | 11/2006 | Pereira et al. |
| 2008/0092075 | A1 | 4/2008 | Jacob et al. |
| 2008/0111491 | A1 | 5/2008 | Spira |
| 2009/0206983 | A1 | 8/2009 | Knode et al. |
| 2010/0188009 | A1 | 7/2010 | Bull et al. |
| 2010/0245588 | A1 | 9/2010 | Waehner |
| 2010/0296285 | A1 | 11/2010 | Chemel et al. |
| 2012/0001567 | A1 | 1/2012 | Knapp et al. |
| 2012/0002974 | A1 | 1/2012 | Schenk et al. |
| 2013/0010018 | A1 | 1/2013 | Economy |
| 2013/0026947 | A1 | 1/2013 | Economy et al. |
| 2013/0030589 | A1 | 1/2013 | Pessina et al. |
| 2013/0181813 | A1 | 7/2013 | Norlen et al. |
| 2013/0214609 | A1 | 8/2013 | Carmen, Jr. |
| 2013/0222122 | A1 | 8/2013 | Killo et al. |
| 2013/0285472 | A1 | 10/2013 | Bull |
| 2013/0314560 | A1 | 11/2013 | Gritti et al. |
| 2014/0001846 | A1 | 1/2014 | Mosebrook et al. |
| 2014/0001977 | A1 | 1/2014 | Zacharchuk et al. |
| 2014/0031987 | A1 | 1/2014 | Ericsson et al. |
| 2014/0052783 | A1 | 2/2014 | Swatsky et al. |
| 2014/0070919 | A1 | 3/2014 | Jackson et al. |
| 2014/0106735 | A1 | 4/2014 | Jackson et al. |
| 2014/0159589 | A1 | 6/2014 | Pandharipande et al. |
| 2014/0175875 | A1 | 6/2014 | Newman, Jr. et al. |
| 2014/0177469 | A1 | 6/2014 | Neyhart |
| 2014/0180487 | A1 | 6/2014 | Bull |

(56) References Cited

U.S. PATENT DOCUMENTS

| | | |
|---|---|---|
| 2014/0232298 A1 | 8/2014 | Gillies et al. |
| 2014/0235269 A1 | 8/2014 | Ericsson et al. |
| 2014/0239852 A1 | 8/2014 | Kim et al. |
| 2014/0247117 A1 | 9/2014 | Veskovic |
| 2014/0250200 A1 | 9/2014 | Geurts et al. |
| 2014/0265568 A1 | 9/2014 | Crafts et al. |
| 2014/0267008 A1 | 9/2014 | Jain et al. |
| 2014/0269222 A1 | 9/2014 | Patton et al. |
| 2014/0277805 A1 | 9/2014 | Browne, Jr. et al. |
| 2015/0015377 A1 | 1/2015 | Bull et al. |
| 2015/0016825 A1 | 1/2015 | Haruyama et al. |
| 2015/0038171 A1 | 2/2015 | Uilecan et al. |
| 2015/0076993 A1 | 3/2015 | Mohan |
| 2015/0137699 A1 | 5/2015 | Killo et al. |
| 2015/0179058 A1 | 6/2015 | Crafts et al. |
| 2015/0185752 A1 | 7/2015 | Bard et al. |
| 2015/0189068 A1 | 7/2015 | Mohan et al. |
| 2015/0189724 A1 | 7/2015 | Karc et al. |
| 2015/0223309 A1 | 8/2015 | Mohan et al. |
| 2015/0223310 A1 | 8/2015 | Steiner et al. |
| 2015/0230323 A1 | 8/2015 | Steiner et al. |
| 2015/0279051 A1 | 10/2015 | Kovesi et al. |
| 2015/0295411 A1 | 10/2015 | Courtney |
| 2016/0028320 A1 | 1/2016 | Knode et al. |
| 2016/0028477 A1 | 1/2016 | Jovicic et al. |
| 2016/0054023 A1 | 2/2016 | Baker et al. |
| 2016/0056629 A1 | 2/2016 | Baker et al. |
| 2016/0128121 A1 | 5/2016 | Koriyama |

FOREIGN PATENT DOCUMENTS

| | | | |
|---|---|---|---|
| EP | 2894948 A2 | 7/2015 | |
| WO | WO-2014057615 A1 * | 4/2014 | ......... H05B 37/0272 |
| WO | WO 2015/022650 A1 | 2/2015 | |

\* cited by examiner

COMMISSIONING AND CONTROLLING LOAD CONTROL DEVICES

CROSS-REFERENCE TO RELATED APPLICATIONS

This application is a divisional of U.S. patent application Ser. No. 16/154,206, filed Oct. 18, 2018, which is a continuation of U.S. patent application Ser. No. 15/230,226, filed Aug. 5, 2016, now U.S. Pat. No. 10,098,074, which claims the benefit of U.S. Provisional Patent Application No. 62/201,537, filed Aug. 5, 2015, the entire disclosures of which are incorporated by reference herein.

BACKGROUND

Load control systems may include electrical loads (e.g., lighting loads, electrical motors for motorized window treatments, etc.), control-target devices (e.g., ballasts, light emitting diode (LED) drivers, motorized window treatments, temperature control devices, plug-in load control devices, etc.) for controlling electrical power to the lighting loads, and/or control-source devices (e.g., occupancy sensors, daylight sensors, window sensors, remote control devices, etc.) capable of sending instructions via digital messages to the control-target devices for controlling the electrical loads. The control-target devices may receive digital messages, which may include load control instructions, for controlling an electrical load from one or more of the control-source devices. The control-target devices may be capable of directly controlling an electrical load. The control-source devices may be capable of indirectly controlling the electrical load via the control-target device. The control-source devices may include a system controller configured to send instructions to the control-target device for controlling the electrical power provided to the electrical load. After the devices are installed in the load control system, the load control system may be commissioned to enable the proper configuration and communication of devices to control the electrical loads.

Typically, after the load control system is installed in a location, such as a residence, an office, or the like, the system controller may assign a link address to a lighting control device that the system controller controls. The link addresses may be used for sending instructions to the load control devices for controlling the electrical loads. This assignment may be done at random. For example, a system controller may be capable of controlling a plurality of lighting control devices, such as lighting ballasts or LED drivers, and may randomly assign a different link address to each lighting control device.

It is difficult to determine what link address was assigned to a load control device at a specific location after installation to enable control of the electrical loads at a location from the control-source devices and/or the system controller. For example, a floor plan may indicate a load control device and its corresponding location in a room or building, while the system controller may have a list of the assigned link addresses stored thereon with the location of the load control device that is assigned a link address being unknown.

In order to control the load control devices at a desired location, users may have to identify an electrical load that is controlled by a load control device having an assigned link address and associate a link address with the identified location. As a building may include many load control devices (e.g., in different rooms, floors, etc.) with unknown link addresses, users may have to provide power to an electrical load having an assigned link address and search for the location of the electrical load in order to associate the location with the assigned link address of the load control device controlling the electrical load. The process of identifying the location of the load control devices having assigned link addresses and associating the link addresses with the appropriate location of the load control devices can be time consuming and costly.

SUMMARY

A load control system may be commissioned as described herein for controlling one or more electrical loads. During commissioning of a load control system, one or more control devices may be identified and/or grouped for load control. The control device groups may include at least one control-target device (e.g., load control device) and at least one control-source device. For example, a load control system may include control devices capable of being associated with one or more load control devices in different locations. A location beacon may be discovered and a unique identifier in the location beacon may be associated with a unique identifier in a control device beacon discovered from one or more control devices. Upon subsequent discovery of the location beacon, the associated control devices may be controlled.

The control of the electrical loads may be configured such that control-source devices may be controlled by associated control-target devices, presets, timers, etc. The control-source devices may include lighting control devices (e.g., ballasts, light-emitting diode (LED) drivers, etc.), temperature control devices (e.g., thermostats), motorized window treatments (e.g., electric motor for controlling window shades), and/or other types of control-source devices capable of directly controlling an electrical load.

The beacons may be communicated via different types of signals, such as radio frequency signals, visible light communication (VLC) signals, and/or audio signals, for example. The beacons may be used to identify link addresses for communicating with load control devices or other unique identifiers of the control devices in a load control system. The information in the beacons may be used to commission and/or control the load control system.

Load control devices may be assigned a link address for receiving instructions to provide the amount of power to the electrical load. To identify the link address assigned to a load control device, the load control device may provide the amount of power to the electrical load in a manner that causes the electrical load to indicate the link address assigned to the load control device in a visible light communication. For example, the load control device may modulate the electrical load to transmit the visible light communication.

In one example, the load control device may include a lighting control device, such as a ballast or a light emitting diode (LED) driver, for controlling a lighting load, such as a lamp or an LED. The lighting control device may increase or decrease an amount of power provided to the lighting load in a manner that provides a visible light communication that indicates the link address assigned to the lighting control device. The lighting control device may provide the visible light communication based on commands or instructions received from a system controller or another control-source device.

The VLC signals may be identified by a network device. The network device may include a camera or other device capable of detecting the VLC signals. The network device may be used to associate the identified link address with a device identifier of the load control device from which the link address is being transmitted. For example, the network device may communicate the link address to the system controller with receive location information that indicates a location of the load control device from which the link address was transmitted. The system controller and/or the network device may associate the link address with a device identifier of the load control device from which the link address was communicated based on the location information generated at the network device.

Other types of information may be provided in the VLC signals to assist with configuring and/or controlling the lighting control devices. For example, the VLC signals may be used to provide wireless network communication information. The wireless network communication information may include a network identifier that indicates the network that may be used to establish a network connection at the network device. The network identifier may correspond to the device identifier of the system controller, for example. The wireless network communication information may include an IP address, a MAC address, an SSID or other network identifier, and/or a network password.

The VLC signals may be used to provide device identifiers of one or more of the lighting control devices. The device identifiers may be detected by the network device and may be used to associate devices in the lighting control system. The device identifiers may also, or alternatively, be used to control and/or configure the identified devices. For example, the network device may send control instructions and/or configuration instructions to the system controller along with the device identifier of the devices to be controlled and/or configured. The system controller may control the identified devices according to the control instructions and/or configuration instructions (e.g., by sending the control instructions and/or configuration instructions to the lighting control device having the link address associated with the device identifier). The load control devices may also, or alternatively, include a visible light sensor configured to detect VLC signals. For example, the lighting control device in a lighting fixture may have a visible light sensor that allows the lighting control device to identify association information, control instructions, configuration instructions, etc. that may be transmitted in VLC signals from one or more devices. The VLC signals may be transmitted from other load control devices and/or control-source devices, such as the network device. The network device may transmit VLC signals using a camera flash and/or a display.

DETAILED DESCRIPTION

Figure 1:
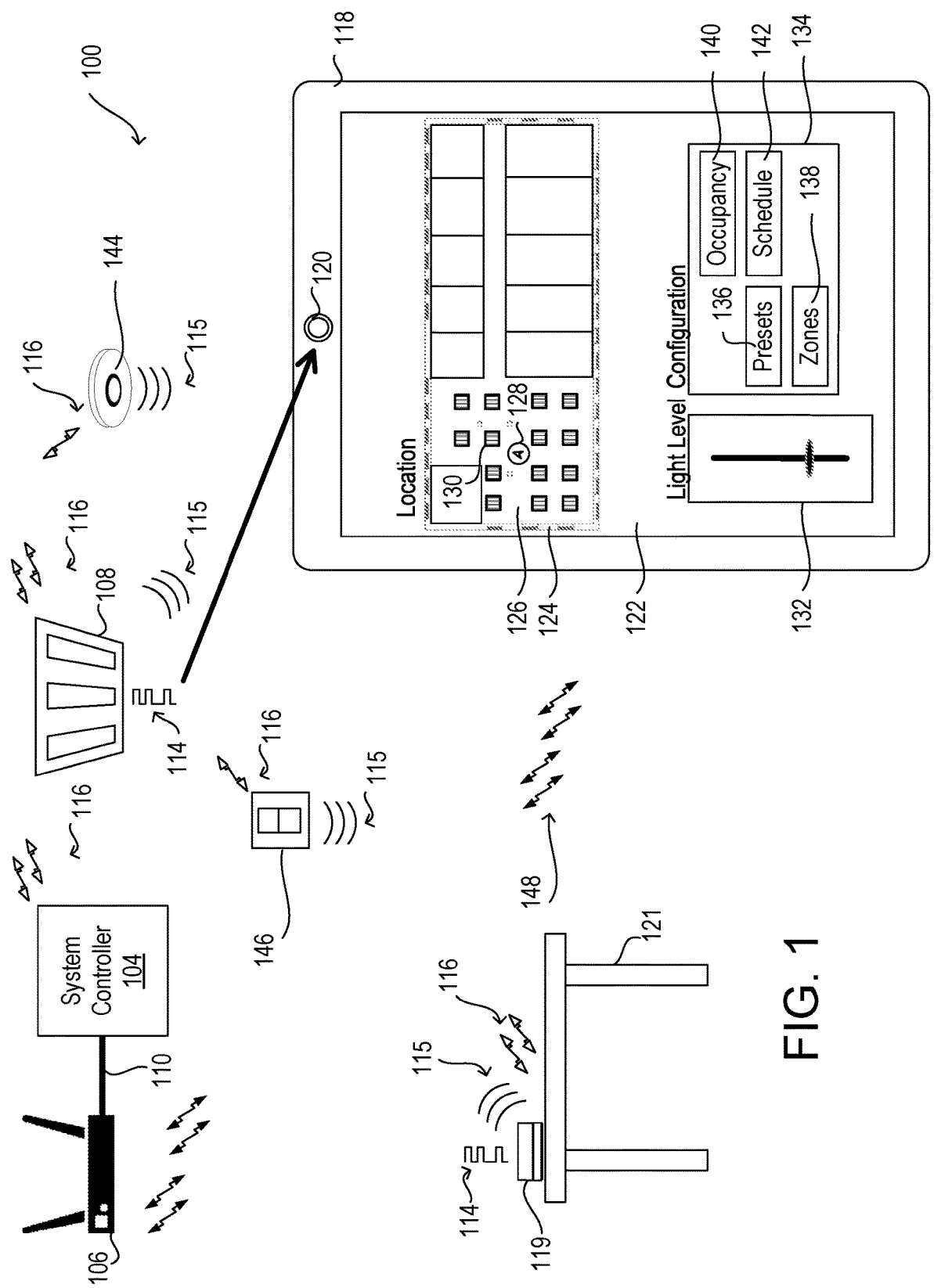
FIG. 1 illustrates a representative lighting control system for configuring and/or controlling one or more control devices.

To commission a load control system, one or more control devices may be identified and/or grouped to control loads. The control devices may include at least one control-target device (e.g., load control device) and at least one control-source device. For example, commissioning of a load control system may include identification and/or grouping of control-source devices and/or control-target for individual and/or collective control. The control of the electrical loads may be configured such that control-source devices may be controlled by associated control-target devices, presets, timers, etc. The control-target devices may include lighting control devices (e.g., ballasts, light-emitting diode (LED) drivers, etc.), temperature control devices (e.g., thermostats), motorized window treatments (e.g., electric motor for controlling window shades), and/or other types of control-source devices capable of directly controlling an electrical load.

Control devices may be identified and/or grouped using beacons. A beacon (or beacon signal) may be transmitted by a control device and/or a beacon transmitting device (such as beacon transmitting device 119). The beacon transmitting device may be a control device, or the beacon transmitting device may be a device that is independent from a control device. The beacon may include a radio signal (e.g., a radio-frequency signal), optical signal (e.g., a visible light signal), audio signal, or other type of signal that may be received by another control device within close proximity to the beacon transmitting device. The beacons may include unique identifying information that may be used to identify and/or group control devices in a load control environment. The beacons may indicate or be used to indicate the proximity or location of a device and/or the current state of the device. The beacons may include a major identifier and a minor identifier for a control device (e.g., a load control device). The major identifier may include the unique identifier of the corresponding control device and the minor identifier may include the unique identifier for the control device type, or vice versa. The major and minor identifiers may be used in combination to identify the unique identifier of the control device.

The beacons may be transmitted as radio frequency (RF) communication signals. The beacons may be transmitted as short-range RF communication signals. For example, the beacons may be RF signals that are communicated using the BLUETOOTH® communication protocol or the BLUETOOTH® low energy (BLE) communication protocol.

When the beacon is transmitted using an RF communication signal, the beacon may be identified by a device to indicate that the device is within the proximity or location of the beacon transmitting device. The proximity of the device to a beacon transmitting device may be determined by the signal strength at which the RF communication signal of the beacon is received. Though beacons may be described herein as being communicated using the BLUETOOTH® communication protocol, other short-range RF communication protocols may be implemented. For example, beacons may be transmitted using the near field communication (NFC) protocol, WI-FI communication protocol, and/or other RF communication protocols.

The beacons may be transmitted as visible light communication (VLC) signals. Lighting control devices may modulate a lamp, a light-emitting diode (LED), or other visible light source to communicate information for identifying and/or grouping the lighting control devices. When the beacons are transmitted using VLC signals, the beacons may be identified by a device. For example, when lighting control devices transmit beacons using VLC signals, the beacons may be identified by the device. The beacons may be used by the device to indicate that the device is within the proximity or location of the beacon transmitting device (e.g., the lighting control device). The proximity of the device to the beacon transmitting device may be determined in many and various ways. For example, the proximity of the device to the beacon transmitting device may be determined by calculating the distance from the device to the beacon transmitting device. The proximity of the device to the beacon transmitting device may be determined by calculating the distance from the device to the beacon transmitting device, based on the captured image of the beacon transmitting device (e.g., the lighting control device) and/or the known size of the beacon transmitting device (e.g., the lighting control device) from which the device is receiving the VLC signals. Though the beacon may be described herein as being transmitted using VLC signals transmitted from a lighting control device, other control devices may also transmit beacons using VLC signals as described herein, such as motorized window treatments for controlling a window covering material (e.g., a window shade), temperature control devices (e.g., thermostats), and/or sensors (e.g., occupancy sensors, vacancy sensors, daylight sensors, window sensors, etc.), which may include an LED or other visible light source for communicating information via visible light communication.

A load control system may be commissioned by setting up or configuring load control devices for performing load control using beacons. The control devices may be associated with one another and/or a location using beacons, as described herein. Load control devices associated with a location may be implemented for performing load control at the location.

FIG. 1 illustrates a representative load control system 100 for configuring and/or controlling one or more control devices using beacons. The load control system 100 may include a lighting fixture 108 as a representative control-target device capable of controlling a lighting load in response to the received digital messages from control-source devices. A control-source device may be capable of communicating digital messages to a control-target device (e.g., a load control device such as, a lighting control device) via wired and/or wireless signals for controlling an electrical load (e.g., lighting load). Example control-source devices in the load control system 100 may include a system controller 104, a network device 118, an occupancy sensor 144, a remote control device 146, and/or another control-source device capable of communicating digital messages to the lighting fixture 108 for performing control. Though the lighting fixture 108 may be provided as an example control-target device, the load control system 100 may include other control-target devices, such as a motorized window treatment, a temperature control device, and/or a plug-in load control device, for example. Though example control-source devices are illustrated, other control-source devices may be implemented, such as a daylight sensor and/or a window sensor, for example. A single control device of the load control system 100 may be both a control-target and a control-source device. For example, a load control device may operate as a control-target device to receive digital message for controlling an electrical load, and may operate as a control-source device to transmit digital messages to another load control device for controlling an electrical load.

The lighting fixture 108 may include a lighting load (e.g., lamp, LED, etc.) and a lighting control device (e.g., a ballast, an LED driver, etc.) for controlling an amount of power provided to the lighting load. The lighting fixture 108 may include the lighting load and the lighting control device may be external to the lighting fixture 108. The lighting control device in the lighting fixture 108 may be the control-target device for controlling the amount of power provided to the lighting load to control the lighting level. The lighting level may be controlled according to lighting control instructions received from a control-source device.

The amount of power delivered to the lighting load of the lighting fixture 108 may be controlled by the lighting control device of the lighting fixture 108. For example, the amount of power delivered to the lighting load of the lighting fixture 108 may be controlled by the lighting control device of the lighting fixture 108, in response to lighting control instructions received from a control-source device (e.g., the system controller 104, the network device 118, the occupancy sensor 144, the remote control device 146, and/or another control-source device). The lighting level may be controlled according to lighting control configuration information, such as preset configuration, zone configurations, occupancy configuration, and/or timing schedule configuration information that may be stored at the lighting fixture 108 or at the system controller 104.

The occupancy sensor 144 may be a control-source device configured to detect occupancy and/or vacancy conditions in the space in which the load control system 100 is installed. The occupancy sensor 144 may transmit digital messages via the radio frequency (RF) signals 116 in response to detecting the occupancy or vacancy conditions. The RF signals 116 may communicate digital messages via one or more protocols (e.g., standard communication protocols, such as a WI-FI®; WI-MAX®; BLUETOOTH®; NFC; ZIGBEE®, Thread; and/or proprietary communication protocols, such as CLEAR CONNECT™, Z-WAVE). Though FIG. 1 shows the occupancy sensor 144 communicating digital messages via the RF communication signals 116, the occupancy sensor 144 may communicate via a wired communication.

The system controller 104 may be configured to turn the lighting load of one or more lighting fixtures, such as the lighting fixture 108, on and off in response to receiving an occupied signal and a vacant signal, respectively. The occupancy sensor 144 may operate as a vacancy sensor, such that the lighting load of the lighting fixture 108 may be manually turned on by a user and/or automatically turned off in response to detecting a vacancy signal from the sensor (e.g., the lighting load is not turned on in response to detecting an occupancy condition). Examples of load control systems having occupancy and vacancy sensors are described in greater detail in commonly-assigned U.S. Pat. No. 8,009, 042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The remote control device 146 may be a control-source device configured to transmit digital messages to the system controller 104 and/or directly to the lighting fixture 108 via the RF communication signals 116 in response to an actuation of one or more buttons of the remote control device 146. Though FIG. 1 shows the remote control device 146 communicating digital messages via the RF communication signals 116, the remote control device 146 may communicate via a wired communication. The remote control device 146 may be a wall switch, a dimmer switch, or another remote control device for controlling an electrical load.

The system controller 104 may be configured to transmit one or more digital messages to the lighting control device of the lighting fixture 104 in response to the digital messages received from associated control-source devices, such as the remote control device 146, the occupancy sensor 144, the network device 118, and/or another control-source device. The system controller 104 may be in communication with multiple control-target devices (e.g., a group of lighting control devices, a group of motorized window treatments, etc.) and may transmit one or more digital messages to the control-target devices.

The system controller 104 may communicate with the network device 118 directly via wired and/or wireless communications. The system controller 104 may communicate with the network device 118 via a network communication device 106. The network communication device 106 may be a wireless access point, such as a wireless router and/or a modem for example. The network communication device 106 may communicate with the network device 118 via network communication signals 148 (e.g., network communication signals 148 using the WI-FI® protocol, WI-MAX® protocol, etc.) to allow the network device 118 to communicate with other computing devices and/or networks (e.g., via the Internet). The system controller 104 may communicate with the network communication device 106 via the communication link 110, which may be a wired and/or wireless communication link. For example, the wireless communication link may allow the system controller 104 to communicate with the network communication device 106 wirelessly using WI-FI®, cellular, WI-MAX®, BLUETOOTH®, near field communication (NFC), etc. Though the system controller 104 and the network communication device 106 are shown as separate devices in FIG. 1, the network communication device 106 may be included in the system controller 104.

The system controller 104 may communicate with the lighting control device in the lighting fixture 108 via a wired and/or wireless communication. For example, the system controller 104 may communicate with the lighting control device of the lighting fixture 108 via RF communication signals 116. The system controller 104 may communicate with other lighting control devices of lighting fixtures, and/or other load control devices, in the load control system 100.

A network device 118 may be implemented to configure the load control system. For example, the network device 118 may be used to discover and/or associate load control devices (e.g., control-source devices and/or control-target devices) for performing load control. The network device 118 may be a cellular phone (e.g., smart phone), a tablet, a personal digital assistant, a personal computer, a laptop computer, a wearable computing device (e.g., glasses, a watch, a wristband, etc.), or other mobile computing device.

The network device 118 may discover control devices (e.g., control-source devices and/or control-target devices) upon receipt of control device beacons transmitted from the control devices. The control device beacons may be beacons transmitted from the control devices and include a unique identifier that identifies the corresponding control devices (e.g., control-source devices and/or control-target devices). For example, a load control device beacon may include a serial number that corresponds to a respective load control device, a link address for communicating with the load control device, or another unique identifier. The control device beacons may also, or alternatively, include a unique identifier of the device type for the corresponding control device. For example, the control device beacons may include an identifier for lighting control devices, motorized window treatments, temperature control devices, sensors (e.g., occupancy sensors, daylight sensors, window sensors, etc.), remote control devices, and/or other types of control devices.

The control device beacons may be transmitted via RF communication signals 115 and/or RF communication signals 116 (e.g., from the lighting fixture 108, the occupancy sensor 144, the remote control device 146, and/or another type of load control device). The RF communication signals 115 and 116 may be wireless communication signals that communicate via a wireless communication protocol (e.g., via a standard protocol, such as WI-FI®, BLUETOOTH®, near field communication (NFC); and/or via a proprietary protocol, such as Clear Connect®). The RF communication signals 115 and the RF communication signals 116 may be of a different signal type (e.g., protocol, bandwidth, etc.). For example, the RF communication signals 115 may be communicated via BLUETOOTH® low energy (BLE) or another short-range wireless communication protocol, while the RF communication signals 116 may include a proprietary protocol (e.g., Clear Connect®, or other proprietary communication protocol) that may be used for communications between control devices (e.g., control-target devices and control-source devices).

The RF communication signals 115, 116 may be communicated via a communication circuit (e.g., transceiver) in the respective control devices, or via a separate beacon transmitting device. The beacon transmitting devices for a control device may be included in, or nearby, the control device for indicating a relative location of the corresponding control device by transmitting control device beacons. The RF communication signals 116 may be communicated via the same communication circuit as the RF communication signal 115 or a different communication circuit.

Figure 2:
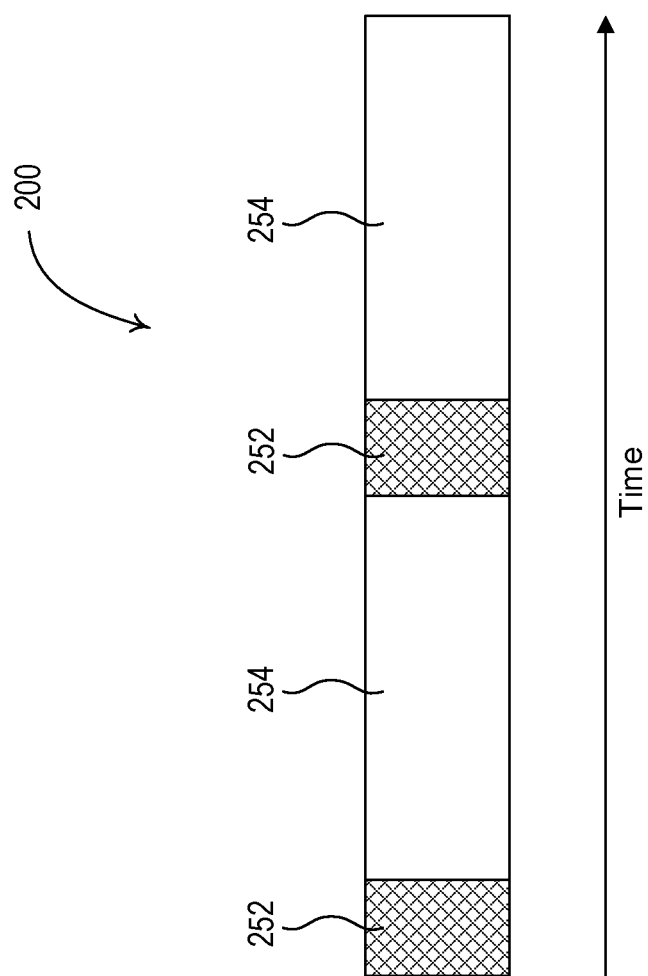
FIGS. 2, 3, and 4 are block diagrams illustrating example timelines in which control devices may switch communication protocols when configuring and/or controlling one or more control devices in a load control system, such as the lighting control system of FIG. 1.
Figure 3:
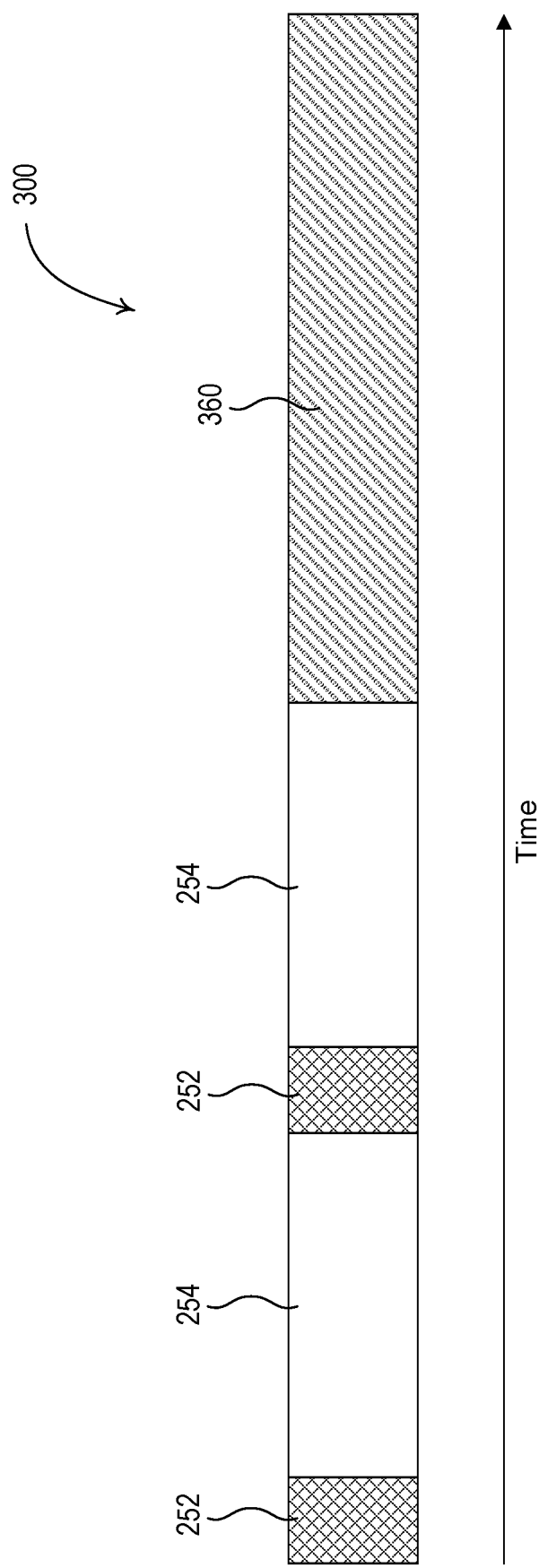
Figure 4:
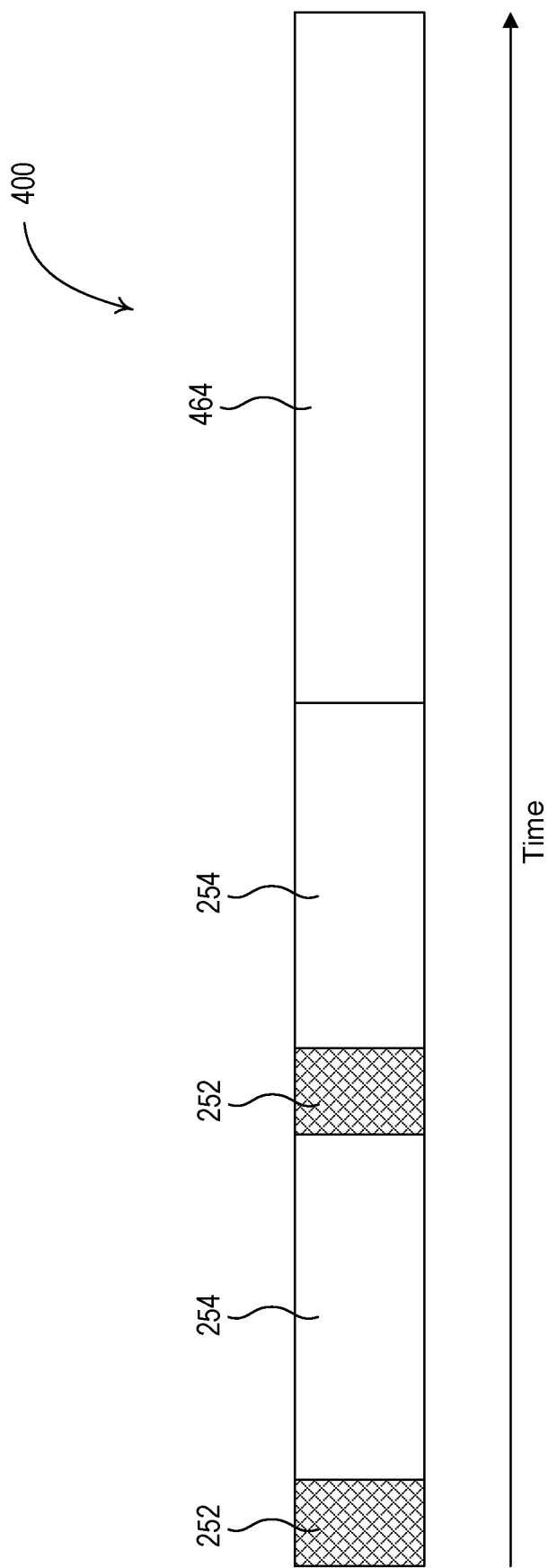

FIGS. 2, 3, and 4 are timing diagrams illustrating example communication modes in which a control device (e.g., system controller, control-source device, and/or control-target device) and/or the beacon transmitting device may communicate over a period of time when commissioning and/or controlling the load control system 100. For example, using a periodic beacon communication mode (as illustrated in timing diagram 200 shown in FIG. 2), the control device and/or the beacon transmitting device may transmit messages during a beacon signal transmission time period 252 and/or a load control communication time period 254. During the beacon signal transmission time period 252, the control device and/or the beacon transmitting device may transmit one or more beacon signals (e.g., using one or more protocols, such as the BLUETOOTH® protocol, the BLUETOOTH® low energy beacon protocol, VLC protocol, etc.). During the load control communication time period 254, the control device and/or the beacon transmitting device may transmit and/or receive messages on the same or another communication protocol (e.g., a standard protocol, such as the BLUETOOTH® two-way communication protocol; a proprietary communication protocol, such as the Clear Connect® protocol; etc.). When the control device and/or the beacon transmitting device operates in the load control communication time period 254, the control device and/or the beacon transmitting device may transmit and/or receive commands (e.g., commands that include load control instructions and/or association instructions) for performing operations in the load control system 100.

The control device and/or the beacon transmitting device may provide one-way communication during the beacon signal transmission time period 252. For example, during the beacon signal transmission time period 252, the control device and/or the beacon transmitting device may transmit digital messages which may include identification information of the control device and/or the beacon transmitting device. The digital messages may include a location associated with the control device and/or the beacon transmitting device. During the load control communication time period 254, the control device and/or the beacon transmitting device may transmit and/or receive digital messages. For example, during the load control communication time period 254, the control device and/or the beacon transmitting device may transmit and/or receive messages so that the association of the control devices may be performed. Though FIG. 2 shows a number of transitions between the beacon signal transmission time period 252 and the load control communication time period 254, any number of transitions may be performed.

The control device and/or the beacon transmitting device may switch between time periods automatically. For example, the control device and/or the beacon transmitting device may periodically switch from the beacon signal transmission time period 252 to the load control communication time period 254. The control device and/or the beacon transmitting device may switch from the load control communication time period 254 to the beacon signal transmission time period 252 so that the control device and/or the beacon transmitting device may transmit beacon signals and the association of the control devices may be performed. For example, the control device and/or the beacon transmitting device may switch from the load control communication time period 254 to the beacon signal transmission time period 252 so that one or more control devices may be associated with one or more other devices (e.g., system controllers, remote control devices, etc.). After configuration of the load control system has been completed, the control device and/or the beacon transmitting device may switch from the load control communication time period 254 to the beacon signal transmission time period 252 so that control devices may transmit beacon signals to allow for control of the load control system has completed.

In an example, the control device and/or the beacon transmitting device may communicate via a protocol (e.g., the BLUETOOTH® low energy protocol) during the beacon signal transmission time period 252 and may return to the protocol (e.g., the Clear Connect® protocol) being used during the load control communication time period 254. The beacon signal transmission time period 252 and the load control communication time period 254 may be configurable. For example, the network device 118 may receive an indication of a change to the beacon signal transmission time period 252 and/or the load control communication time period 254. The indication of the change to the beacon signal transmission time period 252 and/or the load control communication time period 254 may be communicated (e.g., directly or via the system controller) to the control device and/or the beacon transmitting device.

The control device and/or the beacon transmitting device may switch from the beacon signal transmission time period 252 to the load control communication time period 254 (and vice-versa), based on an instruction. The instruction may be from a network device 118 (e.g., upon receipt of a button press on the network device 118). The instruction may be performed by one or more devices. For example, the control device and/or the beacon transmitting device may switch from the beacon signal transmission time period 252 and/or the load control communication time period 254, based on an instruction from another control device (e.g., system controller 104, control-source device, and/or control-target device).

FIG. 3 shows a timing diagram 300 in which the control device and/or the beacon transmitting device may switch between a periodic beacon communication mode and a continuous two-way configuration mode. While operating in the periodic beacon communication mode, the control device and/or the beacon transmitting device may transmit messages during a beacon signal transmission time period 252 and a load control communication time period 254 (e.g., as also shown in FIG. 2). The control device and/or the beacon transmitting device may transmit one or more beacons via one or more protocols (e.g., a BLUETOOTH® low energy protocol, VLC protocol, etc.) within the beacon signal transmission time period 252. The control device and/or the beacon transmitting device may transmit and/or receive communications in the same protocol or another protocol during the load control communication time period 254.

The control device may transition to the continuous two-way configuration mode, in which the control device may transmit messages during a continuous two-way configuration time period 360. The continuous two-way configuration time period 360 may be a dedicated two-way communication mode for transmitting and receiving digital messages, or a dedicated one-way communication mode for transmitting or receiving digital messages. For example, while in the continuous two-way configuration time period 360, the control device may send and/or receive digital messages via the BLUETOOTH® protocol, the BLUETOOTH® low-energy protocol, the NFC protocol, the WI-FI® protocol, the ZIGBEE® protocol, etc. During the continuous two-way configuration time period 360, the control device and/or the beacon transmitting device may communicate using the same protocol as used during the beacon signal transmission time period 252, or a protocol that is different than the protocol used during the beacon signal transmission time period 252. The control device and/or the beacon transmitting device may switch from the periodic beacon communication mode to the continuous two-way configuration mode so that the control devices may be configured (e.g., after association is completed). For example, the control device and/or the beacon transmitting device may switch from the periodic beacon communication mode to the continuous two-way configuration mode so that the operational settings (e.g., high-end trim, low-end trim, fade rates, etc.) of the control device may be configured.

The control device and/or the beacon transmitting device may switch to the continuous two-way configuration mode, based on a time and/or based on an instruction (e.g., an instruction received during the load control communication time period 254 or an additional time period immediately following the beacon signal transmission time period 252). The instruction may be received from the network device 118 and/or from one or more other devices. The instruction from the network device 118 may be in response to a beacon signal received by a control device. For example, after the network device 118 receives the beacon signal, the network device 118 may display a beacon detection screen. A background application of the network device 118 may be displayed in the foreground of the network device 118 as a beacon detection screen. An encrypted passcode that corresponds to the control device sending the beacon may be determined. For example, the network device 118 may determine an encrypted passcode that corresponds to the control device that sent the beacon. The network device 118 may use the unique identifier of the control device, received within the beacon, to determine the corresponding passcode. For example, the network device 118 may use a lookup table and the unique identifier of the control device to determine the passcode.

The control device may receive a scan request directly from the network device 118 and/or the control device may receive the scan request via an intermediary device (e.g., a system controller, such as system controller 104). The scan request may include encrypted passcode information, based on the unique identifier provided by the control device. The control device may determine whether the received encrypted passcode is correct. If the control device determines that the encrypted passcode is correct, the control device may switch to the continuous two-way configuration time period 360. The continuous two-way configuration time period 360 may be a dedicated BLUETOOTH® low-energy mode, for example, in which the control device may communicate using the BLUETOOTH® low-energy protocol. The BLUETOOTH® low-energy protocol may be a two-way communication protocol. For example, the control device may receive digital messages via the BLUETOOTH® low-energy protocol and/or send digital messages via the BLUETOOTH® low-energy protocol, if the control device is communicating using the two-way communication protocol.

Though FIG. 3 shows an example transition between the periodic beacon transmission mode (e.g., including the beacon signal transmission time period 252 and the load control communication time period 254) and the continuous two-way configuration mode (e.g., including the continuous two-way configuration time period 360), any number of transitions may be performed. For example, the control device may transition back to the periodic beacon transmission mode after the continuous two-way configuration mode, such that the beacon signal transmission time period 252 and the load control communication time period 254 may occur after the continuous two-way configuration time period 360.

The control device and/or the beacon transmitting device may operate in an association mode during the configuration of the load control system. For example, the system controller 104 may cause the control device and/or the beacon transmitting device to operate in an association mode of operation during the configuration procedure of the load control system. The system controller 104 may cause the control device to operate in the association mode of operation after an association procedure of the control device capable of transmitting beacon signals. The association procedure may include the system controller 104 receiving information (e.g., location, identifiers, etc.) of the load control devices to access and/or control the associated load control devices. The network device 118 may send digital messages via the system controller 104 to control the load control devices associated with the unique identifier. For example, the system controller 104 may transmit a digital message to the control device to cause the control device to enter the association mode of operation after the association procedure. The control device may cease transmitting beacon signals and/or transmit the beacon signals at a lower power level in the association mode of operation, for example, to consume less power and/or reduce RF traffic on the short-range RF communication link. Ceasing to transit the beacon signals and/or transmitting the beacon signals at a lower power level may hinder the network device 118 from hearing the beacon signals from that control device. For example, ceasing to transit the beacon signals and/or transmitting the beacon signals at a lower power level may hinder the network device 118 from hearing the beacon signals from that control device while trying to associate other control devices during the configuration procedure.

FIG. 4 shows a timing diagram 400 in which the control device and/or the beacon transmitting device may switch between a periodic beacon communication mode and a continuous two-way control mode. While operating in the periodic beacon communication mode, the control device and/or the beacon transmitting device may transmit messages during a beacon signal transmission time period 252 and a load control communication time period 254. The control device may transition to the continuous two-way control mode, in which the control device may transmit messages during a continuous two-way control time period 464. The control device and/or the beacon transmitting device may transition to the continuous two-way control mode so that the control devices may be controlled (e.g., controlled via the system controller 104 and/or the network device 118) after the association procedure is completed. The control device and/or the beacon transmitting device may communicate in the same protocol during the load control communication time period 254 and during the continuous two-way control time period 464. For example, during the continuous two-way control time period 464, the control device and/or the beacon transmitting device may send and/or receive digital messages via an RF protocol (e.g., a standard RF protocol, such as NFC, WI-FI, ZIG-BEE®; and/or a proprietary RF protocol, such as the Clear Connect® protocol, etc.).

The control device and/or the beacon transmitting device may switch to the continuous two-way control mode, based on a time and/or based on an instruction (e.g., received during the load control communication time period 254 or during the continuous two-way configuration time period 360 shown in FIG. 3). The instruction may be from the network device 118 and/or from one or more other devices. The instruction from the network device 118 may be in response to a beacon signal received by a control device. For example, after the network device 118 receives the beacon signal, the network device 118 may display a beacon detection screen. A background application of the network device 118 may be displayed in the foreground of the network device 118 as a beacon detection screen. An encrypted passcode that corresponds to the control device sending the beacon may be determined. For example, the network device 118 may determine an encrypted passcode that corresponds to the control device that sent the beacon. The network device 118 may use the unique identifier of the control device, received within the beacon, to determine the corresponding passcode. For example, the network device 118 may use a lookup table and the unique identifier of the control device to determine the passcode.

The control device may receive a scan request directly from the network device 118 and/or the control device may receive the scan request via an intermediary device (e.g., a system controller, such as system controller 104). The scan request may include encrypted passcode information, based on the unique identifier provided by the control device. The control device may determine whether the received encrypted passcode is correct. If the control device determines that the encrypted passcode is correct, the control device may switch to the continuous two-way control mode 464. The continuous two-way control mode 464 may be a dedicated ClearConnect® mode. For example, the control device may switch its mode to a ClearConnect® mode that communicates using the ClearConnect® protocol. While in the ClearConnect® mode, the control device may communicate with one or more other control devices that communicate via the ClearConnect® protocol. The control device may switch between a BLUETOOTH® low-energy protocol and a ClearConnect® protocol.

Though FIG. 4 shows an example transition between the periodic beacon transmission mode (e.g., including the beacon signal transmission time period 252 and the load control communication time period 254) and the continuous two-way control mode (e.g., including the continuous two-way control time period 464), any number of transitions may be performed. After the continuous two-way configuration time period 360 (in FIG. 3), the control device and/or the beacon transmitting device may transition to the periodic beacon communication mode (e.g., including the beacon signal transmission time period 252 and the load control communication time period 254) as shown in FIG. 2, and/or the control device and/or the beacon transmitting device may transition to the continuous two-way control mode (e.g., including the continuous two-way control time period 464) as shown in FIG. 4. After the continuous two-way control time period 464 (in FIG. 4), the control device and/or the beacon transmitting device may transition to the periodic beacon communication mode (e.g., including the beacon signal transmission time period 252 and the load control communication time period 254) as shown in FIG. 2, and/or the control device and/or the beacon transmitting device may transition to the continuous two-way configuration mode (e.g., including the continuous two-way configuration time period 360) as shown in FIG. 3.

Referring again to FIG. 1, the control device beacons may be transmitted as VLC signals 114. The network device 118 may include a camera 120 for receiving the VLC signals 114. Though the camera 120 is shown in FIG. 1, the network device 118 may include a visible light sensor, a photo sensor, or other device for recognizing the VLC signals 114. The network device 118 may be placed under the lighting fixture 108 or in another position (e.g., facing the lighting fixture 108) that allows the network device 118 to receive the VLC signals 114 transmitted from the lighting fixture 108. The VLC signals 114 may be transmitted at a rate identifiable by a camera. The VLC signals 114 may be modulated faster than visible to the human eye.

The lighting control device of the lighting fixture 108 may control the amount of power provided to the lighting load (e.g., in response to instructions from the system controller 104 or another control-source device) to generate the VLC signals 114. The VLC signals 114 may be free-space optical communications. The VLC signals 114 may be generated by a modulation of the amount of light provided by the lighting load of the lighting fixture 108. The lighting control device of the lighting fixture 108 may operate as a beacon transmitting device by modulating the light emitted by the lighting fixture to transmit the VLC signals 114. For example, the lighting control device of the lighting fixture 108 may quickly turn the lighting loads of the lighting fixture on and off and/or increase and decrease the intensity level of the lighting loads to modulate the light emitted the lighting fixture. Though FIG. 1 shows the lighting fixture 108 transmitting the beacon via the VLC signals 114, other control devices (e.g., control-source devices and/or control-target devices) may communicate beacons via visible light communication. For example, the control devices may include an LED and may operate as a beacon transmitting device to modulate the light emitted by the LED to communicate the VLC signals 114.

The load control system 100 may include one or more beacon transmitting devices that may also, or alternatively, be location beacon transmitting devices. In an example, the beacon transmitting device (e.g., the location beacon transmitting device) may be located at a work station 121. The location beacon transmitting device may communicate a beacon (e.g., a location beacon) via RF communication signals 115, 116 and/or visible light communication signals 114. The location beacon transmitting device may also, or alternatively, transmit the beacon via an audio signal. The beacon transmitted by the location beacon transmitting device may include a beacon that communicates a unique identifier. The beacon may be associated with a location at which the location beacon transmitting device resides, such as the work station 121, an office, a conference room, a portion of an office or conference room, or another location.

The beacon transmitted by the location beacon transmitting device may include a unique identifier that the network device 118 and/or the system controller 104 may associate with a physical location at which the location beacon transmitting device resides, such as the work station 121, an office, a conference room, a portion of an office or conference room, or another location. For example, the network device 118 may discover the beacon transmitted from the location beacon transmitting device and the user may select the physical location from a user interface on a display 122 of the network device 118 to associate the selected physical location with the unique identifier in the beacon. The physical location may be selected from a floor plan 124 of a building, for example. If multiple location beacons are discovered, the user may associate the unique identifier of the beacon with the greatest signal strength to the closest physical location. The physical location may also, or alternatively, be determined from the geolocation of the network device 118.

The network device 118 may discover the beacon transmitted by the location beacon transmitting device for configuring and/or controlling one or more control devices in the load control system. For example, the network device 118 may discover the beacon transmitted by the location beacon transmitting device and may associate the unique identifier of the beacon with the unique identifier discovered in one or more control device beacons (e.g., beacons transmitted by control devices). The unique identifier of the control devices that transmitted the control device beacons may be associated with the unique identifier of the beacon transmitted by the location beacon transmitting device, such that when the beacon transmitted by the location beacon transmitting device is discovered by network devices the network devices may access and control the control devices in the location.

The location beacon transmitting device and/or the control device may transmit a beacon and/or control device beacons, respectively, based on a periodic and/or in response to a triggering event. A digital message (e.g., sending a digital message, such as via network communication signals 148 and/or RF communication signals 115, 116) may be the triggering event. The digital message may be sent to the system controller 104. The triggering event may be sent in a digital message from the network device 118 or another device (e.g., remote control device 146, occupancy sensor 144, or another control-source device). The system controller 104 may automatically control the communication of the beacons based on a periodic.

The system controller 104 may communicate with the network device 118 and/or the load control devices for commissioning and/or controlling the load control system 100. As described herein, control devices may be associated with a location. For example, unique identifiers of control devices may be associated with a unique identifier of a location, via a beacon (e.g., a location beacon). The association of the control devices and the unique identifier of the location may be stored at the system controller 104. The network device 118, and/or other network devices, may discover the beacon (e.g., location beacon) and may send the unique identifier of the beacon to the system controller 104 to access and control the associated control devices within a proximity of the location. The network device 118 may send digital messages via the system controller 104 to control the control-target devices (e.g., the lighting fixture 108) associated with the unique identifier within a proximity of the beacon transmitted by the location beacon transmitting device. The network device 118 may also, or alternatively, discover control device beacons of control-source devices for being associated with the control-target device for enabling load control.

The network device 118 may interpret the information of the beacons and/or the network device 118 may send the information to another device for interpretation. For example, the network device 118 may send the information received in the beacons to the system controller 104 for interpreting the information.

In regards to the VLC signals 114, the lighting fixture 108 may transmit the visible light communication signals (e.g., as modulated signals) when the lighting fixture is on. The lighting control device of the lighting fixture 108 may modulate the lighting load by increasing and decreasing an amount of power provided to the lighting load to transmit the visible light communications 114. For example, the lighting fixture 108 may turn the lighting load on and off, increase and decrease the dimming level of the lighting load, or some combination thereof.

The network device 118 and/or the system controller 104 may identify the unique identifiers in the VLC signals 114 by identifying when the lighting level of the lighting load is above or below different threshold lighting levels. For example, the network device 118 and/or the system controller may determine when the lighting level of a lighting load is above and below a threshold lighting level in an image or video captured by the camera 120 to identify the information being communicated in the VLC signals 114. The system controller 104 may send the interpreted information back to the network device 118, if the system controller 104 is implemented for performing the identification.

The VLC signals 114 may be used to verify the unique identifier communicated in the RF communication signal 115, or vice versa. The VLC signals 114 may be used to verify the unique identifier communicated in the RF communication signal 115 transmitted by the location beacon transmitting device 119, or vice versa. If other types of beacons are used they may also, or alternatively, be used as a form of verification for the unique identifier of another type of beacon. The network device 118 and/or the system controller 104 may verify the unique identifier transmitted in different types of beacons transmitted for the same device before performing association with the unique identifier.

The beacon (e.g., location beacon, control device beacon, etc.) may be a short-range RF communication signal that may be transmitted via one or more protocols (e.g., BLUETOOTH® low energy (BLE) signal, near field communication (NFC) signal, etc.), which may result in the beacon being transmitted through a surrounding structure (e.g., the walls of a building). If the network device 118 receives the location beacon from an adjacent room, the system controller 104 may determine (e.g., mistakenly determine) that the beacon transmitting device 119 is in the adjacent room.

To provide additional verification capabilities when commissioning and/or controlling the load control system 100, a verification signal may be transmitted via a wireless medium. The verification signal may be transmitted via a wireless medium that is different than the location beacon. For example, the verification signal may be a visible light communication signal 114 and/or an acoustic signal. For example, the VLC signals 114 and/or the acoustic signal may be hindered by a surrounding structure (e.g., the walls of the building). As such, surrounding structures may reduce or prevent VLC signals 114 and/or an acoustic signals from traveling beyond a surrounding structure. For example, a wall positioned between adjacent rooms may reduce or prevent VLC signals 114 and/or acoustic signals from traveling (e.g., being received, such as mistakenly received) from one room to another room. Thus, VLC signals 114 and/or acoustic signals may be used to verify that a location beacon received within a room was transmitted from within that room. For example, VLC signals 114 and/or acoustic signals may be used to verify that a location beacon received within a room was intended to be received within that room. The verification signal may be transmitted by the beacon transmitting device 119 and/or by a control device (e.g., a lighting load). Though the VLC signal and the acoustic signal are described as being verification signals, the RF beacon signal may verify the location being identified primarily in the VLC signal and/or the acoustic signal. The VLC signals 114 may be used to broadcast information other than unique identifiers.

Where different types of information may be communicated in the VLC signals 114, the digital message including the triggering event for the VLC signals 114 may identify the type of information to be communicated in the VLC signals 114 (e.g., network identifier information, device identifier, link address, etc.). The broadcast of the VLC signals 114 for communicating information via a network may be referred to as Li-Fi. The VLC signals 114 may be used to broadcast wireless network communication information to the network device 118. The wireless network communication information may be used by the network device 118 to identify and/or establish a wireless local area network connection (e.g., WI-FI® connection). The wireless network communication information transmitted in the VLC signals 114 may include a network identifier that identifies the wireless local area network. The network identifier may include the device identifier (e.g., identifier name, number, etc.) of the system controller 104, for example. The network device 118 may identify the wireless local area network from the wireless network communication information.

The wireless network communication information communicated in the VLC signals 114 may include internet protocol (IP) addresses, media access control (MAC) addresses, or other identifiers for communicating on a wireless local area network. The network communication device 106 may establish an IP address and/or a MAC address for the network device 118 to communicate on the wireless local area network with the system controller 104, either directly or via the network communication device 106. The network communication device 106 may assign the IP address and/or the MAC address upon request from the system controller 104 and/or the network device 118. The IP address and/or the MAC address for the network device 118 may be communicated to the network device 118 via the VLC signals 114 (e.g., in the absence of an established WI-FI® network). The network device 118 may use the IP address and/or the MAC address to send digital messages on the wireless local area network via the network communication signals 148.

The network communication device 106 may establish a service set identifier (SSID) and/or a network password for enabling communication on the wireless local area network via the network communication device 106. The SSID and/or the network password may be communicated to the system controller 104 and/or the network device 118 upon request. The SSID and/or the network password may be communicated to the network device 118 via the VLC signals 114. The network device 118 may transmit the SSID and/or the network password to the network communication device 106 for logging on to the wireless local area network and enabling the network device 118 to send digital messages via the network communication signals 148.

The beacons (e.g., RF communication signals 115, 116 and/or \TLC signals 114) may be used to broadcast a link address assigned to load control devices (e.g., a lighting control device or a group of lighting control devices) in the load control system 100. For example, the lighting control device in the lighting fixture 108 may be assigned a link address by system controller 104. The link address may be a unique address (e.g., serial number) assigned to the lighting control device of the lighting fixture 108 for communicating digital messages to the lighting control device of the lighting fixture 108. The digital messages may be communicated to the lighting control device of the lighting fixture 108 to control the lighting level (e.g., light intensity level) of the lighting fixture 108. The link address assigned to the lighting control device of the lighting fixture 108 may be stored at the lighting control device and may be used by the lighting control device of the lighting fixture 108 to identify the digital messages received from the system controller 104. The system controller 104 may use the link address to send digital messages to the lighting control device of the lighting fixture 108. The digital messages may be used by the lighting control device to control the amount of power provided to the lighting load of the lighting fixture 108. Though the lighting control device of the lighting fixture 108 is used as an example device for which a link address may be assigned, the link address may be assigned to other load control devices, or groups of load control devices, such as motorized window treatments, temperature control devices (e.g., thermostats), and/or plug-in load control devices, for example.

As the link address may be randomly assigned to a lighting control device (e.g., by the system controller 104 after installation), the physical location of the lighting fixture 108 having an assigned link address may be unknown and/or unassociated with the link address. One or more lighting control device, or group of lighting control devices, may be assigned a lighting control device identifier (e.g., before or after installation) that may identify the physical lighting control device or lighting fixture to a user. The physical location of the devices may be known to a user. The visible light communication signals 114 and/or the RF communication signals 115, 116 may be used to associate the link address for the lighting fixture 108, or a group of lighting fixtures, with the device identifier of the lighting fixture 108, or group of lighting fixtures, in an identified location. The network device 118 may identify the link address of the lighting control device of the lighting fixture 108 based on the beacon and the identified link address may be associated with the lighting control device identifier of the light fixture 108, or a group of light fixtures that include the lighting fixture 108, at a given location. The associated device identifier and link address may be stored at the network device 118 and/or sent to the system controller 104 for being stored thereon.

To determine the link address assigned to the lighting control device of the lighting fixture 108, the system controller 104 may instruct the lighting control device of the lighting fixture 108 to identify the link address assigned thereto in a beacon. For example, the system controller 104 may instruct the ballast or the LED driver of the lighting fixture 108 to reveal itself via the visible light communication 114 and/or the RF communication signals 115, 16. The system controller 104 may make a similar request to other lighting control devices of other lighting fixtures in the load control system 100. The request may be sent as a broadcast message to the control devices in communication with, or connected to, the system controller 104. The request from the system controller 104 may be sent in response to a request from the network device 118. For example, a user may actuate a button on the network device 118 that transmits a digital message to the system controller 104 requesting the identification of the link address via one or more beacons. The system controller 104 may also, or alternatively, send the request for the identification of the link address automatically.

The link address may be communicated at predetermined times or anytime light is being provided by the lighting fixture 108. The network device 118 may discover the beacons being transmitted and may identify the link address. The network device 118 may identify the link address locally or may communicate the information in the beacons to the system controller 104, or other remote computing device, for identifying the link address.

Control-source devices may communicate directly with one or more lighting fixtures via RF communication signals 116. For example, the system controller 104, the remote control device 146, and/or the occupancy sensor 144 may send a request for the VLC signals 114 and/or RF communication signals 115, 116 via the RF communication signals 116. The RF communication signals 116 may be of a different signal type (e.g., protocol, bandwidth, etc.) than the network communication signals 148. Control-source devices may send a request to multiple control-target devices via a broadcast message. The broadcast message may cause any control-target device that receive the message to transmit a beacon that includes identification information.

As described herein, the beacons (e.g., RF communication signals 115, 116 and/or VLC signals 114) may be used to broadcast a link address assigned to load control devices (e.g., a lighting control device or a group of lighting control devices) in the load control system 100. The link address may be detected via the beacons. For example, the network device 118 may detect RF communication signals 115, 116 for detecting the link address of the lighting control device for communicating with the lighting fixture 108. The camera 120 of the network device 118 may be pointed at the VLC signals 114 for detecting the link address of the lighting control device for communicating with the lighting fixture 108. The detected link address of the lighting control device may be associated with the device identifier of a lighting control device installed at an identified location and the association may be stored at the network device 118. The association may be sent to the system controller 104, other control-source devices (e.g., remote control device 146, occupancy sensor 144, etc.) and/or one or more lighting fixtures for storage. The stored association may be used to identify the lighting control device for being controlled in digital messages. The control-source devices (e.g., system controller 104, remote control device 146, occupancy sensor 144, etc.) may use the associated link address to send control instructions to the associated lighting control device. Control-source devices (e.g., remote control device 146, occupancy sensor 144, etc.) may communicate digital messages to the system controller 104 for controlling an electrical load and the system controller 104 may determine the load control instructions from the digital message and use the link address to communicate the load control instructions to the control-target devices.

The detected link address in the visible light communication signals 114 and/or the RF communication signals 115, 116 may be associated with the device identifier of a lighting control device identified by a user on a user interface 122 displayed on the network device 118. For example, the physical location of the lighting fixture 108 may be identified on the user interface 122. The user interface 122 may be generated locally by the network device 118 or may be generated at a remote device (e.g., the system controller 104) and displayed on the network device 118 (e.g., via a web browser or other application). The user interface 122 may display a floor plan 124 of a building. The floor plan 124 may include rooms of a building, such as the room 126, for example. The floor plan 124 may include one or more icons, such as the icon 130 that may represent the physical location of lighting fixtures, such as the lighting fixture 108. The floor plan may show the locations of the lighting fixtures as they relate to one another (e.g., the relative positions of the lighting fixtures). The network device 118 and/or the system controller 104 may have stored thereon a location of one or more of the lighting fixtures in the floor plan 128. The location may be determined during commissioning. For example, a user may enter a location (e.g., identified in a floorplan), discover the appropriate devices in the location, and store the discovered devices with an identifier of the location.

The user of the network device 118 may select the icon that corresponds to the location of a lighting fixture to assign the identified link address to the device identifier of the identified lighting fixture. For example, the user may identify the icon 130 as the icon in the physical location of the lighting fixture 108 from which the visible light communication signal 114 and/or the RF communication signal 115 is received. The network device 118 may associate the link address identified in the VLC signal 114 and/or the RF communication signal 115 with the device identifier of the lighting control device in the lighting fixture 108 residing in the physical location identified by the icon 130. The VLC signal 114 and/or the RF communication signal 115 may be received before the selection of the icon 130 or after the selection of the icon 130 to associate the link address in the VLC signal 114 and/or the RF communication signal 115 with a device identifier of the load control device that corresponds to the selected icon. The associated link address and/or the device identifier of the lighting control device may be stored and may be used for controlling the lighting control device of the lighting fixture 108. The network device 118 may also, or alternatively, send the information in the VLC signal 114 and/or the RF communication signal 115 and the device identifier of the selected icon to the system controller 104 for association and storage. The associated link address and the device identifier may be communicated to the system controller 104 and/or the lighting fixture 108 for being stored therein for controlling the lighting control device of the lighting fixture 108.

The user of the network device 118 may select a group of icons that correspond to the link address received in the visible light communication signal 114 and/or the RF communication signal 115 to assign the link address to a group of identified lighting fixtures. The network device 118 may associate the link address identified in the visible light communication 114 and/or the RF communication signal 115 with the device identifiers of the lighting control devices in the group of lighting fixtures residing in the physical location identified by the selected icons. The associated link address and the device identifiers of the group of lighting control devices may be stored and may be used for controlling the lighting control device of the lighting fixture 108. The network device 118 may also, or alternatively, send the information in the VLC signal 114 and/or the RF communication signal 115 and the device identifiers of the selected icons to the system controller 104 for association and storage.

The physical location of the network device 118 may be used to identify the lighting fixture 108 from which the identified link address is being broadcast. For example the network device 118 may use location information to identify the location of the network device 118. The location information may be determined using GPS coordinates and/or WI-FI®-based positioning information. The WI-FI®-based positioning information may indicate the position of the network device 118 based on the distance of the network device 118 from one or more wireless access points (e.g., network communication device 106). The distance of the network device 118 from the wireless access points may be determined by measuring the power of the received signal (e.g., received signal strength indicator (RSSI)) from the wireless access points.

The location information may include images captured by the camera 120 that may indicate the location of the network device 118. The images captured by the camera 120 may be part of a video or series of photos that may indicate a location of the network device 118. The network device 118 may recognize the location, or relative location, of the user based on the images.

A physical location icon 128 may be generated from the location information and may be displayed on the user interface 122 of the network device 118. The physical location icon 128 may provide a user with an indication of the location of the network device 118 relative to the lighting fixtures in the room 126. The physical location icon 128 may identify a direction that the network device 118 is facing (e.g., using an arrow) to provide a user with an indication of the direction of the lighting fixtures in the room 126 relative to the network device 118. The display of the physical location icon 128 may assist the user in identifying the physical location of one or more lighting control fixtures in a space.

The network device 118 may automatically associate the link address with a device identifier of a lighting control device. For example, the network device 118 may read the VLC signal 114 and may associate the link address in the VLC signal 114 with the device identifier of the closest relative lighting fixture in the floor plan 124. The network device 118 may read the VLC signal 114 and may associate the link address in the VLC signal with the device identifiers of the closest relative group of lighting fixtures in the floor plan 124, such as the lighting fixtures in the room 126 for example. The network device 118 may identify one or more lighting fixtures that have a location within a predefined range of the location of the network device 118. The network device 118 may associate the link address with the device identifier of one or more identified lighting fixtures.

The network device 118 may communicate the associated device identifier and the link address to the system controller 104 for storage. The network device 118 may also, or alternatively, send to the system controller 104 the information in the VLC signals 114 and the location information that indicates the location of the network device 118. The system controller 104 may determine the closest relative lighting control device or group of lighting control devices and may associate the device identifier in the VLC signals with the closest relative lighting control device or group of lighting control devices. The system controller 104 may identify one or more lighting fixtures that have a location within a predefined range of the location of the network device 118. The system controller 104 may associate the link address with the device identifier of one or more lighting fixtures within the predefined range.

The network device 118 may receive a list of link addresses from the system controller 104. The network device 118 may use the list of link addresses to identify the link address in the VLC signal 114 and/or the RF communication signal 115 or confirm the identified link address is a link address assigned by the system controller 104. When the network device 118 is capable of communicating with multiple system controllers 104, the network device 118 may use the list of link addresses for a system controller to determine the system controller to which the associated link address and device identifier should be communicated. The network device 118 may determine a physical location of the network device 118. The network device 118 may communicate the identified link address and the physical location of the network device 118 to the system controller 104 from which the link address was previously received. The network device 118 may communicate the identified link address and the physical location of the network device 118 to the system controller 104 for associating the link address with a device identifier of the lighting fixture, or group of lighting fixtures, closest to the identified location of the network device 118. The associated link address may be used by the system controller 104 to communicate lighting control instructions to the appropriate lighting fixture for performing lighting control.

The network device 118 may control one or more lighting fixtures in response to the received beacons. The beacons may include the link address or device identifier of the lighting fixture 108, which may be read by the network device 118. The network device 118 may communicate a digital message that includes lighting control instructions for controlling the lighting fixture 108 identified by the beacons. The network device 118 may identify multiple lighting fixtures for being controlled that are transmitting the beacons. The digital message may be communicated to the system controller 104 for controlling the lighting fixtures identified in the beacons.

The network device 118 may receive user input via the user interface 122. The network device 118 may interpret user input as control instructions. The network device 118 may include the control instructions in the digital messages for controlling the lighting fixtures. For example, the network device 118 may include a virtual dimmer 132. The user may raise or lower the dimming level on the virtual dimmer 132 to send digital messages for increasing or decreasing, respectively, the dimming level on the lighting fixture 108 identified by the beacons. The user may turn on or off the lighting load of the lighting fixture 108 identified by the beacons using the user interface 122. The user may completely lower the dimming level of the virtual dimmer 132, or lower the dimming level to a predefined level, to turn the lighting load off. The user may raise the dimming level (e.g., above the predefined level set for turning the lighting load off) to turn the lighting load on. The user interface 122 may include an on button, an off button, and/or an on/off button that may turn the lighting load on/off upon actuation. The lighting load may be turned on to a predefined dimming level upon actuation of a button to turn on the lighting load.

The network device 118 and/or the system controller 104 may "snap" to (e.g., lock onto) a beacon transmitted by the control device and/or the beacon transmitting device when commissioning and/or controlling the load control system 100. When the network device 118 and/or the system controller 104 snaps to a beacon, the network device 118 and/or the system controller 104 may reserve access (e.g., link) for communicating with a control device and/or the beacon transmitting device transmitting the beacon. For example, snapping to a beacon signal may cause the network device 118 and/or the system controller 104 to link to and/or pair to (e.g., virtually link to and/or pair to) the control device that is transmitting the beacon. The network device 118 and/or the system controller 104 may receive beacons from one or more control devices and/or beacon transmitting devices when commissioning and/or controlling the load control system 100. The network device 118 and/or the system controller 104 may snap to the beacons of the control devices and/or the beacon transmitting devices. When a network device 118 and/or the system controller 104 snaps to a beacon of a control device and/or a beacon transmitting device, the network device 118 and/or the system controller 104 may be given control of a control device. For example, the network device 118 and/or the system controller 104 may be able to intensify light emitted from control devices transmitting beacons in which the network device 118 snaps to.

Other network devices and/or the system controllers may be prevented from snapping to a beacon of a control device and/or beacon transmitting device after the network device 118 and/or the system controller 104 snaps to the beacon of the control device and/or the beacon transmitting device. Other network devices and/or system controllers may be permitted to snap to the beacon of control device and/or beacon transmitting device after the network device 118 and/or the system controller 104 snaps to the beacon of the control device and/or the beacon transmitting device. For example, based on a status of a user (e.g., executive, administrator, etc.), a user may be permitted to snap to a beacon of a control device even if the beacon of the control device has been snapped to by another network device. When the network device 118 and/or the system controller 104 snaps to a beacon of a control device and/or a beacon transmitting device, an identifier of the control device and/or of the beacon transmitting device may be stored. For example, when the network device 118 and/or the system controller 104 snaps to a beacon of a control device, an identifier of the control device may be stored by the system controller 110 and/or the network device 118.

When commissioning and/or controlling the load control system 100, the network device 118 and/or the system controller 104 may sort the received beacon into a list. The network device 118 and/or the system controller 104 may order the list based on a ranging method. For example, the network device 118 and/or the system controller 104 may order the list based on the received signal strength indicator (RSSI) of each beacon. The beacon having the highest RSSI may be listed first on the list. For example, the network device 118 may snap to the beacon having the highest RSSI of the received beacons. The network device 118 may allow for user selection of one of the beacons. For example, the network device 118 may allow for user selection of beacons within one or more rooms, based on the respective RSSI values. The network device 118 may allow for user selection of one of the beacons and may allow the user to snap to the selected beacon.

The network device 118 may configure the control of one or more lighting fixtures based on the beacons. The network device 118 may group lighting fixtures for control by reading the beacons of one or more lighting control devices to be controlled according to lighting control configurations 134. The lighting control configurations 134 may include preset configurations 136, zone configurations 138, occupancy configurations 140, and/or timing schedule configurations 142. A user may select the preset configurations 136 on the user interface 122 to set a dimming level of one or more lighting fixtures to be controlled according to the preset. Different presets may be configured to set different lighting fixtures to different lighting levels for different occasions, such as a bedtime preset for when a user is going to bed, a movie preset for when a user is watching television or a movie, an away preset for when a user is away from the building, a home preset for when the user is in the building, or any other preset a user may define for an occasion. The presets may be triggered upon predefined events. For example, the away preset may be triggered upon receipt of a vacancy condition or after a predefined period of time since receipt of an occupancy condition at the system controller 104. The home preset may be triggered upon receipt of an occupancy condition at the system controller 104. Other presets may be triggered at the system controller 104 upon actuation of a button on the remote control device and/or the network device 118.

The network device 118 may identify one or more lighting fixtures for being controlled according to a preset by detecting the link address or device identifier in the beacons from the lighting fixtures. The preset may be stored with the link address or device identifier in the beacons transmitted from the lighting fixtures and a lighting level for the preset. Different groups of lighting fixtures may be associated and set to different lighting levels in a preset configuration. The preset configurations 136 may be sent in digital messages to the system controller 104 for being stored for controlling the lighting fixtures according to the presets. The preset configurations 136 may be stored with a preset identifier that may be sent to the system controller 104 (e.g., by the network device 118, the remote control device 146, the occupancy sensor 144, and/or another control-source device) in a digital message for activating the preset.

A user may select the zone configurations 138 on the user interface 122 to define one or more zones of lighting fixtures for being controlled. Different zones may be separately controlled by sending lighting control instructions to a zone to set the zones to different lighting levels. The network device 118 may identify one or more lighting fixtures for a zone by detecting the link address or device identifier in the beacons from the lighting fixtures and storing the identified lighting fixtures as a defined zone for lighting control. The user of the network device 118 may walk the network device 118 under the lighting fixtures to read a set of link addresses or device identifiers for defining a zone. The identified lighting fixtures may be associated with one another (e.g., in an association table) and stored for collective control. The association information for a device may include the device identifiers of a device associated for collective control. The associated device identifiers of the identified lighting fixtures in a zone may be stored at the network device 118 as a defined zone configuration 138 for controlling the lighting fixtures in the defined zone. The zone configurations 138 may be sent in digital messages to the system controller 104 and/or the lighting fixtures in the defined zone for being stored for controlling the lighting fixtures according to the zone configurations 138.

The association information in the zone configurations 138 may be sent to the lighting fixtures for local storage. The lighting fixtures may control a lighting load in response to digital messages communicated to associated lighting fixtures. For example, the lighting control device in the lighting fixture 108 may respond to digital messages from control-source devices (e.g., system controller 104, remote control device 146, occupancy sensor 144, etc.) that include control instructions for controlling an associated device.

The zone configurations 138 may be stored with a zone identifier that may be sent to the system controller 104 and/or the lighting fixtures in a digital message with the zone configuration information. The zone identifier may be a name and/or number. For example, the zone identifier for the lighting fixtures in the floor plan 124 may be identified by the name of the room 126 in the floor plan 124. The zone identifier may identify the location of the portion of the lighting fixtures in the room 126.

The zone configurations 138 may include association information for control-source devices configured to control associated lighting fixtures in the zone configurations. For example, the network device 118 may identify one or more lighting fixtures via the transmitted beacons and may send the identified lighting fixtures to the system controller 104. The system controller 104 may receive association messages from control-source devices (e.g., remote control device 146, occupancy sensor 144, etc.) for associating the control-source devices with the identified lighting fixtures. The association messages may include a device identifier of the respective control-source device from which the association messages are received. The device identifier of the control-source devices may be stored in the zone configurations 138. The device identifier of the associated control-source devices may be sent to the lighting control devices of the lighting fixtures to which the control-source devices are associated, such that the lighting control devices may respond to digital messages from the associated control-source devices. The association message at the remote control device 146 may be triggered upon actuation of one or more buttons on the remote control device 146. The association message at the occupancy sensor 144 may be triggered upon actuation of a button on the remote control device 146 occupancy sensor 144 and/or the detection of an IR signal.

The network device 118 may send the identified lighting fixtures (e.g., link addresses, device identifiers, etc.) to the system controller 104 in one or more digital messages and the system controller 104 may store the identified lighting fixtures in a defined zone. The system controller 104 may receive an indication from the network device 118 when the transmission of the identified lighting fixtures for a defined zone has been completed or the system controller 104 may decide that the transmission of the identified lighting fixtures for a defined zone has been completed after an expiration of a period of time (e.g., a period of time from a first digital message received from the network device 118, a period of time since a last digital message received from the network device 118, etc.). The user may select on the network device 118 whether an unidentified zone is being identified and/or if an identified zone is being edited to include more, less, or different lighting fixtures. The selection of whether an unidentified zone is being identified or an identified zone is being edited may be communicated to the system controller 104. The digital message indicating that a zone is being edited may include the zone identifier of the zone being edited.

The system controller 104 may receive digital messages that include the zone identifier and lighting control instructions from a control-source device (e.g., the network device 118, the remote control device 146, the occupancy sensor 144, or another control-source device) for controlling the lighting fixtures in the identified zone. The system controller 104 may send lighting control instructions to the lighting fixtures in the defined zone in response to the digital messages. The zone identifier may be included in a broadcast message that may be sent to the system controller 104 and/or the lighting fixtures within the transmission range of the control-source device (e.g., the network device 118, the remote control device 146, the occupancy sensor 144, or another control-source device) for controlling the lighting fixtures in the identified zone. The lighting fixtures in the identified zone may control the lighting load according to the lighting control instructions in the broadcast message.

A user may select the occupancy configurations 140 on the user interface 122 to define one or more lighting fixtures for being controlled according to the occupancy or vacancy of a space. Different lighting fixtures may be controlled to different lighting levels in response to occupancy commands and/or vacancy commands received from an occupancy sensor, such as the occupancy sensor 144. The network device 118 may identify one or more lighting fixtures by detecting the link address or device identifier in the beacons transmitted from the lighting fixtures. The network device 118 may store the identified lighting fixtures and corresponding defined lighting levels to which the fixtures are to be controlled (e.g., in response to an occupancy condition and/or a vacancy condition). The lighting levels may be separately stored for occupancy conditions and vacancy conditions. The user of the network device 118 may walk the network device 118 under the lighting fixtures to read a set of link addresses or device identifiers for defining the lighting fixtures for being controlled according to an occupancy command and/or a vacancy command. The occupancy configurations 140 may be stored on the network device 118 and may be sent in digital messages to the system controller 104. The system controller 104 may send the occupancy configurations 140 to the lighting fixtures for being stored for controlling the lighting fixtures upon the receipt of an occupancy command and/or a vacancy command.

A user may select the timing schedule configurations 142 on the user interface 122 to define a timing schedule for one or more lighting fixtures. Different lighting fixtures may be controlled to different lighting levels (e.g., on/off, a predefined dimming level, etc.) in accordance with a timing schedule that may be monitored by the system controller 104. The timing schedule may include times and/or dates at which the lighting levels may be changed. The network device 118 may identify one or more lighting fixtures by detecting the link address or device identifier in the beacons transmitted from the lighting fixtures. The network device 118 may store the identified lighting fixtures and corresponding defined lighting levels to which the fixtures are to be controlled at defined periods of time. The user may use the network device 118 to define the lighting levels and the periods of time at which the identified lighting fixtures are to be controlled. The timing schedule configurations 142 may be stored on the network device 118 and may be sent in digital messages to the system controller 104 for being stored for controlling the lighting fixtures at the defined periods of time. The user of the network device 118 may select on the network device 118 whether a timing schedule configuration is being defined or if a predefined timing schedule configuration is being edited. The timing schedule configurations may be stored with a timing schedule identifier for being referenced by the system controller 104 and/or the network device 118.

Beacons may be transmitted from types of control devices other than the lighting control devices in the lighting fixtures. The beacons transmitted from other control devices may be identified for configuration and/or control of control devices in the load control system 100. For example, the load control system 100 may include a thermostat, a keypad, an AC plug-in load control device (e.g., a switching device), and/or a motorized window treatment that may be capable of transmitting beacons that may be captured by the network device 118 for configuring and/or controlling the respective load control devices. The control devices may include a beacon transmitting circuit for communicating the beacons via RF communication signals or a visible light communication signal. For example, the thermostat may transmit VLC signals via a display, by flashing an indicator light (e.g., LED), or providing any other visible light communication. A keypad may transmit VLC signals by flashing an indicator light (e.g., LED). The AC plug-in load control device may in may transmit VLC signals via a display, by flashing an indicator light (e.g., LED), providing an indication via a device that is plugged in to the AC plug-in load control device (e.g., flashing a lamp or lighting load of other device that is plugged in to the AC plug-in load control device), or providing any other visible light communication. The motorized window treatment may transmit VLC signals by flashing an indicator light (e.g., LED) or providing any other visible light communication. The network device 118 and/or the system controller 104 may be used, as described herein for example, to configure preset configurations, zone configurations, occupancy configurations, and/or timing schedule configurations for the control devices. The network device 118 may control the electrical loads of the load control devices by reading the device identifiers of the control devices and sending control instructions to the identified devices. Though the VLC signals or RF communication signals may be used as a type of beacon for certain examples herein, other types of beacons (e.g., audio signals, etc.) may be used.

Figure 5:
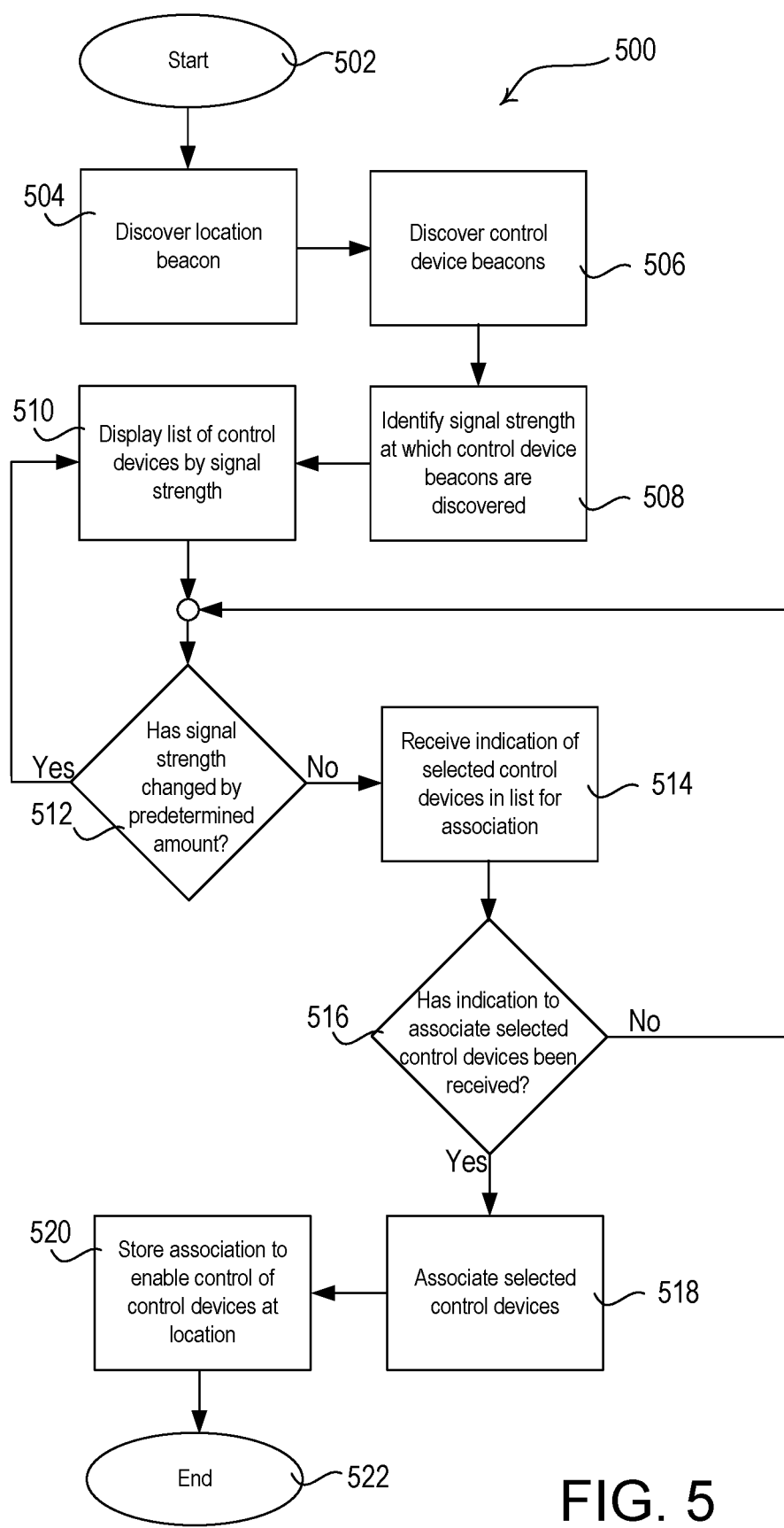
FIG. 5 is a flow diagram depicting an example method for associating control devices.

FIG. 5 is a flow diagram depicting an example method 500 for associating control devices at an identified location. Control devices may include control-source devices (e.g., remote control devices, occupancy sensors, etc.) and/or control-target devices (e.g., lighting control devices, motorized window treatments, etc.). The control-target devices may have to be associated with one or more control-source devices prior to being able to receive digital messages, which may include load control instructions, from the control-source devices for controlling a corresponding electrical load. In an example, the control devices may be associated using a push-button association method (e.g., the user may actuate a button on a control-target device to cause the control-target device to enter an association mode). Once the control-target device is in association mode, a button may be actuated on a control-source device for associating the control-source device with the control-target device. After the control-source device is associated with the control-target device, the control-target device may recognize digital messages, which may include load control instructions, from a control-source device and the user may use the control-source device for instructing an associated control-target device to control an amount of power provided to an electrical load. In another example, the control-source devices may be associated with one or more of the control-target devices upon selection of the control devices from a list of discovered control devices. The list of discovered control devices may be displayed on the network device 118. For example, the network device 118 may allow a user to select a control-source device for association with a control-target device. The network device 118 may provide step-by-step instructions for associating the control-source device with the control-target device. For example, the network device 118 may provide instructions for associating a particular control-source with one or more control-target devices. The control devices may also be associated with one or more locations prior to being able to receive digital messages, which may include load control instructions, for controlling electrical loads in the location. The location may be identified by a beacon identifier and the devices may be stored with the beacon identifier for being controlled in the location of the beacon.

As shown in FIG. 5, the method 500 may begin at 502. At 504, a location beacon may be discovered. The location beacon may include a unique identifier associated with a location in a load control environment. The location beacon may be transmitted by a beacon transmitting device at the identified location. The location beacon may be discovered via RF communication signals (e.g., close-range RF communication signals, such as BLUETOOTH® low energy (BLE) signals), visible light communication signals, and/or audio signals. If multiple location beacons are discovered, association may be performed with the location beacon having the greatest signal strength.

The locations corresponding to the received location beacons may be displayed to a user and a user may select the location for which association may be performed. To discover a location beacon at 504, the location beacon may have been pre-configured in a location and may be associated with the location (e.g., in a floorplan). The location beacon may be configured at the same time as the other devices, e.g., as shown in steps 506-520.

At 506, control device beacons may be discovered. The control device beacons may include unique identifiers that correspond to different control devices. The control device beacons may include unique identifiers of the control device types from which the control device beacons may be transmitted. The control device beacons may be transmitted by a beacon transmitting device at or near a corresponding control device. The control device beacons may be discovered via RF communication signals (e.g., BLUETOOTH® low energy (BLE) signal), visible light communication signals, and/or audio signals.

At 508, the signal strength at which the control device beacons are discovered may be identified. The signal strength of the control device beacons may be identified by the strength at which the RF communication signals are received (e.g., the RSSI of the control device beacon), the light intensity level at which the visible light communication signals are received, and/or the amplitude at which the audio signals are received. The signal strength may be lower for beacons that are transmitted from further away or receive some interference between the transmission of the beacon and the receipt of the beacon.

A list of the discovered control devices may be displayed at 510, e.g., on the network device 118. The list of discovered control devices may be displayed in an ascending or descending order according to the signal strength at which the corresponding control device beacon for a control device is discovered at 506. The list may indicate the control devices that are closer in proximity to the device at which the control device beacons are received. The list may also, or alternatively, indicate the control devices that are within the same location. For example, the control device beacons that are received with a lower signal strength in the list may correspond to control devices in a different room or different floor in a building, as the walls and floors in the building may cause interference with the control device beacons and may weaken the signal strength at which the control device beacons are received.

The list of control devices being displayed may be updated dynamically. For example, it may be determined at 512 whether the signal strength of any of the control device beacons has changed by a predetermined amount. The predetermined amount may be a discrete amount (e.g., 5 units, 10 units, etc.). The predetermined amount may be the difference between the signal strength of other beacons having a higher or lower signal strength. If the signal strength of one or more of the control device beacons has changed by the predetermined amount, the list of control devices may be displayed to identify the order (e.g., the current order) of the control devices according to the updated signal strength at 510. A change in the signal strength of one or more of the control device beacons may include the discovery of a previously undiscovered control device beacon or the loss of a previously discovered control device beacon.

At 514, an indication of selected control devices in the list may be received for association. For example, a user selection of one or more control devices in the displayed list may be received at 514. It may be determined, at 516, whether an indication to associate the selected control devices has been received. The indication may be received in response to a user selection of a button or the passage of a predetermined amount of time after user selection of the control devices in the displayed list.

Digital messages may be sent to the selected control devices upon receiving the indication of the selection to request feedback from the selected control devices. The digital messages may request feedback from the selected devices to identify themselves, such that the user may confirm devices that have been selected. The feedback may be in the form of a visual or audio feedback. For example, upon receiving a selection of a control device in the list of control devices, the network device 118 may send a digital message that includes the unique identifier of the selected device and a request for feedback from the device. The digital message may be received at the control device (e.g., directly or via the system controller 104) and the control device may provide visual or audio feedback to the user. The visual feedback may be in the form of flashing a lighting load (e.g., an LED, a lamp, etc.), moving a covering material of a motorized window treatment, or another form of visual feedback that may be observed by the user. The audio feedback may be a sound provided by the control device. If a different control device provides feedback to the user other than the control device that the user believed was selected (or the user does not identify the feedback as being provided in the location), the user may unselect the control device and may select another control device. The control devices may provide feedback upon being unselected at the network device 118. The feedback for being selected and unselected may be the same or different.

The list of control devices may continue to be updated according to the signal strength of the corresponding control device beacons. For example, if the indication to associate the selected control devices has not been received at 516, the method 500 may proceed to 512 to determine whether the signal strength of any of the control device beacons has changed and may update the display of the list of control devices according to the updated signal strength at 510. Determining whether the signal strengths have changed and/or updating the display of the list of control devices may allow a user to walk around with a device to get closer to the control devices with which the user may want to associate the identified location. As a result, control devices may be ordered according to relevance. For example, the more relevant control devices may be identified at the top of the list.

The network device 118 may receive the indication to associate the selected control devices at 516 and may associate the selected control devices, at 518. The selected control devices may be associated with a location. For example, the selected control devices may be associated with a location by associating the unique identifier of the selected control devices with the unique identifier of the location (e.g., location beacon).

The selected control devices may be associated with one or more other control devices at 518. For example, control devices in a location may transmit beacons including unique identifiers that may be identified by the network device 118 and may be stored to represent the control device and/or location of the control device. Control-target devices, such as lighting control devices, may transmit beacons that may be identified by the network device 118 and may represent the control-target device and/or location of the control-target device. Selected control-source devices may be associated with the control-target devices identified by the beacons. For example, a user may select one or more control-source devices at the network device 118 for being associated with control-target devices identified by beacons. The selected control-source devices may be associated with the control-target devices by associating the unique identifiers of the selected control-source devices with the unique identifiers of the control-target devices or the beacons of the control-target devices. The control devices may be separately associated with an identifier of a location beacon, or the identifiers of the beacons transmitted by the identified control devices may represent the location.

The association may be stored, at 520, to enable control of the control devices at the location. For example, the association may be stored in an association table that may be stored at one or more devices for identifying the associated devices for being controlled upon discovery of the location beacon at the location. The association may be stored at the network device, the system controller, and/or one or more control devices. The control-target devices and control-source devices associated with a location may be associated to enable digital messages from control-source devices at the location to be identified at the associated control-target devices for enabling control of the associated control-target devices. The method 500 may end at 522.

After the association is performed, the location beacon and/or the control device beacons representing a location may be transmitted for enabling control of the devices in the location. For example, the network device may identify the beacons in the location and communicate digital messages to the control devices (e.g., directly or via the system controller) that include load control instructions for controlling the devices. In another example, the location beacon and/or the control device beacons representing the location may be transferred to a lower power mode (e.g., causing lower RSSI for the beacons) or to a beacon off mode to prevent beaconing after the association is performed (e.g., during control in the system). The network device and/or the system controller may send a message to the control devices to indicate that association has been performed and the control devices may transition to the lower power mode or turn the beacon transmitter off to prevent beaconing in response to the message.

The method 500 may be implemented at a network device (such as the network device 118) and/or a system controller (such as the system controller 104), shown in FIG. 1. Portions of the method 500 may be implemented at the network device 118 and at the system controller 104. For example, the network device 118 may receive the location beacon and the control device beacons and may identify the unique identifiers being communicated in the beacons. The network device 118 may communicate the identifiers to the system controller 104 for performing association and storage of the associations. The network device 118 may identify the signal strength and the changes in the signal strength of the control device beacons and may display the list of control devices according to the signal strength. The network device 118 may communicate the signal strength to the system controller 104 and the system controller 104 may generate the list of control devices for being displayed at the network device 118 (e.g., via an application executing at the network device). The stored associations at the network device 118 may be sent to the system controller 104 for storage thereon for being communicated to other control devices and/or coordinating delivery of digital messages to associated devices for performing load control.

During association of control devices, the user may discover the devices and may save a group of associated devices (e.g., as "group 1"). For example, absent a location beacon, the user may discover the devices and may save a group of associated devices. The specific locations may be unassociated with the groups of associated devices. The user may name the groups of associated devices more specifically, such as "Office 1," "Conf. Room 1," "Conf. Room 2," etc.

Figure 6A:
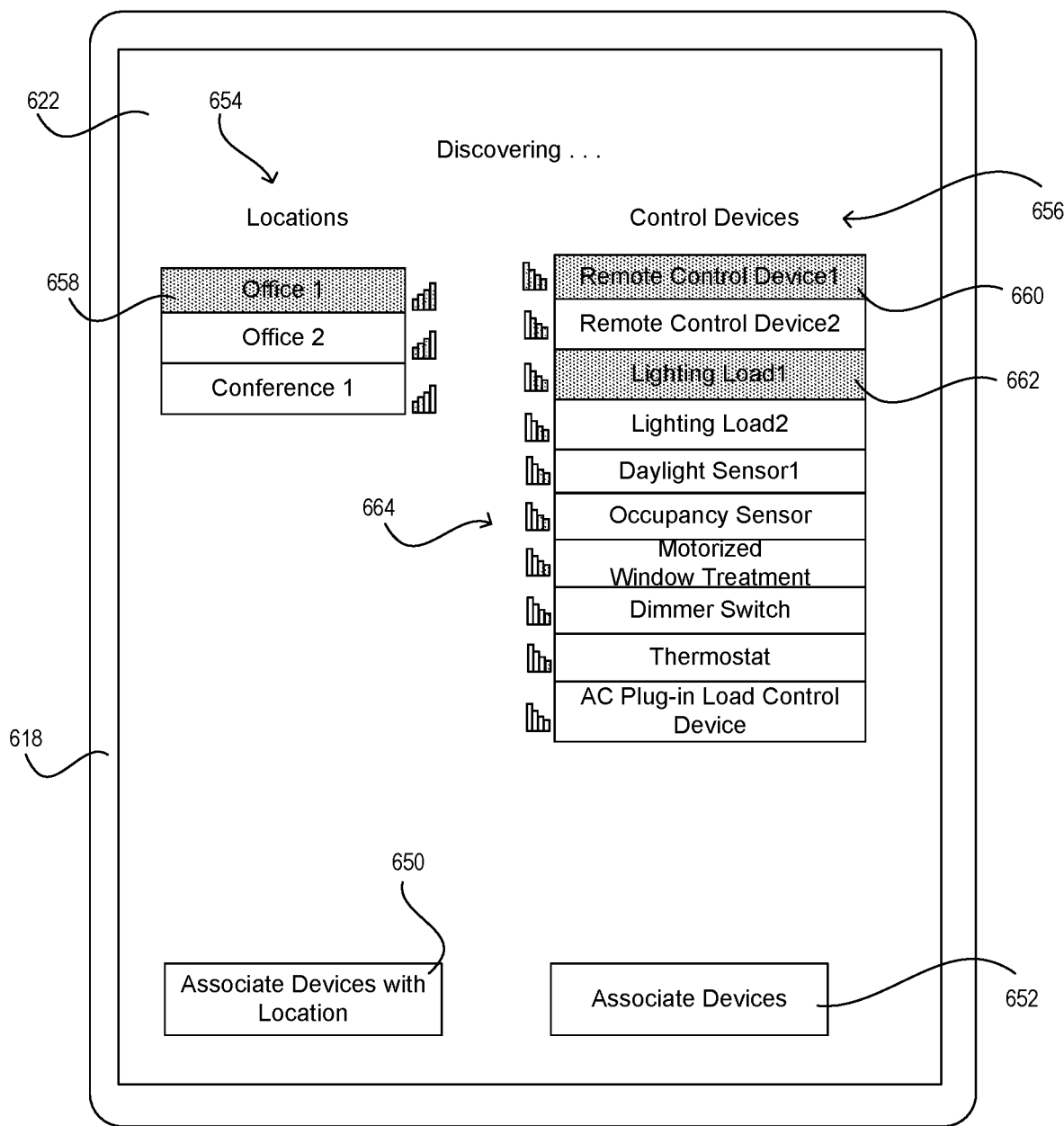
FIGS. 6A and 6B illustrate example user interfaces that may be implemented to associate control devices.
Figure 6B:
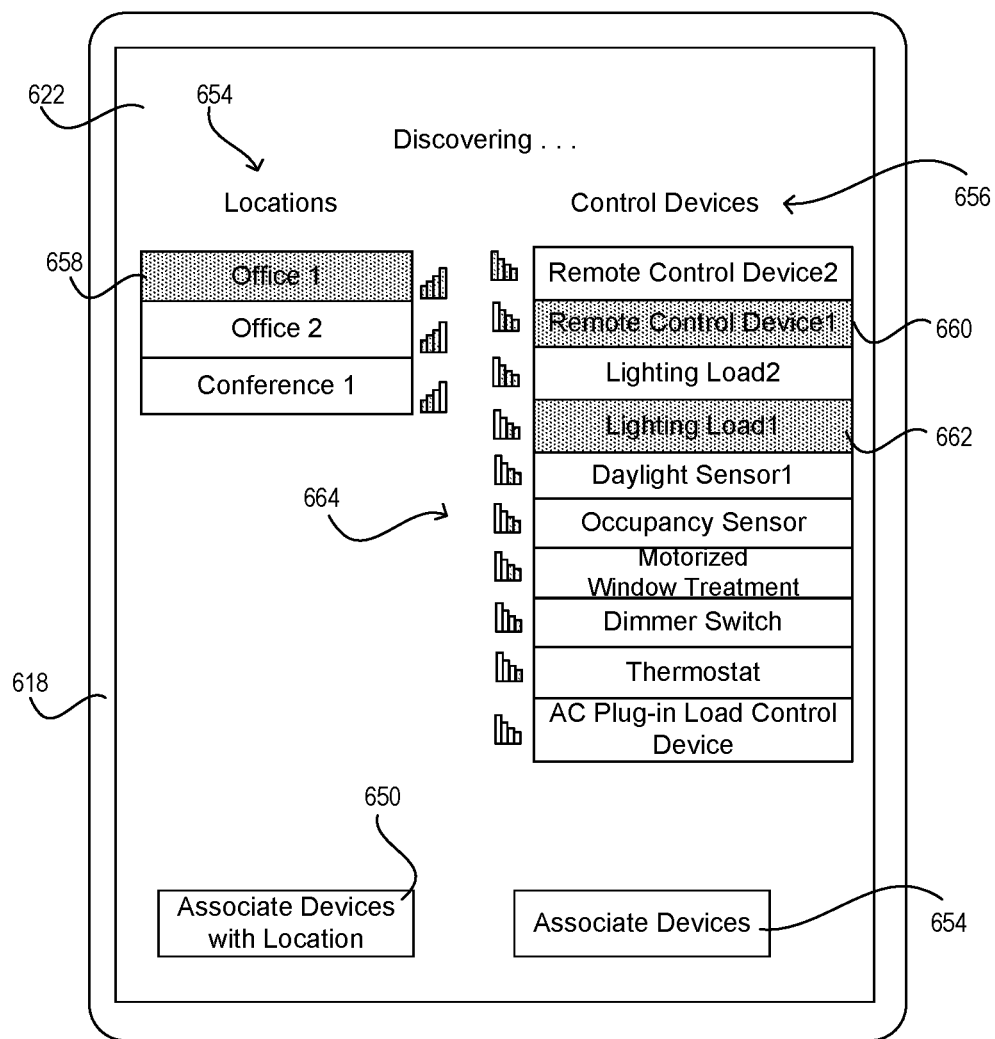

FIGS. 6A and 6B show an example interface 622 that may be displayed on a network device 618 for discovering and associating control devices. As shown in FIG. 6A, the interface may include a list of locations 654 and/or a list of control devices 656 that may be discovered at the network device 618. The list of locations 654 may be displayed in an order. For example, the list of locations 654 may be displayed in an order of relative locations based on the signal strength of the location beacon received for a location. The signal strength of one or more of the location beacons for the locations in the list of locations 654 may be indicated with signal strength indicator 664. The signal strength indicator 664 may represent a value of the signal strength, which may be indicated as an icon and/or score that indicates the received signal strength of the corresponding location in the list of locations 654. The list of control devices 656 may be displayed in order of relative location based on the signal strength of the location beacon received for a control device.

A user may select a location in the list of locations 654 for being associated with one or more control devices. The user may select one or more control devices in the list of control devices 656 for being associated with a location. As shown in FIG. 6A, the location 658 may be selected and the control devices 660, 662 may be selected for association. The signal strength of one or more of the control device beacons for the control devices in the list of control devices 656 may be indicated with signal strength indicator 664. The signal strength indicator 664 may represent a value of the signal strength, which may be indicated as an icon and/or score that indicates the received signal strength of the corresponding control devices in the list of control devices 656. The user may select the button 650 to associate the selected control devices with the selected location. For example, the user may select location 658 ("Office 1") to associate with control devices 660 ("Remote Control Device 1") and control device 662 ("Lighting Load 1"). The user may select the button 652 to associate control-source devices and control-target devices in the list of control devices 656.

FIG. 6B shows the user interface 622 with an updated list of the control devices 656. The list may be updated if the network device 618 moves locations from the location in which the list of the control devices 656 was displayed in FIG. 6A. The moved network device 618 may update the list of control devices 656 to indicate the relative location of the control devices in the list of control devices 656. For example, control device 660 may move from first on the list (in FIG. 6A) to second on that list (in FIG. 6B), and control device 662 has moved from third on the list to forth on the list. The interface 622 may update the locations in the list of locations 654. The list of locations 654 and/or the list of control devices 656 may be updated dynamically. The signal strength indicators 664 may also, or alternatively, be updated to indicate the relative signal strength of the beacons being received at the network device 618. As the network device 618 moves, locations may be added to and/or removed from the list of locations 654. As the network device 618 moves, control devices may be added to and/or removed from the list of control devices 656. The user may continue to select control devices and locations for being associated.

Figure 7:
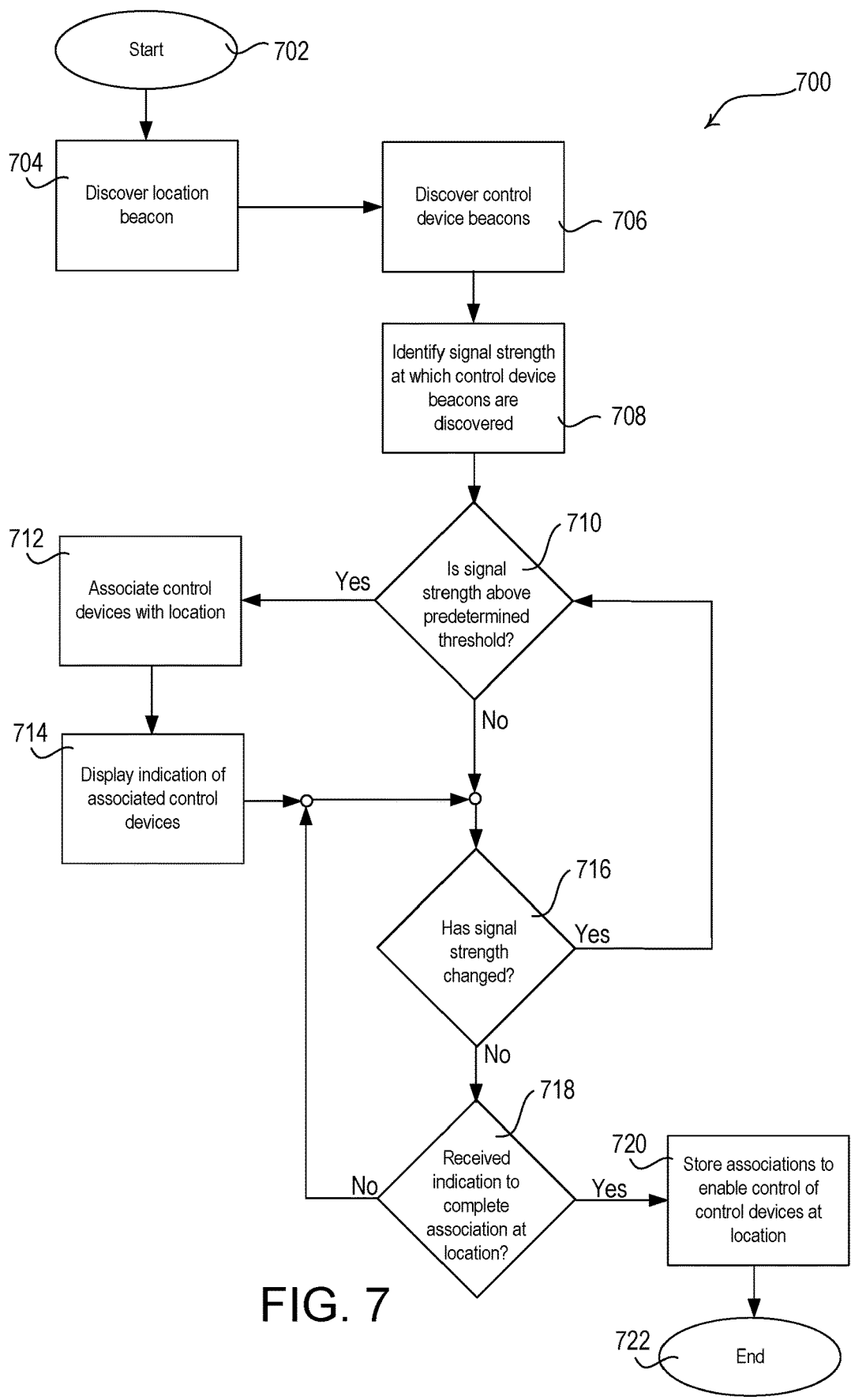
FIG. 7 is another flow diagram depicting an example method for associating control devices.

FIG. 7 is a flow diagram depicting another example method 700 for associating control devices at an identified location. As shown in FIG. 7, the method 700 may begin at 702. At 704, a location beacon may be discovered. The location beacon may include a unique identifier associated with a location in a load control environment. The location beacon may be transmitted by a beacon transmitting device at the identified location. The location beacon may be discovered via RF communication signals (e.g., BLUETOOTH® low energy (BLE) signal), visible light communication signals, and/or audio signals. If multiple location beacons are discovered, association may be performed with the location beacon having the greatest signal strength. The locations corresponding to the received location beacons may be displayed to a user and a user may select the location for which association may be performed.

At 706, control device beacons may be discovered. The control device beacons may include unique identifiers that correspond to different control devices. The control device beacons may include unique identifiers of the control device types from which the control device beacons may be transmitted. The control device beacons may be transmitted by a beacon transmitting device at or near a corresponding control device. The control device beacons may be discovered via RF communication signals (e.g., BLUETOOTH® low energy (BLE) signal), visible light communication signals, and/or audio signals.

At 708, the signal strength at which the control device beacons are discovered may be identified. The signal strength of the control device beacons may be identified by the strength at which the RF communication signals are received, the light level at which the visible light communication signals are received, and/or the amplitude at which the audio signals are received.

At 710, it may be determined whether the signal strength of any of the discovered control device beacons is above a predetermined threshold. If the signal strength of any of the discovered control device beacons is above the predetermined threshold, the corresponding control devices may be automatically associated with the identified location at 712. The control devices may be associated with the location, at 712, by associating the unique identifier of the control devices with the unique identifier of the location. The association may be stored (e.g., in an association table), for identifying the devices with the associated location. For example, the association may be stored in an association table that may be stored at one or more devices for identifying the associated devices for being controlled upon discovery of the location beacon at the location. The control-target devices and control-source devices associated with a location may be associated to enable digital messages from control-source devices at the location to be identified at the associated control-target devices for enabling control of the associated control-target devices.

An indication of the control devices associated with the location may be provided at 714. For example, a list of the associated control devices may be displayed at 714. A list of control devices corresponding to the discovered control device beacons at 706 may be displayed and the associated control devices in the list may be indicated at 714. The network device may provide other feedback (e.g., audio feedback or vibration) when a control device is associated. The network device may send a digital message (e.g., via the system controller) for the associated control device to provide feedback that the device has been associated. For example, a lighting load may turn off and/or on, a motorized window treatment may move a covering material up and/or down, an indicator light may be turned on and/or off, etc.

The method 700 may continue to automatically associate control devices at 712 until an indication is received to complete association at the location at 718. For example, after associating the control devices with the location that have a control device beacon signal strength above the predetermined threshold at 712, or after the control device beacon signal strength is determined not to be above the predetermined threshold at 710, the method 700 may determine, at 716, whether the signal strength of any of the control device beacons have changed. At 716, it may be determined whether the change to the signal strength of the control device beacons is below a predetermined amount and/or below a predetermined period of time. If the change to the signal strength is below a predetermined amount and/or below a predetermined period of time, the change may not be processed (e.g., to avoid processing the change due to minor fluctuations in signal strength in amount or duration). The predetermined amount may be the difference between the previously identified signal strength of a control device beacon and the predetermined threshold for associating the control devices with the location. In an example, the user may move the device at which the signal strength of the control device beacons are being measured closer to control devices in order to increase the signal strength of the corresponding control device beacon and associate the control device.

If the signal strength of one or more of the control device beacons has changed by the predetermined amount at 716, the method 700 may continue to 710 to determine whether the signal strength is above the predetermined threshold for associating the control device that corresponds to the control device beacon with the location. If the signal strength of the control device beacons has not changed at 716 (e.g., by the predetermined threshold and/or for the predetermined duration), it may be determined whether an indication has been received to complete the association at the identified location, at 718. The indication may be received in response to a user selection of a button or an expiration of a timer, for example. If no indication has been received to complete the association, the signal strength of the control device beacons may continue to be monitored at 716 for performing association. If the indication has been received to complete the association at the 718, the associations may be stored to enable control of the associated control devices at the location. The method 700 may end at 722.

The method 700 may be implemented at a network device (such as the network device 118) and/or a system controller (such as the system controller 104), shown in FIG. 1. Portions of the method 700 may be implemented at the network device 118 and at the system controller 104. The network device may receive the location beacon and the control device beacons and may identify the unique identifiers being communicated in the beacons. The network device may communicate the identifiers to the system controller for performing association and storage of the associations. The network device may identify the signal strength and the changes in the signal strength of the control device beacons and may display the list of control devices according to the signal strength. The network device may communicate the signal strength to the system controller and the system controller may generate the list of control devices for being displayed at the network device (e.g., via an application executing at the network device). The stored associations at the network device may be sent to the system controller for storage thereon for being communicated to other control devices and/or coordinating delivery of digital messages to associated devices for performing load control.

During association of control devices, the user may discover the devices and may save a group of associated devices (e.g., as "group 1"). For example, absent a location beacon, the user may discover the devices and may save a group of associated devices.

Figure 8:
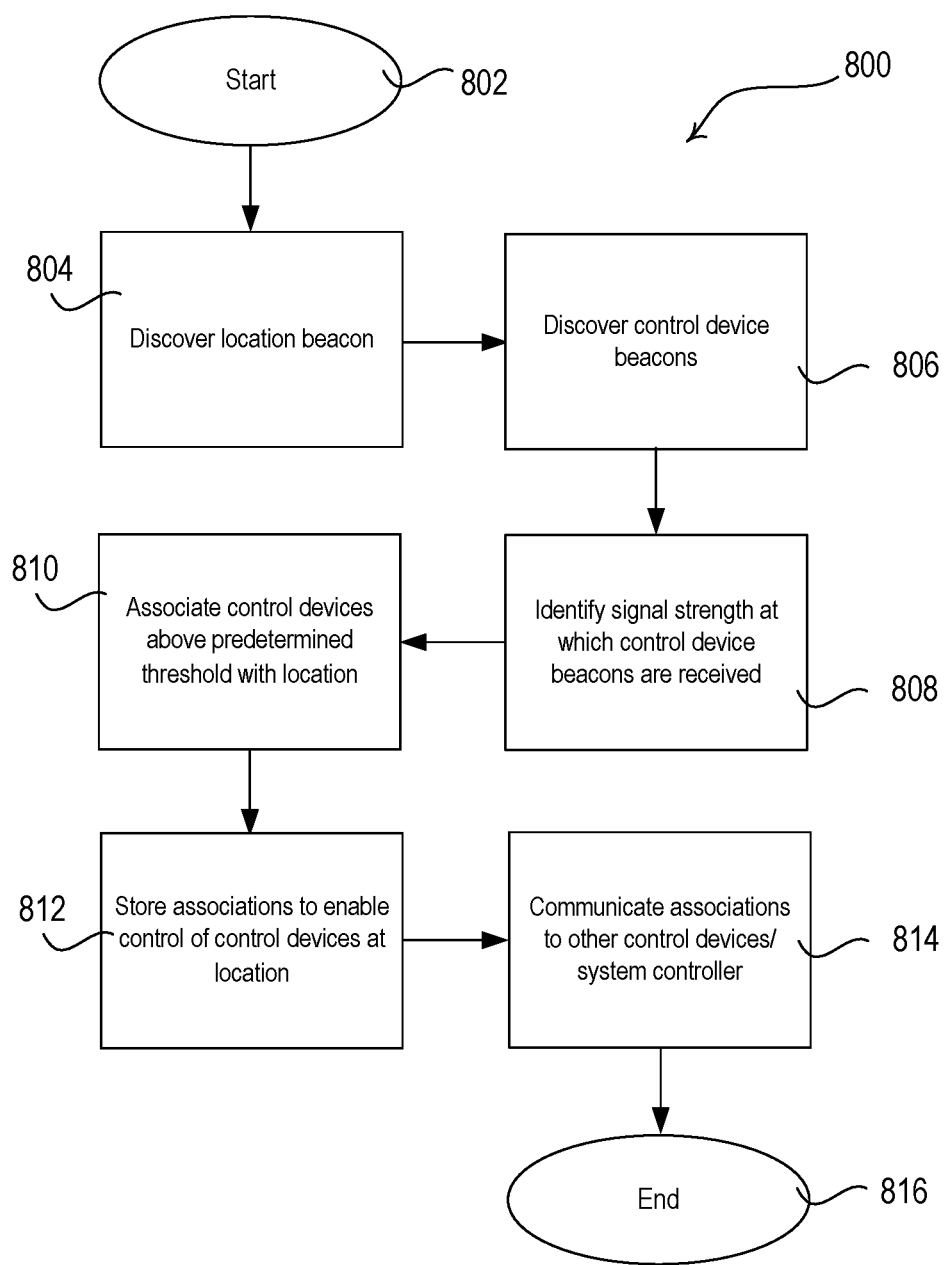
FIG. 8 is another flow diagram depicting an example method for associating control devices.

FIG. 8 is a flow diagram depicting another example method 800 for associating control devices at an identified location. For example, the method 800 may be performed by a control device to discover and associate other control devices in a location. As shown in FIG. 8, the method 800 may begin at 802. At 804, a location beacon may be discovered. The location beacon may include a unique identifier associated with a location in a load control environment. The location beacon may be transmitted by a beacon transmitting device at the identified location. If multiple location beacons are discovered, association may be performed with the location beacon having the greatest signal strength. The location beacon may be discovered via RF communication signals (e.g., BLUETOOTH® low energy (BLE) signal), visible light communication signals, and/or audio signals.

At 806, control device beacons may be discovered. The control device beacons may include unique identifiers that correspond to other control devices. The control devices capable of discovering the location beacon and/or control device beacons of other control devices may be two-way communication devices. The control device beacons may include unique identifiers of the control device types from which the control device beacons may be transmitted. The control device beacons may be transmitted by a beacon transmitting device at or near a corresponding control device. The control device beacons may be discovered via RF communication signals (e.g., BLUETOOTH® low energy (BLE) signal), visible light communication signals, and/or audio signals.

At 808, the signal strength at which the control device beacons are discovered may be identified. The signal strength of the control device beacons may be identified by the strength at which the RF communication signals are received, the light intensity level at which the visible light communication signals are received, and/or the amplitude at which the audio signals are received. The control devices may be associated (e.g., automatically associated) with the location, at 810, by associating the unique identifier of the control devices with the unique identifier of the location.

At 810, the control devices corresponding to the control device beacons having a signal strength above a predetermined threshold may be associated with the location. The predetermined threshold may be a fixed threshold. The threshold may be adaptive. For example, if there are one or more devices with a signal strength that is the same or similar (e.g., a signal strength of "10") and a gap between the signal strength and the next signal strength of one or more devices (e.g., a group of devices, with a signal strength of "7"), the network device may decide that the threshold is between 10 and 7. The devices with the same or similar signal strength (e.g., a signal strength of "10") may be automatically grouped together.

The unique identifier in the location beacon and/or the control device beacon may be verified by a unique identifier received in a beacon transmitted via another form of communication. For example, the beacons may be received via an RF communication signal and may be confirmed via a VLC beacon that may be separately discovered, or vice versa. The network device 118 may associate control devices having a unique identifier in a beacon that is received above the predetermined threshold, at 810, that is also verified by matching the unique identifier received in a beacon transmitted via another form of communication. The verification beacon may be used to verify that the network device is in the location (e.g., room) of the control devices for being associated. The verification beacon may be used to avoid associating devices in different locations, but which may be capable of being received by the network device 118. For example, a RF beacon transmitted by a control device in a separate room may be discovered by the network device, but a VLC beacon transmitted by a control device in a separate room may not be discoverable by the network device 118.

The associations may be stored, at 812, for enabling control of the discovered devices at the location. For example, the association may be stored in an association table that may be stored at one or more devices for identifying the associated devices for being controlled upon discovery of the location beacon at the location. The control-target devices and control-source devices associated with a location may be automatically associated to enable digital messages from control-source devices at the location to be identified at the associated control-target devices for enabling control of the associated control-target devices.

At 814, the associations may be communicated to other control devices and/or the system controller. The method 800 may end at 816. The association table generated at a control devices may be communicated, at 814, via digital messages to the system controller 104. The system controller 104 may generate a master association table from the association tables received for a given location. For example, the system controller may generate a master association table by adding the associations in an association table received from a control device. The system controller may remove duplicate associations from the master table. The system controller 104 may use the master association table for control of the control devices in the location when a network device identifies the location beacon for performing control.

The control devices in the location may also, or alternatively, communicate digital messages that include an association table to other two-way communication control devices, e.g., via broadcast messages or using the unique identifier in the control device beacons. The control devices that receive the association tables from other control devices may add other discovered control devices to the association table. For example, one or more of the two-way communication devices in the load control system may perform the method 800 and may append their association table, with or without duplicate associations, to the received association tables. A master control device may be assigned for communicating a master association table to the system controller 104, or the system controller 104 may listen to the communications between the control devices and generate a master association table. The master association table may be communicated to the control devices and/or network control devices 118 for performing control of the control devices in the location. A network control device 118 may access the association tables to re-configure the association tables that are automatically generated by the load control system.

After the control devices are associated with a given location, network control devices and/or control devices may access the association tables to perform control at the location. For example, the association tables, or portions thereof, may be communicated from the system controller to the control-source devices and the control-target devices for identifying control instructions in digital messages between associated devices. The network device may also, or alternatively, access the association tables for a location by discovering the location beacon and communicating the location beacon to the system controller. The system controller may provide the association table for the location and the network device may communicate control instructions to the system controller for controlling the control devices in the system.

The transmission power of the beacons may be turned on/off or increased/decreased to enable/disable communication of the beacons. The transmission of the beacons may be turned off or decreased in power to conserve energy (e.g., for battery-powered beacon transmitting devices) or reduce interference that may be caused by the transmission of the beacons. For example, if the transmission of the beacons are used for commissioning to setup the load control system, the transmission of the beacons may be turned off or reduced in power at the control devices after commissioning. The transmission of the beacons in a location may be turned off or reduced in power after the control devices in the location have been configured to prevent the beacons from being discovered during configuration of control devices in another location.

Figure 9:
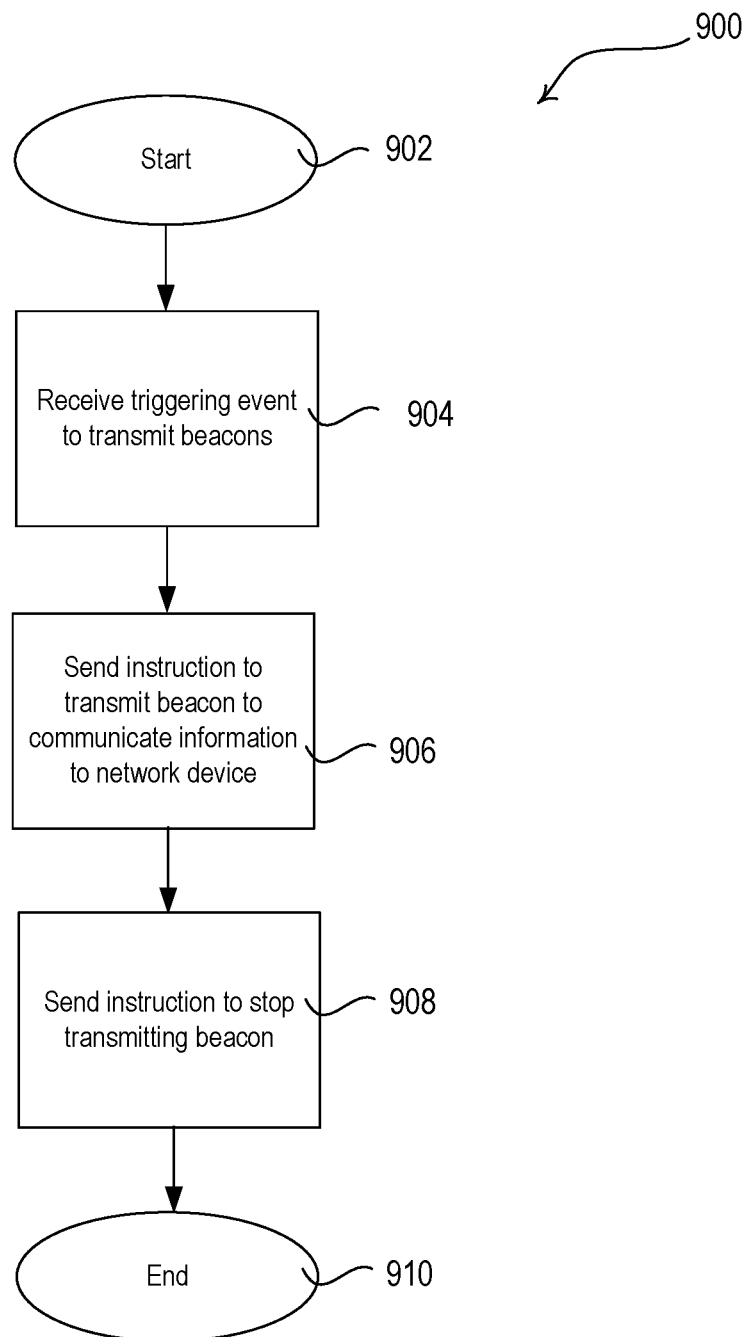
FIG. 9 is a flow diagram depicting an example method for triggering beacons.

FIG. 9 is a flow diagram depicting an example method 900 for triggering a transmission of beacons (e.g., location beacons or control device beacons) at a beacon transmitting device. The method 900 may be used to trigger a location beacon at a beacon transmitting device and/or a control device beacon at a control device using VLC signals, an RF communication protocol (e.g., BLUETOOTH® low energy (BLE) communication protocol), audio communication, and/or the like. As shown in FIG. 9, the method 900 may begin at 902. At 904, a triggering event may be received to initiate beacon communication. The triggering event may be received in a digital message. The digital message may identify other types of information to be communicated. For example, the digital message may indicate to communicate a wireless network communication information, a link address, and/or a device identifier via the visible light communication. The wireless network communication information may include an IP address, a MAC address, an SSID or other network identifier (e.g., system controller device identifier), and/or a network password. The wireless network communication information, the link address, and/or the device identifier may be identified in the digital message or retrieved locally at a device.

At 906, instructions may be sent to transmit the beacon and/or other information to the network device 118. At 908, instructions may be sent to stop transmitting the beacon and/or other information to the network device 118. The instructions to stop transmitting the beacon and/or other information to the network device 118 may be sent in response to the expiration of a timer (e.g., triggered upon receipt of the triggering event at 504) or upon receipt of a digital message. The method 900 may end at 910.

The method 900 may be implemented at a system controller, such as the system controller 104 shown in FIG. 1. The system controller 104 may receive the triggering event at 904 and send the instructions at 906 to a control device to transmit the beacon. The triggering event may be received at 904 by the system controller 104 from any control device capable of two-way communication. One-way communication devices may transmit the triggering event in response to a condition (e.g., an occupancy condition at an occupancy sensor) and/or actuation of a button. A remote control device and/or a network device may transmit the triggering event in response to an actuation of one or more buttons.

The method 900 may be implemented at a control device (e.g., lighting control device). For example, the system controller 104 may receive the triggering event at 904 and send the instructions at 906 to a beacon transmitting device for communicating the beacon. For RF beacons, the control device may send a beacon via a wireless communication circuit or a separate beacon transmitting device. For VLC signals, the beacon transmitting device may be a visible light communication circuit that may modulate a lighting load to transmit the VLC signals. For audio beacons, the beacon transmitting device may include a speaker.

Figure 10:
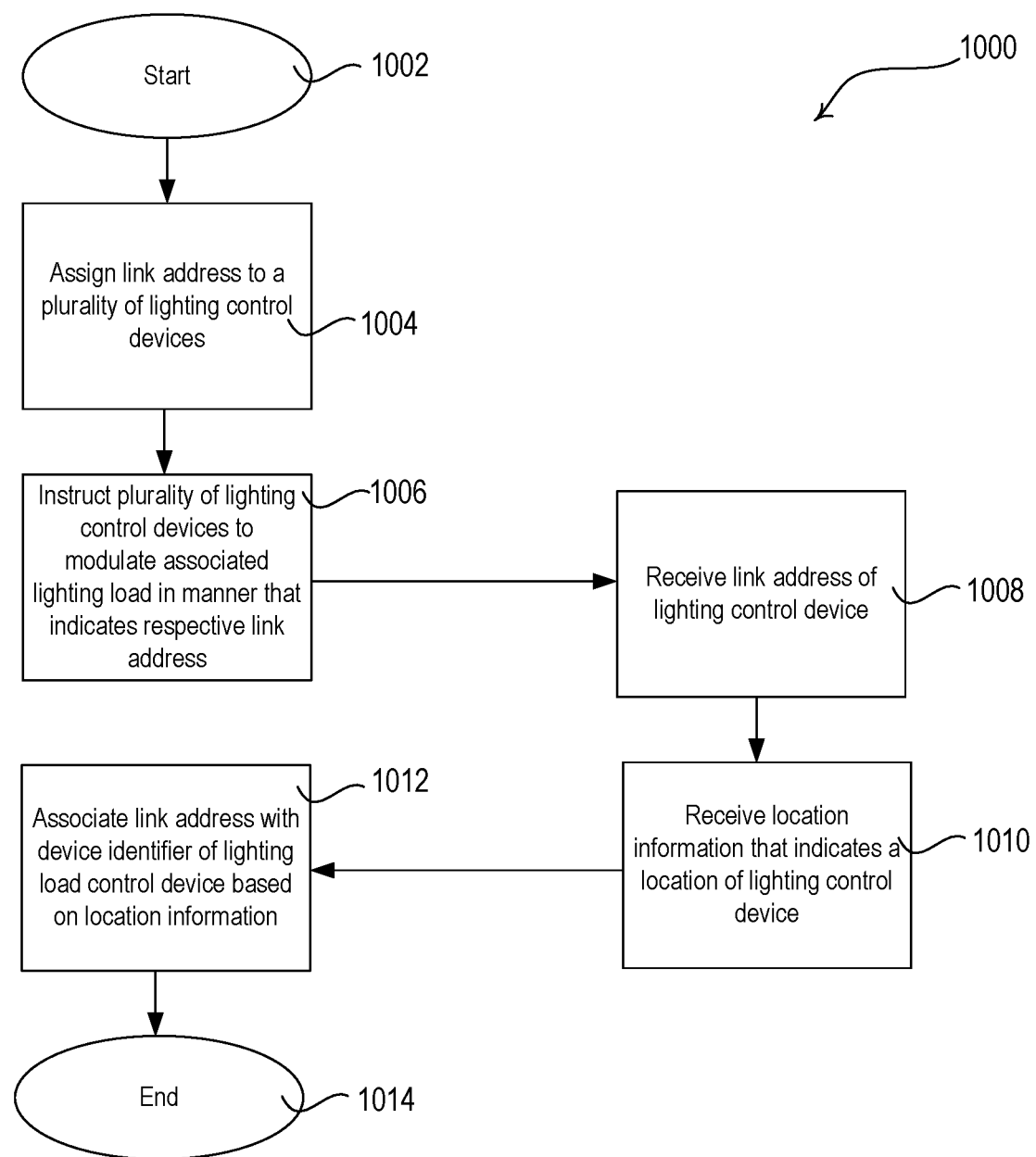
FIG. 10 is a flow diagram depicting an example method for associating a link address with a device identifier.

FIG. 10 is a flow diagram depicting an example method 1000 for associating a link address with a device identifier. The method 1000 may begin at 1002. At 1004, a link address may be assigned to one or more lighting control devices. A lighting control device may control a respective lighting load in a lighting fixture. The link addresses may be assigned by a system controller (such as system controller 104) in communication with the lighting control devices. The link addresses may be assigned after installation of the lighting control devices.

To identify the link addresses assigned to the lighting control devices, the lighting control devices may be instructed, at 1006, to modulate an associated lighting load. For example, the lighting control devices may be instructed to modulate an associated lighting load in a manner that indicates the link address of one or more of the respective lighting control devices in a visible light communication. The system controller 104, or another control-source device, may instruct the lighting control devices to identify their respective link addresses, at 1006. At 1008, the system controller 104 may receive the link address of a lighting control device that has been identified in the visible light communication by the network device 118. The system controller 104 may receive location information, at 1010, that indicates a location of the lighting control device from which the link address was identified. The location may be indicated by a user-selection that identifies the location of the lighting control device on a user interface (e.g., floor plan) displayed at the network device 118. The location may be indicated by location information that indicates the location of the network device 118 itself.

At 1012, the link address may be associated with a device identifier of the lighting control device indicated at 1010. The device identifier may be determined from the user-selection that identifies the location of the lighting control device on a user interface (e.g., floor plan) displayed at a network device. The device identifier may be determined as the device identifier of the lighting control device having the closest location to the location of the network device 118. After association of the link address with the device identifier at 1012, the method 1000 may end at 1014. The method 1000 may be performed multiple times to associate link addresses of different load control devices with device identifiers that are unique to a load control device.

Figure 11A:
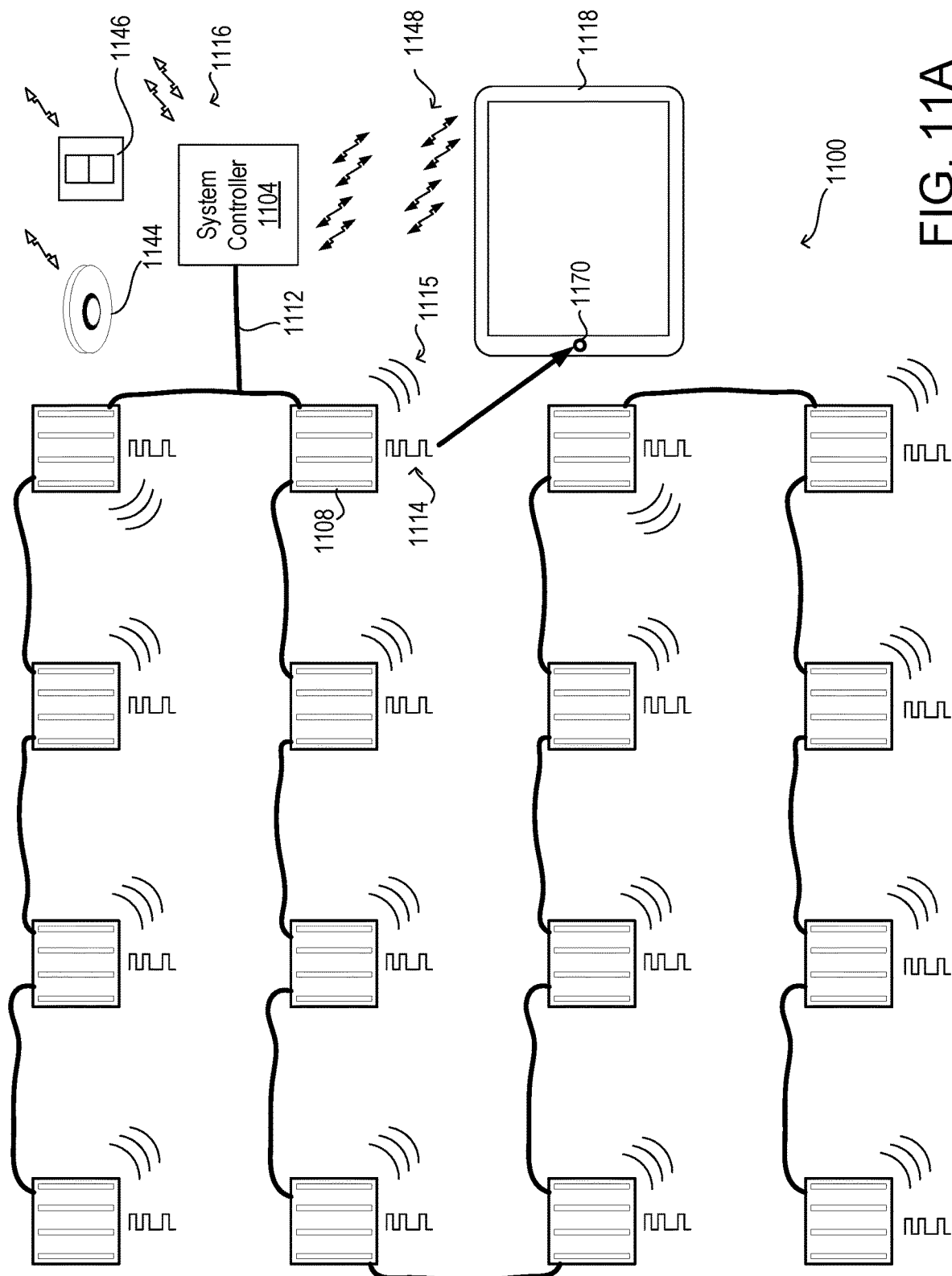
FIGS. 11A and 11B illustrate additional representative load control systems for configuring and/or controlling one or more control devices.
Figure 11B:
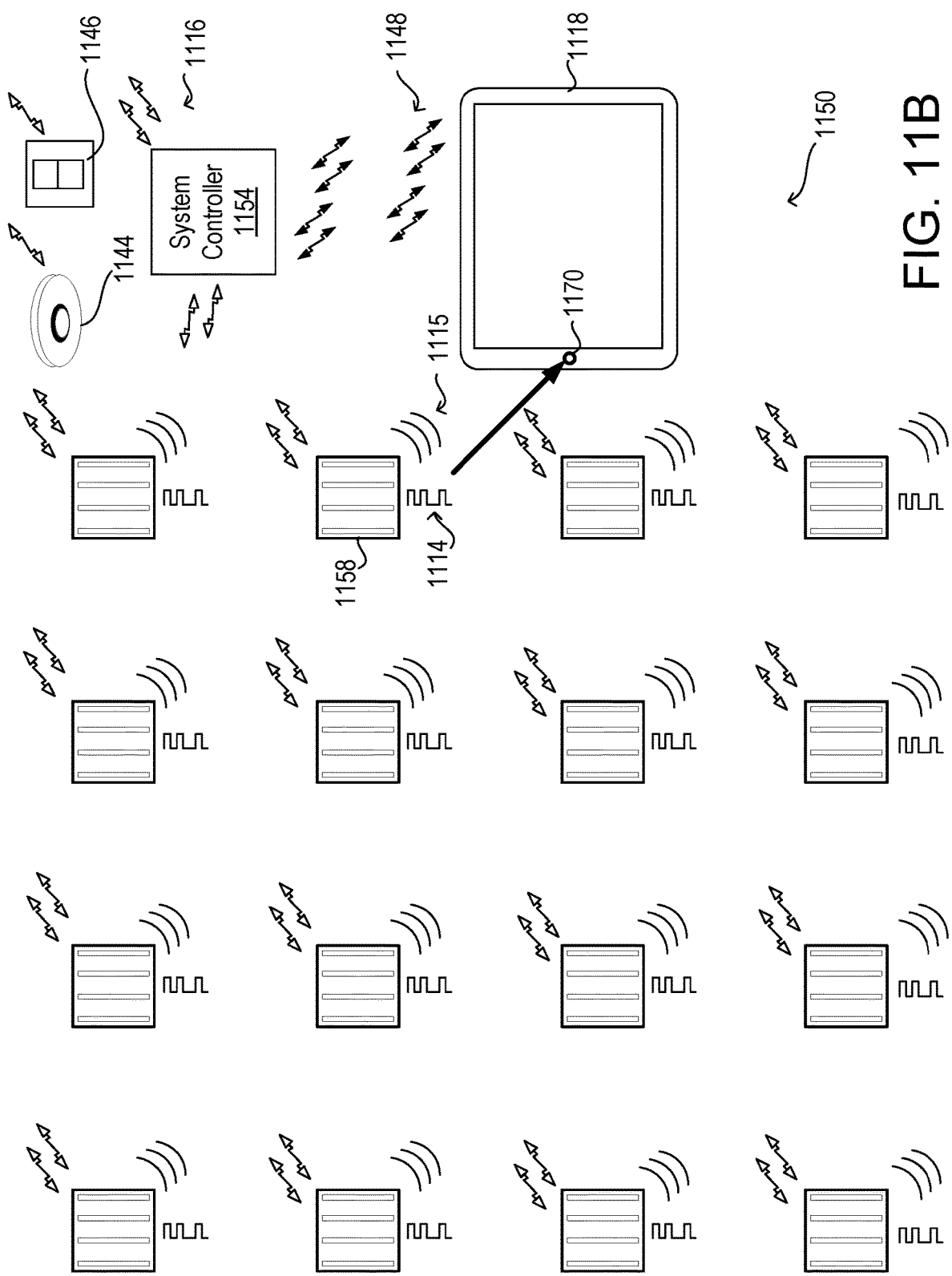

FIGS. 11A and 11B illustrate representative lighting control systems 1100 and 1150 for configuring and/or controlling one or more lighting fixtures using VLC signals 1114 and/or RF signals 1115. As shown in FIG. 11A, the lighting control system 1100 may include lighting fixtures 1108, which may transmit respective control device beacons via the VLC signals 1114 and/or the RF signals 1115. The VLC signals 1114 and/or the RF signals 1115 may be used to transmit other information received from the system controller 1104. The system controller 1104 may communicate with the lighting control devices in the lighting fixtures 1108 via communication link 1112. The communication link 1112 may be a wired communication link and/or a wireless link. The system controller 1104 may receive digital messages from control-source devices via RF signals 1116 for controlling the lighting fixtures 1108 and/or sending information via the VLC signals 1114 and/or the RF signals 1115. For example, the system controller 1104 may receive digital messages from the occupancy sensor 1144 and/or the remote control device 1146 for controlling the lighting fixtures 1108. The lighting fixtures 1108 may be controlled according to lighting control configuration instructions stored at the system controller 1104.

The VLC signals 1114 and/or the RF signals 1115 may be used to communicate information that enables the network device 1118 to identify and/or join a wireless communication network (e.g., a wireless local area network, such as a WI-FI® network) for communicating via the network communication signals 1148 (e.g., WI-FI® signals, WI-MAX® signals, etc.). The system controller 1104 may transmit a system controller identifier to the lighting fixtures 1108 on the communication link 1112. The lighting fixtures 1108 may transmit the system controller identifier and/or a device identifier of the respective lighting fixture 1108 using the VLC signals 1114. The network device 1118 may receive the modulated VLC signals 1114 transmitted from one or more of the lighting fixtures 1108. The VLC signals 1114 may be received via a camera 1170 or other optical circuit. The network device 1118 may decode the modulated VLC signals 1114 and may use the system controller identifier to find the wireless communication network to join. The system controller identifier may be identified in the network communication signals 1148 and the network device 1118 may match the system controller identifier received in the VLC signals 1114 with the system controller identifier identified in the network communication signals 1148. The network device 1118 may log onto the wireless communication network identified in the VLC signals 1114 for communicating with the system controller 1104. The network communication signals 1148 may be received from the system controller 1104 directly or another device (e.g., a network communication device) communicating on the wireless communication network.

The system controller 1104 may store the device identifiers of the lighting fixtures 1108 configured to communicate with, and/or be connected to, the system controller 1104. The network device 1118 may download the device identifiers of the lighting fixtures 1108 using the network communication signals 1148 and may store the device identifiers. The network device 1118 may identify the device identifiers being communicated in the beacons transmitted via the RF signals 1115 and/or the VLC signals 1114 of one or more lighting fixtures 1108. The network device 1118 may control and/or configure the identified lighting fixtures 1108. The network device 1118 may communicate digital messages to the system controller 1104 that have control instructions for controlling the identified lighting fixtures 1108. The lighting control instructions may include instructions for turning the lighting load for the lighting fixtures 1108 on or off. The lighting control instructions may include instructions for increasing or decreasing the dimming level of the lighting fixtures. The digital messages may include lighting control configuration instructions, such as preset configurations, zone configurations, occupancy configurations, and/or timing schedule configurations. The network device 1118 may confirm that the device identifier for the lighting fixtures 1108 are in the list of device identifiers associated with a location before sending digital messages for controlling and/or configuring the lighting fixtures 1108.

The network device 1118 may retrieve device identifiers for being collectively controlled and/or configured. For example, a user of the network device 1118 may walk around the space in which the lighting control system 1100 is installed and point the network device 1118 toward the lighting fixtures 1108 to be identified for control and/or configuration. The network device 1118 may discover the device identifier in the beacons transmitted from the lighting fixtures 1108 and control and/or configure the identified lighting fixtures 1108. A user may select one or more of the identified lighting fixtures for control and/or configuration. For example, a user may select the identified lighting fixtures from a floor plan (e.g., the floor plan 124 shown in FIG. 1) from a user interface on the network device 1118. In another example, the identified lighting fixtures may be automatically grouped together for control and/or configuration. The network device 1118 may communicate the control instructions and/or lighting configuration instructions in digital messages to the system controller 1104 via the network communication signals 1148. The system controller 1104 may implement the control instructions and/or lighting configuration instructions by sending control instructions to the lighting control devices of the identified lighting fixtures 1108 that control the lighting loads according to the received instructions.

Control-source devices may be associated with one or more of the lighting fixtures 1108 using the control device beacons. The network device 1118 may identify one or more lighting fixtures via the control device beacons transmitted in the RF signals 1115 and/or the VLC signals 1114. The network device 1118 may send the identified device identifiers of the lighting fixtures 1108 to the system controller 1104 for being associated with control-source devices, such as the occupancy sensor 1144 and/or the remote control device 1146 for example. The system controller 1104 may receive the device identifiers of a group of the lighting fixtures 1108 and may receive an association message from the control-source devices to be associated with the group of lighting fixtures 1108. For example, the system controller 1104 may receive the device identifiers of a group of the lighting fixtures 1108 and may receive an association message from the occupancy sensor 1144 and/or the remote control device 1146 for associating the devices with the identified lighting fixtures 1108. The association message may be sent from the occupancy sensor 1144 in response to a button press, an infrared (IR) signal identified by the occupancy sensor 1144, or another triggering event. The association message may be sent from the remote control device 1146 in response to a button press, a combination of button presses, or another triggering event.

The system controller 1104 may associate the occupancy sensor 1144 with the identified lighting fixtures 1108 by storing the device identifiers of the identified lighting fixtures 1108 in memory with the device identifier of the occupancy sensor 1144, such that the system controller 1104 may control the associated lighting fixtures 1108 upon receipt of a digital message from the occupancy sensor 1144. The system controller 1104 may associate the remote control device 1146 with the identified lighting fixtures 1108 by storing the device identifiers of the identified lighting fixtures 1108 in memory with the device identifier of the remote control device 1146, such that the system controller 1104 may control the associated lighting fixtures 1108 upon receipt of a digital message from the remote control device 1146. The associated control-source devices and the groups of identified lighting fixtures 1108 may also be associated with a unique identifier of a location beacon transmitted from a location transmitting device, such that the control-source devices and/or the groups of identified lighting fixtures 1108 may be controlled upon discovery of the unique identifier by the network device 1118.

The system controller 1104 may control the associated lighting control fixtures 1108 in response to occupancy and/or vacancy conditions received in digital messages from the occupancy sensor 1144. The system controller 1104 may control the associated lighting control fixtures 1108 in response to digital messages received from the remote control device 1146 that indicate the actuation of one or more buttons. The lighting level of the lighting fixtures may be controlled according to the lighting control configuration instructions received from the network device 1118, lighting control configuration instructions generated at the system controller 1104 based on the device identifiers received from the network device 1118, and/or other preconfigured lighting control configuration instructions stored at the system controller 1104. The lighting control configuration instructions may include preset configurations, zone configurations, occupancy configurations, and/or timing schedule configurations.

As shown in FIG. 11B, the lighting control system 1150 may include lighting fixtures 1158, one or more of which may communicate via wireless communication signals. For example, the system controller 1154 may communicate with the lighting control devices in the lighting fixtures 1158 via the RF signals 1116. The lighting fixtures 1158 may receive digital messages from control-source devices via the RF signals 1116. For example, the lighting fixtures 1158 may receive digital messages from the occupancy sensor 1144, the remote control device 1146, and/or the system controller 1154 via the RF signals 1116. Though the system controller 1104 and the system controller 1154 are shown in FIGS. 11A and 11B as communicating with the lighting control devices in the lighting fixtures 1108 and 1158 using wired and wireless communication, respectively, the system controller 1104 and the system controller 1154 may be capable of communicating with the lighting fixtures 1108 and the lighting fixtures 1158 using wired and/or wireless communications. Though the lighting fixtures 1108 and 1158 are illustrated as being able to communicate using wired and wireless communications, respectively, the lighting fixtures 1108, 1158 may be capable of using wired and/or wireless communications.

In the lighting control system 1150, the VLC signals 1114 may communicate information that enable the network device 1118 to identify and/or join a wireless communication network (e.g., a wireless local area network, such as a WI-FI® network) for communicating via the network communication signals 1148 (e.g., WI-FI® signals, WI-MAX® signals, etc.). The system controller 1154 may transmit a system controller identifier to the lighting fixtures 1158 on the Rf signals 1116. The lighting fixtures 1158 may transmit the system controller identifier using the VLC signals 1114. The network device 1118 may receive the modulated VLC signals 1114 transmitted from one or more of the lighting fixtures 1158 and may use the system controller identifier to discover the wireless communication network to join for communicating with the system controller 1154 via network communication signals 1148.

The system controller 1154 may store the device identifiers of the lighting fixtures 1158 configured to communicate with the system controller 1104. The network device 1118 may download the device identifiers of the lighting fixtures 1158 using the network communication signals 1148 and may store the device identifiers. The network device 1118 may identify the device identifiers being communicated in the load control beacons of one or more lighting fixtures 1158 and may control and/or configure the identified lighting fixtures 1158. The network device 1118 may communicate digital messages to the system controller 1154 that have control instructions for controlling the identified lighting fixtures 1158. The digital messages may include lighting control configuration instructions, such as preset configurations, zone configurations, occupancy configurations, and/or timing schedule configurations. The system controller 1154 may also, or alternatively, generate lighting control instructions and/or lighting control configuration instructions for controlling the identified lighting fixtures 1158. The network device 1118 may confirm that the device identifier for the lighting fixtures 1158 are in the list of device identifiers before sending digital messages for controlling and/or configuring the lighting fixtures 1158.

The system controller 1154 may associate lighting fixtures 1158 that are identified by the network device 1118 with control-source devices. For example, the system controller 1154 may associate lighting fixtures 1158 that are identified by the network device 1118 with the occupancy sensor 1144 and/or the remote control device 1146 associated with the same location. The system controller 1154 may receive the device identifiers of the lighting fixtures 1158 identified by the network device 1118 via the control device beacons transmitted via the RF signals 1115 and/or the VLC signals 1114. The system controller 1154 may receive an association message from the occupancy sensor 1144 and/or the remote control device 1146 for associating with the identified lighting fixtures 1158. The system controller 1154 may store the association between the occupancy sensor 1144 and the identified lighting fixtures 1158 in memory. The system controller 1154 may store the association between the remote control device 1146 and the identified lighting fixtures 1158 in memory.

The association information for the control-source devices may be sent to the lighting fixtures 1158 (e.g., via the RF signals 1116). The association information may be included in the zone configuration instructions. The lighting fixtures 1158 may store the association information locally, such that the lighting fixtures 1158 may control their respective lighting level (e.g., light intensity level) according to digital messages received from associated devices. The association information may include a group of one or more lighting fixtures 1158 and one or more associated control-source devices. In an example, the association information may be sent in a broadcast message from the system controller 1104 (e.g., via the RF signals 1116) and the lighting fixtures 1158 may store the association information when the lighting fixtures 1158 recognize their own device identifier in the association information.

The system controller 1154 may send the lighting control configuration instructions to the lighting fixtures 1158, such that the lighting fixtures 1158 may control a lighting level of the lighting load in the lighting fixtures 1158 in response to the digital messages received from control-source devices (such as the occupancy sensor 1144, the remote control device 1146, the system controller 1154, and/or another control-source device). The system controller 1154 may send digital messages for controlling the lighting level of the lighting fixtures 1158 in response to digital messages received from the network device 1118.

The system controller 1154 may control the different control-source devices to which identified lighting fixtures 1158 may respond. For example, the system controller 1154 may send digital messages to the lighting fixtures 1158 that identifies the associated control-source devices (e.g., the occupancy sensor 1144, the remote control device 1146, the system controller 1154, and/or another control-source device) to which the lighting fixtures 1158 should respond. The digital messages may include device type identifiers (e.g., remote control device identifier, occupancy sensor identifier, etc.) that identify the types of associated control-source devices to which the lighting fixtures 1158 may respond. The digital messages from the system controller 1154 may include actual device identifiers that identify the specific associated control-source devices to which the lighting fixtures 1158 may respond. The lighting fixtures 1158 may receive digital messages from the identified devices and control the lighting level of the lighting loads in response to the digital messages.

Figure 12:
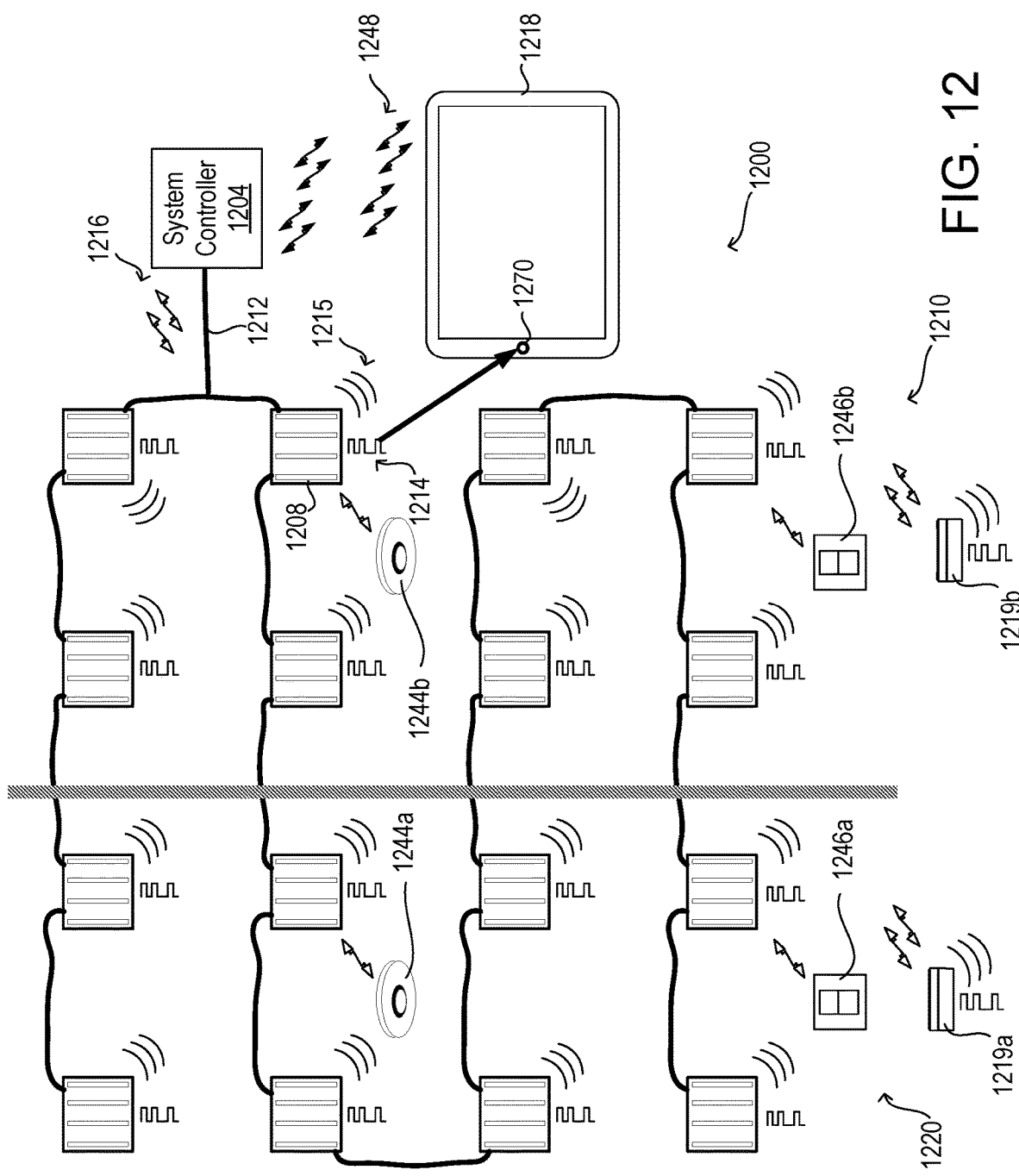
FIG. 12 illustrates a representative load control system for configuring and/or controlling control devices in one or more zones.

FIG. 12 illustrates a representative lighting control system 1200 for configuring and/or controlling lighting fixtures in one or more zones using visible light communication signals 1214. As shown in FIG. 12, the lighting control system 1200 includes lighting fixtures 1208, one or more of which may transmit respective control device beacons via RF communication signals 1215 and/or visible light communication signals 1214. The visible light communication signals 1214 may be received via a camera 1270 or other optical circuit. The visible light communication signals 1214 may be used to transmit information received from the system controller 1204. The system controller 1204 may communicate with the lighting control devices in the lighting fixtures 1208 via communication link 1212. Communication link 1212 may be a wired and/or wireless communication link (e.g., as shown in FIGS. 11A and 11B). The system controller 1204 may receive digital messages from occupancy sensors 1244a, 1244b and/or remote control devices 1246a, 1246b via the RF communication signals 1216 for controlling the lighting fixtures 1208 and/or sending information via the visible light communication signals 1214. The network device 1218 may communicate with the system controller 1204 via network communication signals 1248.

The lighting control system 1200 may include multiple zones 1210, 1220. Though two zones 1210, 1220 are shown in FIG. 12, any number of zones may be included in a space. The system controller 1204 may store the device identifiers of the lighting fixtures 1208 configured to communicate with, or be connected to, the system controller 1204. The system controller 1204 may include the device identifiers of the lighting fixtures 1208 located in the zones 1210, 1220.

The zones 1210, 1220 may be defined by the system controller 1204 and/or the network device 1218. For example, system controller 1204 may receive a digital message from the network device 1218 that includes a triggering event to trigger an association mode at the system controller 1204. The digital message may be transmitted from the network device 1218 in response to an actuation of a button (e.g., a zone configuration button) on the network device.

The zone 1210 may include a location beacon transmitting device 1219b for associating devices in zone 1210 with the unique identifier transmitted by the location beacon transmitting device 1219b. The zone 1220 may include a location beacon transmitting device 1219a for associating devices in zone 1220 with the unique identifier transmitted by the location beacon transmitting device 1219b. The network device 1218 may identify the device identifiers transmitted in the control device beacons of the lighting fixtures 1208 in zone 1210 and may store the device identifiers with a zone identifier transmitted from the location beacon transmitting device 1219b. The defined zone 1210 may be sent to the system controller 1204 in zone configuration information transmitted in a digital message. The defined zone 1210 may be stored at the system controller 1204 with the zone identifier for controlling the identified zone according to the zone configuration information transmitted in a digital message. In another example, the network device 1218 may identify the device identifiers in the control device beacons of the lighting fixtures 1208 in zone 1210 and may send the device identifiers to the system controller 1204 for defining the zone 1210 (e.g., storing the device identifiers with a zone identifier corresponding to zone 1210).

The system controller 1204 may receive an association message from control-source devices during the association mode for associating the control-source devices with the lighting fixtures 1208 in the zones 1210, 1220. The occupancy sensors 1244a, 1244b and/or the remote control devices 1246a, 1246b may be control-source devices that may be associated with the lighting fixtures 1208 in the zones 1210, 1220. For example, the network device 1218 may identify the lighting fixtures 1208 in zone 1210 via the control device bacons transmitted via the RF communication signals 1215 and/or the VLC signals 1214. The network device 1218 may send a digital message to the system controller 1204 that identifies the lighting fixtures 1208 in zone 1210. The system controller 1204 may associate identified lighting fixtures 1208 in zone 1210 with the occupancy sensor 1244b and/or the remote control device 1246b that are located in the zone 1210.

The network device 1218 may identify the lighting fixtures 1208 in zone 1220 via the control device bacons transmitted via the RF communication signals 1215 and/or the VLC signals 1214. The network device 1218 may send a digital message to the system controller 1204 that identifies the lighting fixtures 1208 in zone 1220. The system controller 1204 may associate identified lighting fixtures 1208 in zone 1220 with the occupancy sensor 1244a and/or the remote control device 1246a that are located in the zone 1220. The system controller 1204 may control the lighting fixtures 1208 in zone 1210, 1220 based on digital messages received from one or more control-source devices and/or the lighting control configurations stored at the system controller 1204. The devices in a zone may be stored with a zone identifier. The digital messages received from a control-source device may include the zone identifier of the zone 1210, 1220 to be controlled or the zone identifier may be looked up by the system controller 1204 upon receipt of a digital message from an associated control-source device in a defined zone.

The network device 1218 and/or the system controller 1204 may set other lighting control configurations based on the defined zones. For example, the network device 1218 and/or the system controller 1204 may set preset configurations, occupancy configurations, and/or timing schedule configurations for the zones 1210, 1220. The system controller 1204 may receive digital messages from the remote control devices 1246a, 1246b and/or the network device 1218 that identify a preset and may set the lighting level of the zones 1210, 1220 according to the identified preset configurations. The system controller 1204 may determine the zone 1210, 1220 that a device is transmitting from based on the device identifier or the zone identifier in the received digital messages. The preset configurations may include the zones 1210, 1220 to be controlled and/or a dimming level for one or more of the zones 1210, 1220. Where the lighting fixtures 1208 in a zone 1210, 1220 are configured to receive digital messages directly (e.g., via the RF communication signals 1216), the lighting fixtures 1208 may respond to the digital message according to the identified preset configurations stored on the lighting fixtures 1208.

The system controller 1204 may receive digital messages from the occupancy sensors 1244a, 1244b that identify an occupancy or vacancy condition and may control the lighting level of the respective zones 1210, 1220 according to stored occupancy configurations for a zone. The system controller 1204 may set the lighting level of the zones 1210, 1220 according to occupancy configurations that correspond to an occupancy or vacancy condition. The system controller 1204 may determine the zone 1210, 1220 that a device is transmitting from based on the device identifier or the zone identifier in the received digital messages. Different occupancy configurations may be used to control the lighting level in the zones 1210, 1220. Where the lighting fixtures 1208 in a zone 1210, 1220 are configured to receive digital messages directly (e.g., via the RF communication signals 1216), the lighting fixtures 1208 may respond to the digital message according to the occupancy configurations stored on the lighting fixtures 1208.

The lighting fixtures 1208 in the zone 1220 may be configured to communicate with, or connected to, another system controller or may be configured as another zone configured to communicate with, or connected to, the system controller 1204. When the lighting fixtures 1208 in the zone 1220 are configured to communicate with, or connected to, another system controller, the network device 1218 may receive the device identifiers of the lighting fixtures 1208 in the zone 1210 from the system controller 1204 and may receive the device identifiers of the lighting fixtures 1208 in the zone 1220 from the other system controller. If the device identifiers are not received from the system controller 1204, the network device 1218 may be unable to identify or confirm the device identifiers of the lighting control devices of the lighting fixtures 1208 in the zone 1210.

Figure 13A:
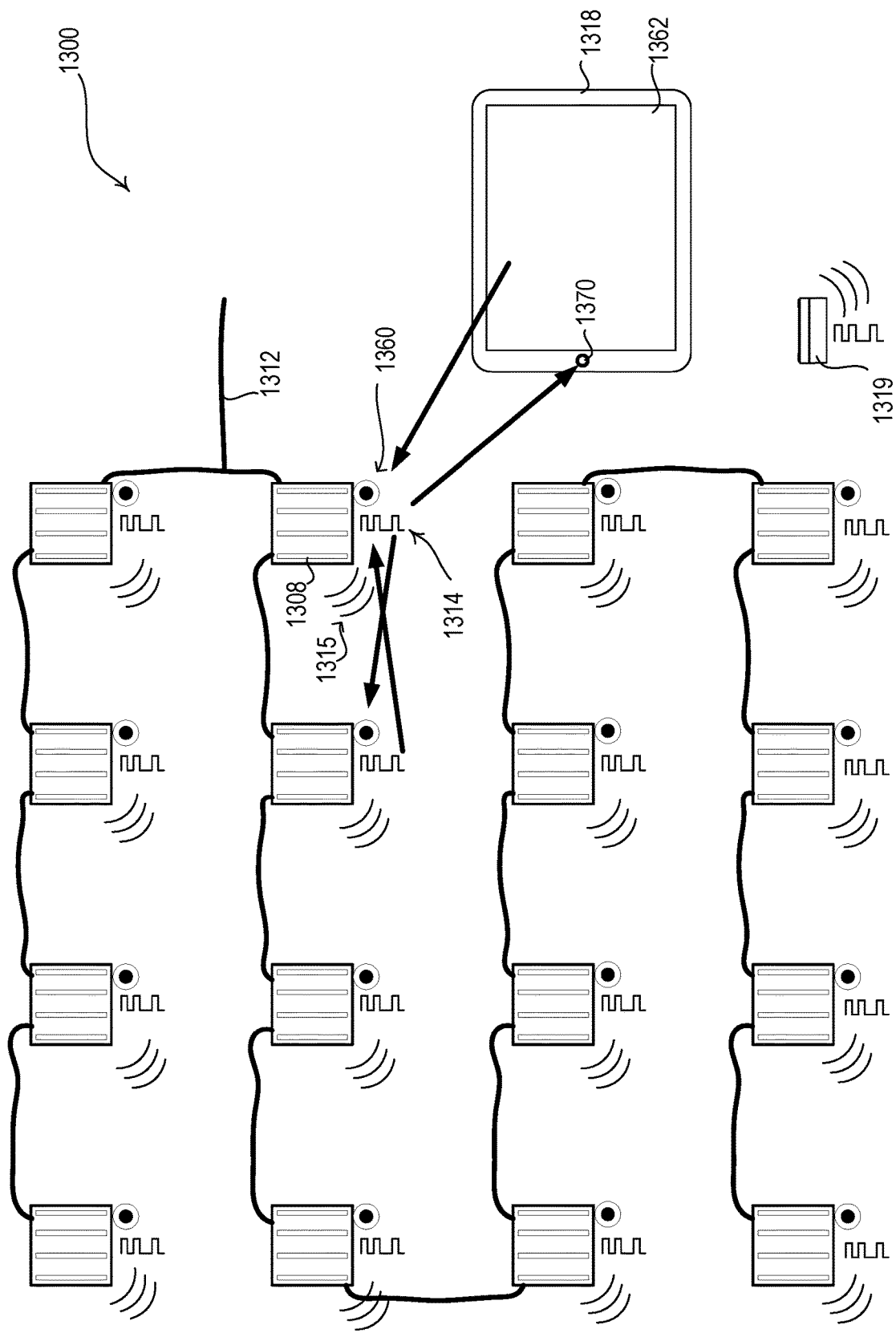
FIGS. 13A and 13B illustrate representative load control systems for configuring and/or controlling control devices.
Figure 13B:
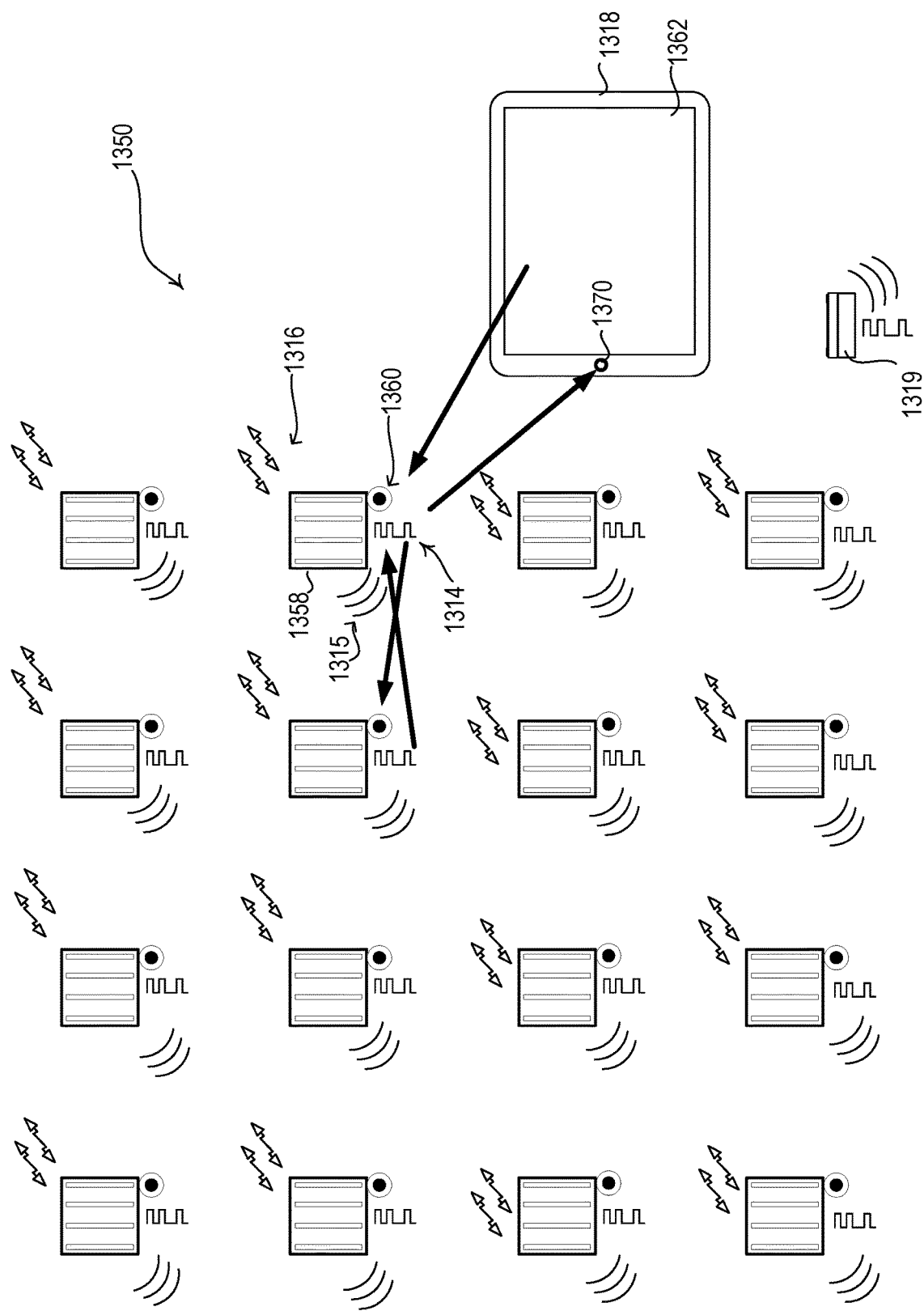

FIGS. 13A and 13B illustrate a representative lighting control system 1300 for configuring and/or controlling lighting fixtures using VLC signals 1314. As shown in FIG. 13A, the lighting control system 1300 includes lighting fixtures 1308, one or more of which may transmit respective VLC signals 1314. The VLC signals 1314 may be received via a camera 1170 or other optical circuit at the network device 1318. The lighting fixtures 1308 may include visible light sensors 1360 capable of detecting VLC signals 1314 transmitted by the lighting fixtures 1308. The visible light sensors 1360 may include a photo sensor, a camera, an infrared (IR) sensor, and/or another device for recognizing the VLC signals 1314.

The lighting control devices of the lighting fixtures 1308 may send and/or receive information on a communication link 1312. The lighting fixtures 1308 may receive lighting control instructions and/or lighting control configuration instructions on the communication link 1312. The lighting fixtures 1308 may control a respective lighting load (e.g., turn on, turn off, increase the dimming level, decrease the dimming level, etc.) in response to the lighting control instructions. The lighting fixtures 1308 may store the lighting control configuration instructions locally for controlling the lighting level according to the lighting control configuration instructions. For example, the lighting control configuration instructions may include preset configurations, zone configurations, occupancy configurations, and/or timing schedule configurations that may be implemented by the lighting fixtures 1308. The lighting fixtures 1308 may receive lighting control instructions and/or lighting control configuration instructions on the communication link 1312 from a system controller, a remote control device, and/or another control-source device.

The lighting control devices of the lighting fixtures 1308 may receive information via visible light sensors 1360. For example, the lighting control devices of the lighting fixtures 1308 may discover a location beacon transmitted as VLC signals from the location beacon transmitting device 1319. The lighting control devices may associate with the unique identifier in the location beacon. The lighting control devices of the lighting fixtures 1308 may also, or alternatively, discover control device beacons transmitted by other lighting fixtures via the visible lighting communications 1314 and may associate the lighting control devices with the unique identifier in the location beacon.

The lighting fixtures 1308 may use the visible light sensors 1360 to identify association information being transmitted from VLC signals 1314 of other lighting fixtures. The visible light fixtures 1308 may transmit a device identifier (e.g., serial number, a link address, etc.) using the VLC signals 1314. The visible light fixtures 1308 may transmit a device identifier on the VLC signals 1314 in response to a triggering event, which may be received on the communication link 1312 (e.g., from a system controller, a remote control device, and/or another control-source device) and/or via the visible light sensors 1360. The triggering event may be identified from the VLC signals 1314 of another lighting fixture, from the network device 1318 (e.g., via a flashing visual display or a camera flash), from an IR signal received from another device, or from another visible light trigger.

The visible light sensors 1360 at the lighting fixtures 1308 may identify the VLC signals 1314 of lighting fixtures within a range of the visible light sensor. The visible light sensors 1360 on the lighting fixtures 1308 may identify the VLC signals 1314 of lighting fixtures adjacent to the lighting fixture. The VLC signals 1314 that are below a signal strength (e.g., RSSI) threshold upon receipt at a lighting fixture may be discarded, such that the lighting fixtures 1308 are associated with devices within the defined threshold signal strength. The lighting fixtures 1308 may associate themselves with other lighting fixtures by storing the identified device identifier and/or link address of the other lighting fixtures in memory. Lighting fixtures 1308 may be associated with other lighting fixtures that are capable of identification by the VLC signals 1314, such that devices in the same room or visible space may be associated. Lighting fixtures 1308 in other rooms or that are otherwise transmitting VLC signals 1314 outside of the visible space of the visible light sensors 1360 may be unable to be associated. Associated lighting fixtures 1308 may be controlled (e.g., similarly controlled). The lighting fixtures 1308 may send the association information on the communication link 1312 (e.g., to a system controller and/or another device) for storage.

The lighting control devices of the lighting fixtures 1308 may discover a location beacon transmitted via RF communication signals 1315 from the location beacon transmitting device 1319. The lighting control devices may associate with the unique identifier in the location beacon. The lighting control devices of the lighting fixtures 1308 may also, or alternatively, discover control device beacons transmitted by other lighting fixtures via the RF communication signals 1315 and may associate the lighting control devices with the unique identifier in the location beacon.

The lighting control devices of the lighting fixtures 1308 may identify the RF communication signals 1315 of lighting fixtures within a predefined range of the communication circuit (e.g., transceiver) receiving the RF communications. The lighting control devices of one or more of the lighting fixtures 1308 may associate the lighting fixtures in the RF communication signals 1315 that are above a signal strength (e.g., RSSI) threshold. The lighting fixtures 1308 may associate themselves with other lighting fixtures by storing the identified device identifier of the other lighting fixtures in memory. Lighting fixtures 1308 may be associated with other lighting fixtures that are associated with the unique identifier in the location beacon transmitted by the location beacon transmitting device 1319, such that devices in the same location may be associated.

The lighting control devices of the lighting fixtures 1308 may receive lighting control instructions and/or lighting control configuration instructions via the visible light sensors 1360. The lighting control instructions and/or lighting control configuration instructions may be received from a network device 1318. The network device 1318 may communicate the lighting control instructions and/or lighting control configuration instructions by flashing (e.g., modulating) a visual display 1362 and/or a camera on the network device 1318.

The network device 1318 may communicate association information by flashing (e.g., modulating) a visual display and/or a camera on the network device 1318. The association information may include device identifiers of associated lighting fixtures 1308 in the lighting control system 1300. The associated devices may be stored at the lighting fixtures 1308 for being controlled (e.g., similarly controlled). Associated lighting fixtures 1308 may be controlled according to the same lighting control instructions and/or lighting configuration instructions.

As shown in FIG. 13B, the lighting control system 1350 includes lighting fixtures 1358, one or more of which may communicate via wireless communication signals. For example, the lighting fixtures 1358 may communicate via the RF communication signals 1316. Though the lighting fixtures 1308 and the lighting fixtures 1358 are shown in FIGS. 13A and 13B as communicating using wired and wireless communication, respectively, the lighting fixtures may be capable of communicating using wired and/or wireless communications.

The lighting control devices of the lighting fixtures 1358 may receive digital messages from control-source devices (e.g., occupancy sensors, remote control devices, system controllers, etc.) via the RF communication signals 1316. The digital messages may include lighting control instructions and/or lighting control configuration instructions. The lighting fixtures 1358 may have lighting control instructions and/or lighting configuration instructions stored thereon and may control a lighting level in accordance with the lighting control instructions and/or lighting configuration instructions in response to digital messages received via the RF communication signals 1316. For example, the digital messages may include an occupancy condition or a vacancy condition received from an occupancy sensor and the lighting fixtures 1358 may change a dimming level in accordance with lighting control instructions and/or lighting control configuration instructions stored at the lighting fixtures 1358. The digital messages may include an identifier of an actuation of one or more buttons at a remote control and the lighting fixtures 1358 may change a dimming level in accordance with lighting control instructions and/or lighting control configuration instructions stored at the lighting fixtures 1358. The lighting fixtures 1358 may respond to messages from associated devices (e.g., having a device identifier stored thereon).

The visible light fixtures 1358 may transmit a beacon via the VLC signals 1316 and/or the RF communication signals 1315 in response to a triggering event, which may be received on RF communication signals 1316 (e.g., from a system controller, a remote control device, an occupancy sensor, and/or another control-source device). The lighting fixtures 1358 may associate with other lighting fixtures from which the lighting fixtures 1358 receive the device identifier on the VLC signals 1316 and/or the RF communication signals 1316. The lighting fixtures 1358 may be associated with other lighting fixtures having VLC signals 1316 and/or RF communication signals 1316 that are received with a respective signal strength (e.g., RSSI) that is above a threshold.

Figure 14:
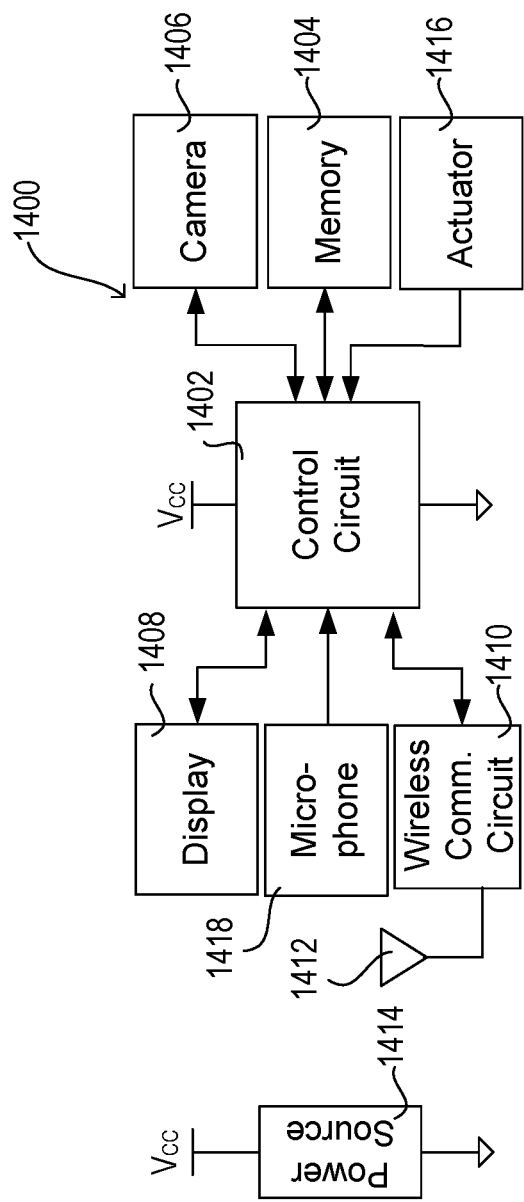
FIG. 14 is a block diagram illustrating an example network device.

FIG. 14 is a block diagram illustrating an example network device 1400 as described herein. The network device 1400 may include a control circuit 1402 for controlling the functionality of the network device 1400. The control circuit 1402 may include one or more general purpose processors, special purpose processors, conventional processors, digital signal processors (DSPs), microprocessors, integrated circuits, a programmable logic device (PLD), application specific integrated circuits (ASICs), and/or the like. The control circuit 1402 may perform signal coding, data processing, power control, image processing, input/output processing, and/or any other functionality that enables the network device 1400 to perform as described herein.

The control circuit 1402 may store information in and/or retrieve information from the memory 1404. The memory 1404 may include a non-removable memory and/or a removable memory. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory.

The network device 1400 may include a camera 1406 that may be in communication with the control circuit 1402. The camera may include a digital camera or other optical device capable of generating images or videos (e.g., image sequences) for being captured at the network device 1400 using visible light. The camera may include a light capable of flashing, modulating, or turning on/off in response to signals received from the control circuit. Though the camera 1406 is shown in FIG. 14, the network device 1400 may include a visible light sensor, a photo sensor, or other device capable of recognizing VLC signals.

The network device 1400 may include a wireless communication circuit 1410 for wirelessly transmitting and/or receiving information. For example, the wireless communications circuit 1410 may include an RF transceiver for transmitting and receiving RF communication signals via an antenna 1412, or other communications module capable of performing wireless communications. Wireless communications circuit 1410 may be in communication with the control circuit 1402 for communicating information to and/or from the control circuit 1402. For example, the wireless communication circuit 1410 may send information from the control circuit 1402 via network communication signals. The wireless communication circuit 1410 may send information to the control circuit 1402 that are received via network communication signals.

The control circuit 1402 may also be in communication with a display 1408. The display may provide information to a user in the form of a graphical and/or textual display. The control circuit 1402 may signal the display 1408, or portions thereof, to modulate or turn on/off to communicate information from the display 1408. The communication between the display 1408 and the control circuit 1402 may be a two way communication, as the display 1408 may include a touch screen module capable of receiving information from a user and providing such information to the control circuit 1402.

The network device 1400 may include an actuator 1416. The control circuit 1402 may be responsive to the actuator 1416 for receiving a user input. For example, the control circuit 1402 may be operable to receive a button press from a user on the network device 1400 for making a selection or performing other functionality on the network device 1400.

The network device 1400 may include a microphone 1418. The control circuit 1402 may receive audio signals via the microphone 1418.

One or more of the modules within the network device 1400 may be powered by a power source 1414. The power source 1414 may include an AC power supply or DC power supply, for example. The power source 1414 may generate a DC supply voltage $V_{CC}$ for powering the modules within the network device 1400.

Figure 15:
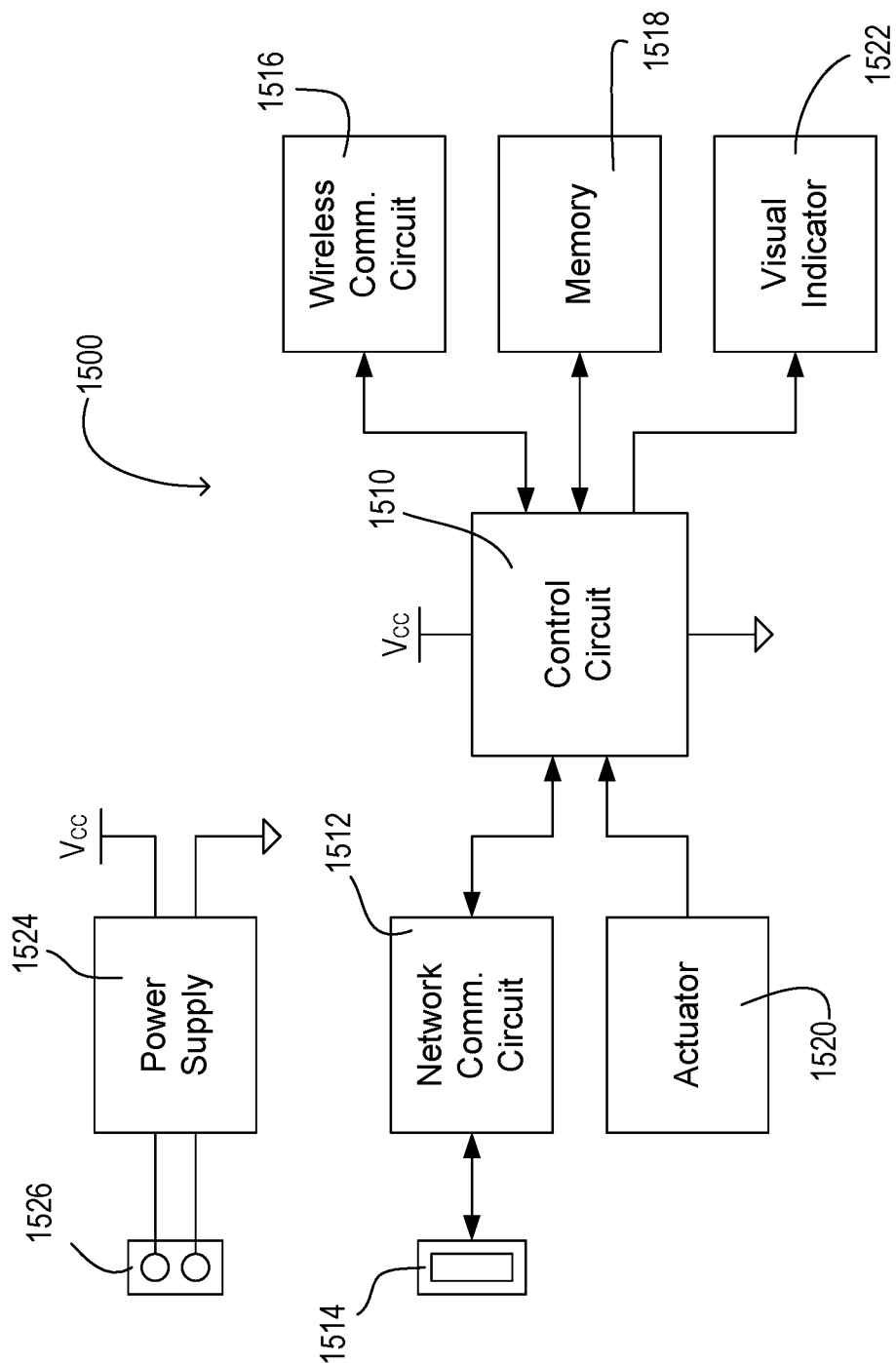
FIG. 15 is a block diagram of an example system controller.

FIG. 15 is a block diagram of an example system controller 1500. The system controller 1500 may comprise a control circuit 1510, which may include one or more of a processor (e.g., a microprocessor), a microcontroller, a programmable logic device (PLD), a field programmable gate array (FPGA), an application specific integrated circuit (ASIC), or any suitable processing device. The control circuit 1510 may perform signal coding, data processing, image processing, power control, input/output processing, and/or any other functionality that enables the system controller 1500 to perform as described herein. The system controller 1500 may comprise a network communication circuit 1512 that may be coupled to a network connector 1514 (e.g., an Ethernet jack), which may be adapted to be connected to a wired digital communication link (e.g., an Ethernet communication link) for allowing the control circuit 1510 to communicate with network communication devices on a network. The network communication circuit 1512 may be configured to be wirelessly connected to the network, e.g., using WI-FI technology to transmit and/or receive network communication signals.

The system controller 1510 may comprise a wireless communication circuit 1516, for example, including an RF transceiver coupled to an antenna for transmitting and/or receiving RF communication signals. The wireless communication circuit 1516 may communicate using a proprietary protocol (e.g., the ClearConnect® protocol). The control circuit 1510 may be coupled to the wireless communication circuit 1516 for transmitting digital messages via the RF communication signals, for example, to control the load control devices in response to digital messages received via the network communication circuit 1512. The control circuit 1510 may be configured to receive digital messages, for example, from the load control devices and/or other control-source devices.

The control circuit 1510 may be responsive to an actuator 1520 for receiving a user input. For example, the control circuit 1510 may be operable to associate the system controller 1500 with one or more devices of a load control system in response to actuations of the actuator 1520. The system controller 1500 may comprise additional actuators to which the control circuit 1510 may be responsive.

The control circuit 1510 may store information in and/or retrieve information from the memory 1518. The memory 1518 may include a non-removable memory and/or a removable memory for storing computer-readable media. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory. The control circuit 1510 may access the memory 1518 for executable instructions and/or other information that may be used by the system controller 1500. The control circuit 1510 may store the device identifiers of the devices to which the system controller 1500 is associated in the memory 1518. The control circuit 1510 may access instructions in the memory 1518 for transmitting instructions and/or performing other functions described herein.

The system controller 1500 may comprise a power supply 1524 for generating a DC supply voltage $V_{CC}$ for powering the control circuit 1510, the network communication circuit 1512, the wireless communication circuit 1516, the memory 1518, the visual indicator 1522, and/or other circuitry of the system controller 1500. The power supply 1524 may be coupled to a power supply connector 1526 (e.g., a USB port) for receiving a supply voltage (e.g., a DC voltage) and/or for drawing current from an external power source.

Figure 16:
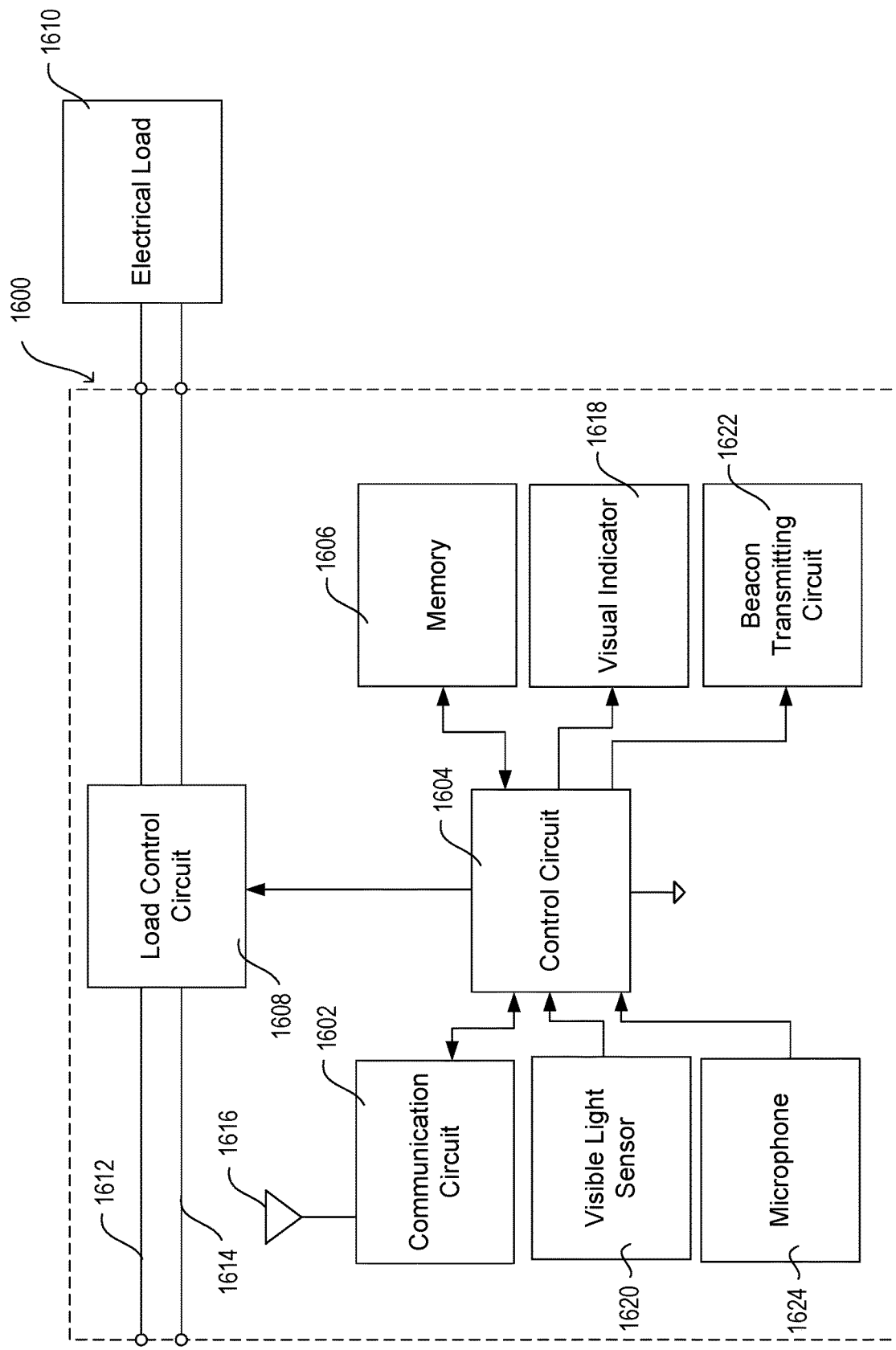
FIG. 16 is a block diagram illustrating an example load control device.

FIG. 16 is a block diagram illustrating an example load control device 1600. The load control device 1600 may be a control-target device, such as a lighting control device, for example. The load control device 1600 may be a dimmer switch, an electronic switch, an electronic ballast for lamps, an LED driver for LED light sources, a plug-in load control device, a temperature control device (e.g., a thermostat), a motor drive unit for a motorized window treatment, or other load control device. The load control device 1600 may include a communication circuit 1602. The communication circuit 1602 may include an RF receiver, an RF transceiver, or other communication module capable of performing wired and/or wireless communications. The wireless communications may be performed via an antenna 1616.

The communication circuit 1602 may be in communication with a control circuit 1604. The control circuit 1604 may include one or more general purpose processors, special purpose processors, conventional processors, digital signal processors (DSPs), microprocessors, integrated circuits, a programmable logic device (PLD), application specific integrated circuits (ASICs), or the like. The control circuit 1604 may perform signal coding, data processing, power control, input/output processing, or any other functionality that enables the load control device 1600 to perform as described herein.

The control circuit 1604 may store information in and/or retrieve information from a memory 1606. For example, the memory 1606 may maintain a device database of associated device identifiers, instructions for modulating an electrical load 1610 to communicate VLC signals, and/or other executable instructions for performing as described herein. The memory 1606 may include a non-removable memory and/or a removable memory. The load control circuit 1608 may receive instructions from the control circuit 1604 and may control the electrical load 1610 based on the received instructions. For example, the control circuit 1604 may use the load control circuit 1608 to modulate the electrical load 1610 according to instructions received to transmit VLC signals (e.g., to transmit a beacon). The load control circuit 1608 may receive power via the hot connection 1612 and the neutral connection 1614 and may provide an amount of power to the electrical load 1610. The electrical load 1610 may include a lighting load or any other type of electrical load.

The control circuit 1604 may illuminate a visual indicator 1618 to provide feedback to a user. For example, the control circuit 1604 may blink or strobe the visual indicator 1618 to indicate a fault condition. The control circuit 1604 may be operable to illuminate the visual indicator 1618 different colors to indicator different conditions or states of the system controller 1600. The visual indicator 1618 may be illuminated by, for example, one or more light-emitting diodes (LEDs). The visual indicator 1618 may be modulated to transmit a visible light communication, as described herein. The system controller 1600 may comprise more than one visual indicator.

The control circuit 1604 may receive information from the visible light sensor 1620. The visible light sensor 1620 may detect VLC signals transmitted by other devices, such as a network device (e.g., camera flashes, flashes of the display, etc.) or other load control devices, for example. The visible light sensor 1620 may include a photo sensor, a camera, an infrared (IR) sensor, and/or another device for recognizing the VLC signals.

The control circuit 1604 may cause beacon transmitting circuit 1622 (e.g., a short-range communication circuit) to transmit beacons. The beacon transmitting circuit 1622 may communicate beacons via RF communication signals, for example. The control circuit 1604 may receive audio signals via the microphone 1624.

Although features and elements are described above in particular combinations, a feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

The invention claimed is:

1. A control device, comprising:
a control circuit configured to communicate signals during a beacon signal transmission time period and a load control communication time period, wherein:
during the beacon signal transmission time period, the control circuit is configured to transmit a beacon signal, and during the load control communication time period, the control circuit is configured to communicate signals including messages other than the beacon signal,
wherein the messages communicated during the load control communication time period allow for association of the control device with one or more external devices.

2. The control device of claim 1, wherein, in response to receiving a message indicating that association has been performed, the control circuit is configured to enter a lower power beacon mode or a beacon off mode to limit or prevent beaconing.

3. The control device of claim 1, wherein the control circuit is configured to enter a continuous two-way mode in response to receiving an instruction during the load control communication time period or a time period immediately flowing the beacon signal transmission time period, the control circuit configured to transmit and receive messages during the continuous two-way mode.

4. The control device of claim 3, wherein the continuous two-way mode is a continuous two-way configuration mode, and the control circuit is configured to communicate messages during the continuous two-way configuration mode for receiving operational settings of the control device.

5. The control device of claim 3, wherein the continuous two-way mode is a continuous two-way control mode, and the control circuit is configured to communicate messages during the continuous two-way control mode to allow for control of the control device.

6. The control device of claim 3, wherein the control circuit is configured to:
   receive a scan request from an external device, wherein the scan request includes an encrypted passcode;
   determine whether the received encrypted passcode is correct; and
   based on the determination that the received encrypted passcode is correct, switch to the continuous two-way mode.

7. The control device of claim 3, wherein the control circuit is configured to communicate messages when the control device is in the continuous two-way mode using one or more of: a Bluetooth® protocol, a near-field communication protocol, a WiFi® protocol, or a Zigbee protocol.

8. The control device of claim 1, further comprising:
   a beacon transmitting circuit configured to periodically transmit beacon signals during the beacon signal transmission time period.

9. The control device of claim 1, further comprising:
   a wireless communication circuit configured to transmit and receive messages during the load control communication time period.

10. The control device of claim 1, further comprising:
    a load control circuit configured to provide power to an electrical load;
    wherein the control circuit is configured to receive a command including load control instructions during the load control communication time period, and to control the load control circuit to control the power delivered to the electrical load in response to the load control instructions.

11. The control device of claim 1, wherein the control circuit is configured to receive association instructions during the load control communication time period.

12. The control device of claim 1, wherein the control circuit is configured to:
    receive an instruction; and
    based on receiving the instruction, switch between the beacon signal transmission time period and the load control beacon signal transmission time period.

13. The control device of claim 1, wherein the beacon signal comprises a unique identifier associated with a physical location at which the control device is located.

14. The control device of claim 1, wherein the beacon signal comprises one of: a visible light communication signal, a radio-frequency signal, or an audio signal.

15. The control device of claim 14, wherein the beacon signal comprises a radio-frequency signal transmitted via one of: a Bluetooth protocol or a near-field communication protocol.

16. The control device of claim 1, wherein the control device is configured to periodically switch between the beacon signal transmission time period and the load control communication time period.

17. A non-transitory, machine-readable, storage device that includes instructions that, when executed by a control device control circuit, cause the control circuit to:
    communicate a beacon signal during a beacon signal transmission time period; and
    communicate signals that include one or more messages other than the beacon during a load control communication time period,
    wherein instructions that cause the control circuit to communicate signals that include the one or more messages other than the beacon during the load control communication time period further cause the control circuit to:
    communicate signals that include one or more messages to allow for association of the control device with one or more external devices.

18. The non-transitory, machine-readable, storage device of claim 17, wherein the instructions further cause the control circuit to:
    transition to a lower power beacon mode or a beacon off mode to limit or prevent beaconing in response to receipt a message indicating that association has been performed.

19. The non-transitory, machine-readable, storage device of claim 17, wherein the instructions further cause the control circuit to:
    enter a continuous two-way mode responsive to receipt of an instruction during the load control communication time period or a time period immediately flowing the beacon signal transmission time period.

20. The non-transitory, machine-readable, storage device of claim 19, wherein the instructions that cause the control circuitry to enter the continuous two-way mode further cause the control circuitry to:
    enter a continuous two-way configuration mode, and
    communicate messages during the continuous two-way configuration mode for receiving operational settings of the control device.

21. The non-transitory, machine-readable, storage device of claim 19 wherein the instructions that cause the control circuitry to enter the continuous two-way mode further cause the control circuitry to:
    enter a continuous two-way control mode; and
    communicate messages during the continuous two-way control mode to allow for control of the control device.

22. The non-transitory, machine-readable, storage device of claim 19 wherein the instructions further cause the control circuitry to:
    receive a scan request that includes an encrypted passcode from an external device, wherein the scan request;
    determine whether the received encrypted passcode is correct; and based on the determination that the received encrypted passcode is correct, transition to the continuous two-way mode.

23. The non-transitory, machine-readable, storage device of claim 19 wherein the instructions further cause the control circuitry to:
    communicate messages in the continuous two-way mode using one or more of: a Bluetooth® protocol, a near-field communication protocol, a WiFi® protocol, or a Zigbee protocol.

24. The non-transitory, machine-readable, storage device of claim 17 wherein the instructions that cause the control circuit to communicate a beacon signal during a beacon signal transmission time period further cause the control circuit to:
    cause a beacon transmitting circuit to periodically transmit beacon signals during the beacon signal transmission time period.

25. The non-transitory, machine-readable, storage device of claim 17 wherein the instructions that cause the control circuit to communicate signals that include one or more messages other than the beacon during the load control communication time period further cause the control circuit to:

cause a wireless communication circuit to transmit and receive messages during the load control communication time period.

26. The non-transitory, machine-readable, storage device of claim 17 wherein the instructions that cause the control circuit to communicate signals that include one or more messages other than the beacon during a load control communication time period further cause the control circuit to:
control a load control circuit to deliver electrical power to an electrical load responsive to receipt of a command including load control instructions during the load control communication time period.

27. The non-transitory, machine-readable, storage device of claim 17 wherein the instructions that cause the control circuit to communicate signals that include one or more messages other than the beacon during a load control communication time period further cause the control circuit to:
receive association instructions during the load control communication time period.

28. The non-transitory, machine-readable, storage device of claim 17 wherein the instructions further cause the control circuit to:
responsive to receipt of one or more instructions transition between the beacon signal transmission time period and the load control beacon signal transmission time period.

29. The non-transitory, machine-readable, storage device of claim 17 wherein the instructions that cause the control circuit to communicate the beacon signal during the beacon signal transmission time period further cause the control circuit to:
communicate a beacon signal that includes a unique identifier associated with a physical location of the control device.

30. The non-transitory, machine-readable, storage device of claim 17 wherein the instructions that cause the control circuit to communicate the beacon signal during the beacon signal transmission time period further cause the control circuit to:
communicate a beacon signal that includes at least one of: a visible light communication signal, a radio-frequency signal, or an audio signal.

31. The non-transitory, machine-readable, storage device of claim 30 wherein the instructions that cause the control circuit to communicate the beacon signal that includes the radio-frequency signal further comprises:
communicate the beacon signal that includes a radio-frequency signal that uses at least one of: a Bluetooth® protocol or a Near-Field Communication protocol.

32. The non-transitory, machine-readable, storage device of claim 17 wherein the instructions further cause the control circuitry to:
periodically transition between the beacon signal transmission time period and the load control communication time period.

33. A control device communication method, comprising:
communicating, by control circuit, a beacon signal during a beacon signal transmission time period; and
communicating, by control circuit, one or more signals that include one or more messages other than the beacon during a load control communication time period,
wherein communicating the one or more signals that include the one or more messages other than the beacon during the load control communication time period further comprises:
communicating, by the control circuit, one or more signals that include one or more messages to allow for association of the control device with one or more external devices.

34. The method of claim 33, further comprising:
transitioning, by the control circuit, to a lower power beacon mode or a beacon off mode to limit or prevent beaconing in response to receipt a message indicating that association has been performed.

35. The method of claim 33, further comprising:
transitioning, by the control circuit, to a continuous two-way mode responsive to receipt of an instruction during the load control communication time period or a time period immediately flowing the beacon signal transmission time period.

36. The method of claim 35 wherein transitioning to the continuous two-way mode further comprises:
entering, by the control circuit, a continuous two-way configuration mode, and
communicating, by the control circuit, one or more messages during the continuous two-way configuration mode to receive one or more operational settings of a control device.

37. The method of claim 35 wherein transitioning to the continuous two-way mode further comprises:
entering, by the control circuit, a continuous two-way control mode; and
communicating, by the control circuit, one or more messages during the continuous two-way control mode to control a control device.

38. The method of claim 35, further comprising:
receiving, by the control circuitry, a scan request that includes an encrypted passcode from an external device, wherein the scan request;
determining, by the control circuit, whether the received encrypted passcode is correct; and
transitioning, by the control circuit, to the continuous two-way mode responsive to the determination that the received encrypted passcode is correct.

39. The method of claim 35 wherein communicating the one or more signals that include the one or more messages other than the beacon during the load control communication time period further comprises:
communicating, by the control circuit, the one or more signals that include the one or more messages in the continuous two-way mode using one or more of: a Bluetooth® protocol, a near-field communication protocol, a WiFi® protocol, or a Zigbee protocol.

40. The method of claim 33 wherein communicating the beacon signal during the beacon signal transmission time period further comprises:
causing, by the control circuit, a beacon transmitting circuit to periodically transmit beacon signals during the beacon signal transmission time period.

41. The method of claim 33 wherein communicating the one or more signals that include the one or more messages other than the beacon during the load control communication time period further comprise:
causing, by the control circuit, a wireless communication circuit to transmit and receive messages during the load control communication time period.

42. The method of claim 33 wherein communicating the one or more signals that include the one or more messages other than the beacon during a load control communication time period further comprise:

causing, by the control circuit, a load control circuit to deliver electrical power to an electrical load responsive to receipt of a command including one or more load control instructions during the load control communication time period.

43. The method of claim 33, further comprising:

receiving, by the control circuit, one or more association instructions during the load control communication time period.

44. The method of claim 33, further comprising:

transitioning, by the control circuit, between the beacon signal transmission time period and the load control beacon signal transmission time period responsive to receipt of one or more instructions.

45. The method of claim 33 wherein communicating the beacon signal during the beacon signal transmission time period further comprises:

communicating, by the control circuit, a beacon signal that includes a unique identifier associated with a physical location of the control device.

46. The method of claim 33 wherein communicating the beacon signal during the beacon signal transmission time period further comprises:

communicating, by the control circuit, a beacon signal that includes at least one of: a visible light communication signal, a radio-frequency signal, or an audio signal.

47. The method of claim 46 wherein communicating the beacon signal that includes the radio-frequency signal further comprises:

communicating, by the control circuit, the beacon signal that includes a radio-frequency signal that uses at least one of: a Bluetooth* protocol or a Near-Field Communication protocol.

48. The method of claim 33, further comprising:

periodically transitioning, by the control circuit, between the beacon signal transmission time period and the load control communication time period.

\* \* \* \* \*